US012799927B2

(12) United States Patent
Meschke et al.

(10) Patent No.: US 12,799,927 B2
(45) **Date of Patent: *Nov. 17, 2026**

(54) CHEMICAL DELIVERY DEVICES AND SYSTEMS AND METHODS OF USE

(71) Applicant: Sonny's HFI Holdings, LLC, Wilmington, DE (US)

(72) Inventors: Timothy Meschke, Carver, MN (US); Matthew Olsen, Bloomington, MN (US); Rory Shanahan, Lakeville, MN (US)

(73) Assignee: Sonny's HFI Holdings, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/186,712

(22) Filed: Apr. 23, 2025

(65) Prior Publication Data

US 2025/0334182 A1 Oct. 30, 2025

Related U.S. Application Data

(60) Provisional application No. 63/639,011, filed on Apr. 26, 2024, provisional application No. 63/639,013,
(Continued)

(51) Int. Cl.
*F04B 13/00* (2006.01)
*B01F 23/40* (2022.01)
(Continued)

(52) U.S. Cl.
CPC .............. *F04B 13/00* (2013.01); *B01F 23/49* (2022.01); *B01F 35/833* (2022.01);
(Continued)

(58) Field of Classification Search
CPC .... B08B 3/10; B08B 3/08; B08B 3/04; B08B 3/02; B08B 13/00; B01F 35/833;
(Continued)

(56) References Cited

U.S. PATENT DOCUMENTS 1,337,982 A * 4/1920 Eilers .................... F04B 53/123 92/194
3,288,072 A * 11/1966 Mckenzie ............... F04B 13/00 92/60
(Continued)

FOREIGN PATENT DOCUMENTS

CA 2120504 A1 6/1993
CA 1325464 C 12/1993
(Continued)

OTHER PUBLICATIONS

International Search Report and Written Opinion dated Nov. 21, 2025 in connection with International Patent Application No. PCT/US2025/025896, 13 pages.
(Continued)

*Primary Examiner* — David Colon-Morales
(74) *Attorney, Agent, or Firm* — Dorsey & Whitney LLP

(57) ABSTRACT

Chemical delivery devices for vehicle wash systems include a chemical chamber with an inlet and an outlet and a piston arranged therebetween. The piston includes a one-way valve. A drive mechanism moves the piston in an advancing and retracting direction. Driving the piston in the advancing direction results in the one-way valve closing, and an amount of the chemical on a first side of the piston is dispensed from the outlet and a corresponding amount of the chemical to the amount dispensed is drawn into the chemical chamber at a second side of the piston, via the inlet. Retracting the piston in the retracting direction results in the one-way valve opening and the corresponding amount of the chemical drawn in from the chemical supply is transmitted through the one-way valve from the second side to the first side of the piston for subsequent dispensing from the chemical chamber.

20 Claims, 28 Drawing Sheets

Related U.S. Application Data filed on Apr. 26, 2024, provisional application No. 63/639,060, filed on Apr. 26, 2024, provisional application No. 63/639,070, filed on Apr. 26, 2024, provisional application No. 63/639,056, filed on Apr. 26, 2024, provisional application No. 63/639,059, filed on Apr. 26, 2024, provisional application No. 63/639,065, filed on Apr. 26, 2024, provisional application No. 63/639,019, filed on Apr. 26, 2024, provisional application No. 63/639,046, filed on Apr. 26, 2024, provisional application No. 63/639,068, filed on Apr. 26, 2024, provisional application No. 63/639,050, filed on Apr. 26, 2024, provisional application No. 63/639,053, filed on Apr. 26, 2024, provisional application No. 63/639,040, filed on Apr. 26, 2024, provisional application No. 63/639,024, filed on Apr. 26, 2024, provisional application No. 63/639,026, filed on Apr. 26, 2024.

(51) Int. Cl.

| | |
|---|---|
| ***B01F 35/83*** | (2022.01) |
| ***B05B 12/14*** | (2006.01) |
| ***B05C 5/02*** | (2006.01) |
| ***B05C 11/10*** | (2006.01) |
| ***B08B 3/02*** | (2006.01) |
| ***B08B 3/08*** | (2006.01) |
| ***B08B 3/10*** | (2006.01) |
| ***B08B 13/00*** | (2006.01) |
| ***B60S 3/00*** | (2006.01) |
| ***B60S 3/04*** | (2006.01) |
| ***F16K 1/12*** | (2006.01) |
| ***F16K 1/52*** | (2006.01) |
| ***F16K 11/22*** | (2006.01) |
| ***F16K 31/02*** | (2006.01) |
| ***F16K 31/06*** | (2006.01) |
| ***F16K 31/122*** | (2006.01) |
| ***F16K 37/00*** | (2006.01) |
| ***G06F 16/2457*** | (2019.01) |

(52) U.S. Cl.
CPC ............ *B05B 12/1436* (2013.01); *B05C 5/02* (2013.01); *B05C 11/1036* (2013.01); *B08B 3/02* (2013.01); *B08B 3/08* (2013.01); *B08B 3/10* (2013.01); *B08B 13/00* (2013.01); *B60S 3/00* (2013.01); *B60S 3/04* (2013.01); *F16K 1/12* (2013.01); *F16K 1/523* (2013.01); *F16K 11/22* (2013.01); *F16K 31/02* (2013.01); *F16K 31/0655* (2013.01); *F16K 31/1221* (2013.01); *F16K 37/0016* (2013.01); *F16K 37/005* (2013.01); *G06F 16/24575* (2019.01); *B08B 2203/0217* (2013.01); *B08B 2203/027* (2013.01)

(58) Field of Classification Search
CPC .......... B05B 12/1436; B60S 3/04; B60S 3/00; F16K 1/12; F16K 15/148; F16K 15/144; F04B 13/00; F04B 53/1062; F04B 53/1065; F04B 53/123
See application file for complete search history.

(56) References Cited

U.S. PATENT DOCUMENTS 3,756,456 A 9/1973 Georgi
3,785,526 A * 1/1974 Shinn .................... G01F 11/029 222/14
3,788,344 A 1/1974 Dyck
3,891,149 A * 6/1975 Rendemonti ........... B60S 3/008 239/312
3,918,489 A 11/1975 Foster et al.
4,249,868 A * 2/1981 Kotyk ................... F04B 19/022 417/511
4,257,527 A 3/1981 Snyder et al.
4,461,450 A 7/1984 Soland et al.
4,586,531 A 5/1986 Lindell
4,588,163 A 5/1986 Christensen
4,687,181 A 8/1987 Simonelli et al.
4,691,850 A 9/1987 Kirschmann et al.
4,715,791 A * 12/1987 Berlin ..................... F04B 13/00 417/568
4,874,014 A 10/1989 Grant et al.
5,106,275 A * 4/1992 Santi ....................... F04B 13/00 417/403
5,203,366 A 4/1993 Czeck et al.
5,305,788 A 4/1994 Mayeux
5,441,392 A * 8/1995 Lundback ............... F04B 43/04 417/479
5,803,122 A * 9/1998 Theilmeier ......... F04B 53/1065 417/571
5,876,189 A * 3/1999 Lukas ..................... F04B 13/00 417/399
5,971,723 A * 10/1999 Bolt ........................ F04B 13/00 137/856
5,996,629 A 12/1999 Sato et al.
6,113,007 A 9/2000 Bagnara et al.
6,192,932 B1 2/2001 Izumo et al.
6,240,953 B1 6/2001 Laughlin et al.
6,250,502 B1 * 6/2001 Cote ..................... F04B 43/067 222/1
6,360,138 B1 3/2002 Coppola et al.
6,419,462 B1 * 7/2002 Horie .................... F04B 43/073 417/394
6,478,547 B1 * 11/2002 Savard .................. F04B 7/0266 222/61
6,517,891 B1 * 2/2003 Estelle .................... F04B 49/20 427/424
6,619,321 B2 9/2003 Reid et al.
6,718,216 B2 4/2004 Grier
6,769,666 B2 8/2004 Hall et al.
6,837,269 B2 1/2005 Reinelt et al.
6,874,537 B2 4/2005 Hayashi et al.
7,007,828 B2 * 3/2006 Speight ................... F04B 23/02 222/481.5
7,045,021 B2 * 5/2006 Ewing ....................... B08B 3/00 134/123
7,070,159 B2 7/2006 Kajitani
7,090,190 B2 * 8/2006 Yasue ....................... F16K 7/17 251/285
7,117,886 B2 10/2006 Kajitani et al.
7,861,740 B2 1/2011 Phallen et al.
8,136,441 B2 3/2012 Darbois et al.
8,163,096 B2 4/2012 Belanger et al.
8,210,493 B2 7/2012 Miyagawa et al.
8,262,058 B2 9/2012 Kot
8,292,264 B2 10/2012 Hoffmann et al.
8,322,367 B2 12/2012 Harris et al.
8,511,513 B2 * 8/2013 Schultz ................... F04B 23/06 222/137
8,527,372 B2 * 9/2013 Sanville .................... B60S 3/00 705/28
8,641,830 B2 2/2014 Molitor et al.
8,678,237 B2 3/2014 Harris et al.
8,807,158 B2 8/2014 Harris et al.
8,887,743 B2 11/2014 Molitor et al.
8,899,452 B2 12/2014 Takanohashi
9,103,339 B2 * 8/2015 Gammon ................ F04B 13/00
9,353,884 B2 5/2016 Hasunuma et al.
9,389,114 B2 7/2016 Rietsch et al.
9,421,559 B2 8/2016 Cornett et al.
9,421,566 B2 * 8/2016 Harris ................... G01F 23/292
9,643,135 B1 5/2017 Mazzei et al.
9,662,453 B2 * 5/2017 Teutsch ............. A61M 5/31528
9,803,754 B2 10/2017 Thompson
9,932,018 B2 * 4/2018 Krause ................ F16K 31/0675
10,060,537 B2 8/2018 Yanagida et al.

(56) References Cited

U.S. PATENT DOCUMENTS 10,132,415 B2 11/2018 Tanikawa et al.
10,144,396 B1* 12/2018 Krause ........................ B60S 3/04
10,369,294 B2* 8/2019 Abbott .................. F04B 53/123
10,443,747 B2 10/2019 Harris et al.
10,488,244 B1 11/2019 Krause et al.
10,514,028 B2* 12/2019 Imamura ............... F04B 49/065
10,550,944 B2 2/2020 Walter et al.
10,591,446 B2* 3/2020 Nocon ................... G01N 30/32
10,682,989 B2* 6/2020 Blackstock .......... G05D 7/0623
10,730,486 B1 8/2020 Krause et al.
10,767,785 B2 9/2020 Taya et al.
10,883,615 B2 1/2021 Goto et al.
10,890,166 B2* 1/2021 Murakoshi ............ F04B 11/005
10,895,331 B2 1/2021 Enzaki
10,948,261 B2 3/2021 Luke
10,968,901 B2 4/2021 Furet et al.
11,028,808 B2 6/2021 Okamura et al.
11,199,187 B2* 12/2021 Oda ........................ F04B 53/10
11,215,173 B2* 1/2022 Teshima .................. F04B 13/00
11,261,992 B2 3/2022 Tempel
11,337,381 B1 5/2022 Nelson et al.
11,384,864 B2 7/2022 Yamada et al.
11,434,897 B2* 9/2022 Yanagibayashi ........ F04B 49/08
11,518,553 B2* 12/2022 Kleinheinz ............. B65B 3/003
11,635,015 B2 4/2023 Stephens et al.
11,649,907 B2 5/2023 Eurich
11,936,072 B2* 3/2024 Hirai ....................... F04B 13/00
12,018,668 B2* 6/2024 Reinhard ................ F04B 43/02
12,018,672 B2* 6/2024 Heintzelman ......... F04B 43/084
12,031,529 B2* 7/2024 Baeuerle ................. B65B 3/003
12,044,222 B2* 7/2024 Arnold .................... F04B 13/00
12,055,138 B2* 8/2024 Rawlings ................ F04B 13/00
12,055,139 B2* 8/2024 Roberts ..................... F04B 7/06
12,070,765 B2* 8/2024 Post ........................ B01F 25/50
12,092,099 B2* 9/2024 Ogawa .................... F04B 53/00
12,135,046 B2 11/2024 Kang et al.
12,435,814 B2 10/2025 Wagner-stürz
12,611,700 B2* 4/2026 Meschke ................. B01F 23/49
12,623,257 B2* 5/2026 Meschke ............. B05B 12/1436
2004/0220817 A1 11/2004 Sanville et al.
2005/0022814 A1 2/2005 Manhard
2005/0161625 A1* 7/2005 Beh ........................... E03D 3/10
251/122
2008/0046278 A1 2/2008 Sanville et al.
2009/0026220 A1 1/2009 Ramnarine
2009/0088874 A1 4/2009 Arceo et al.
2010/0186778 A1* 7/2010 Martin .................... B08B 3/024
134/113
2011/0052379 A1 3/2011 Link
2011/0192433 A1 8/2011 Harris et al.
2012/0004776 A1 1/2012 Abad
2012/0298035 A1 11/2012 Macneil
2013/0103585 A1 4/2013 Carapelli
2013/0202456 A1* 8/2013 Lucas ..................... F04B 53/00
417/63
2014/0042242 A1 2/2014 Fritze et al.
2016/0037738 A1 2/2016 Kato et al.
2016/0050862 A1 2/2016 Walliser
2016/0185589 A1 6/2016 Uhlhorn et al.
2017/0185092 A1* 6/2017 Mäkinen ................... B60S 3/04
2017/0189868 A1 7/2017 Meyer et al.
2017/0198822 A1 7/2017 Harris et al.
2018/0345918 A1* 12/2018 Foerg ...................... G07F 17/20
2019/0022607 A1 1/2019 Flood
2019/0056977 A1 2/2019 Wang et al.
2019/0061705 A1 2/2019 Blackstock
2020/0022322 A1 1/2020 Lafian
2020/0148175 A1 5/2020 Mayer et al.
2020/0396917 A1 12/2020 Olesen et al.
2021/0053018 A1 2/2021 Dyer
2021/0349482 A1* 11/2021 Martin .................... B08B 13/00
2022/0333584 A1 10/2022 Roberts et al.
2023/0139033 A1 5/2023 Schlueter et al.
2024/0299891 A1 9/2024 Martin et al.
2025/0332554 A1 10/2025 Meschke et al.
2025/0332609 A1 10/2025 Meschke et al.
2025/0332616 A1 10/2025 Meschke et al.
2025/0332617 A1 10/2025 Meschke et al.
2025/0332618 A1 10/2025 Meschke et al.
2025/0332621 A1 10/2025 Meschke et al.
2025/0333026 A1 10/2025 Meschke et al.
2025/0333027 A1 10/2025 Meschke et al.
2025/0333028 A1 10/2025 Meschke et al.
2025/0334183 A1 10/2025 Meschke et al.
2025/0334184 A1 10/2025 Meschke et al.
2025/0334186 A1 10/2025 Meschke et al.
2025/0334187 A1 10/2025 Meschke et al.
2025/0334193 A1 10/2025 Meschke et al.

FOREIGN PATENT DOCUMENTS

CN 209002347 U 6/2019
CN 110588581 A 12/2019
CN 111623852 A 9/2020
CN 112470907 A 3/2021
EP 0255791 B1 12/1989
EP 0631119 A1 12/1994
EP 1795875 B1 10/2008
JP H0761225 B2 7/1995
JP H0785694 B2 9/1995
JP 2556232 Y2 12/1997
JP H10300558 A 11/1998
JP 4242629 B2 1/2009
JP 5196355 B2 2/2013
JP 2022045794 A 3/2022
JP 2022046994 A 3/2022
KR 20150123304 A 11/2015
KR 20160076491 A 6/2016
KR 20170001251 U 4/2017
WO 2008024910 A2 2/2008
WO 2020227822 A1 11/2020

OTHER PUBLICATIONS

"Dosatron CS33 ChemStick With Bung Adaptor, 33 In." Kleen RiteCorp, obtained from <https://www.kleen-ritecorp.com/p-66257-dosatron-cs33-chemstick-with-bung-adaptor-33-in.aspx>.

"Drum Plug Types," Gizmo Engineering, obtained from <https://gizmo-engineering.com/information/technical-information/drum-plug-styles/>.

"How does a dosing pump work?" Dosatron, Ingersoll Rand, https://www.dosatron.com/en-us/technology.

"Spot-On," Spotless Wash Solutions, retrieved Mar. 27, 2024 from <https://spotlesswashsolutions.com/spot-on-chemical-dispensing/>.

"Why Spot-On Chemical Dispensing," Spot-On Control Platform, Spotless Wash Solutions, obtained May 23, 2024 from <https://spotlesswashsolutions.com/wp-content/uploads/2024/05/040424-CC-Spoton-Broch-Gatefold-April-5-HR-OT.pdf>, 2 pages.

Office Action Issued in U.S. Appl. No. 19/186,775, mailed on Jul. 14, 2026, 44 pages,.

* cited by examiner

CHEMICAL DELIVERY DEVICES AND SYSTEMS AND METHODS OF USE

CROSS-REFERENCE TO RELATED APPLICATIONS

This application claims the benefit of U.S. Provisional Patent Application Nos. 63/639,011, 63/639,013, 63/639,019, 63/639,024, 63/639,026, 63/639,040, 63/639,046, 63/639,050, 63/639,053, 63/639,056, 63/639,059, 63/639,060, 63/639,065, 63/639,068, and 63/639,070, all filed Apr. 26, 2024, the contents of each of which are incorporated by reference herein in their entireties.

TECHNICAL FIELD

Vehicle wash components and fluid management systems including such vehicle wash components are provided for use in locations where vehicles are washed.

BACKGROUND

Car washes are often labor, equipment maintenance, and input intensive. In addition, chemicals used in the car wash industry have become increasingly concentrated in order to reduce material handling concerns and shipping costs of those chemicals.

SUMMARY

According to implementations of the present disclosure, a chemical delivery device for use in a vehicle wash system may include: a chemical chamber including a chemical inlet and a chemical outlet; a piston arranged in the chemical chamber between the inlet and the outlet, the piston including a one-way valve and a circumferential seal; and a drive mechanism including a housing joined to the chemical chamber and configured for linearly driving the piston in an advancing direction and in an opposite, retracting direction, where the circumferential seal of the piston maintains a seal against the chemical chamber, and where the drive mechanism is fluidly isolated from the chemical chamber. Upon the drive mechanism driving the piston in the advancing direction, the one-way valve may be in a closed state such that an amount of the chemical on a first side of the piston is dispensed from the outlet and a corresponding amount of the chemical to the amount dispensed is drawn into the chemical chamber from a chemical supply at a second side of the piston, via the inlet. Upon the drive mechanism retracting the piston in the retracting direction, the one-way valve may be in an open state such that the corresponding amount of the chemical drawn in from the chemical supply is transmitted through the one-way valve from the second side to the first side of the piston for subsequent dispensing from the chemical chamber.

In various implementations and alternatives, an adjustable valve may be coupled to the chemical outlet or the chemical inlet. The adjustable valve may be configured to adjust an effective valve orifice area of the chemical outlet or the inlet to simultaneously control the amount of the chemical dispensed from the outlet and the amount of the chemical drawn into the inlet upon the drive mechanism driving the piston in the advancing direction. The adjustable valve may include a valve needle configured to extend into the valve orifice to adjust the effective valve orifice area and control a flow rate of the chemical. The valve needle may include a parabolic tip and movement of the parabolic tip relative to the valve orifice causes a linear adjustment of the flow rate of the chemical. In various implementations, the adjustable valve may include a linear actuator for linearly displacing the valve needle. The linear actuator may be a linear stepper motor or a proportional solenoid.

In various implementations, the one-way valve may be arranged on a head of the piston and includes at least one through hole defined in the piston head and a seal for blocking passage of the chemical along the at least one through hole in one direction. The circumferential seal may surround the piston head. A drive shaft of the drive mechanism may be coupled to the piston head, and the at least one through hole may be arranged about an area of the piston head that couples to the drive shaft. A drive shaft of the drive mechanism may extend between the chemical chamber and the drive mechanism, and one or more seals may surround the drive shaft for fluidly isolating the drive mechanism from the chemical chamber.

In various implementations, a check valve may be arranged at each of the chemical outlet and the chemical inlet, and upon the drive mechanism driving the piston in the advancing direction, pressure opens the check valve arranged at the outlet and vacuum opens the check valve arranged at the inlet, and upon the drive mechanism retracting the piston in the retracting direction, the check valves may be closed to thereby prevent backflow of chemical.

According to other implementations, a chemical delivery device for use in a vehicle wash system may include: a chemical chamber with a chemical inlet at one end and a chemical outlet at an opposite end, the inlet configured to receive chemical from a chemical supply and the outlet configured for dispensing the chemical to a vehicle wash applicator; a piston arranged in the chemical chamber between the inlet and the outlet such that the outlet is on a first side of the piston and the inlet is on an opposite second side of the piston, the piston including a one-way valve and a circumferential seal, the one-way valve configured to have an open state to permit passage of the chemical from the second side to the first side of the piston and to have a closed state to prevent the passage of the chemical from the first side to the second side thereof, the circumferential seal configured to seal against the chemical chamber; and a drive mechanism joined to the chemical chamber and configured for linearly driving the piston towards the outlet and in an opposite direction towards the inlet, where the circumferential seal of the piston maintains a seal against the chemical chamber, and where the drive mechanism is fluidly isolated from the chemical chamber. Upon the drive mechanism driving the piston towards the outlet in a dispensing stroke of a dispensing operation, the one-way valve may be in the closed state such that an amount of the chemical on the first side of the piston is dispensed from the outlet and a corresponding amount of the chemical to the amount dispensed is drawn into the chemical chamber from the chemical supply at the second side of the piston, via the inlet. After the dispensing stroke, upon the drive mechanism driving the piston towards the inlet in a resetting stroke of the dispensing operation, the one-way valve may be in the open state such that the corresponding amount of the chemical drawn in from the chemical supply is transmitted through the one-way valve from the second side to the first side of the piston for dispensing from the chemical chamber in a subsequent dispensing operation.

Methods of delivering chemical from a chemical delivery device in a vehicle wash system according to implementations, may involve: initiating a dispensing stroke of a dispensing operation for dispensing the chemical from a chemical chamber, the chemical chamber including a chemical inlet at one end, a chemical outlet at an opposite end, and a piston arranged between the inlet and the outlet, the piston including a one-way valve and a circumferential seal. During the dispensing stroke, a drive mechanism may drive the piston towards the outlet to dispense an amount of the chemical from the outlet, and the one-way valve may be in a closed state such that a corresponding amount of the chemical to the amount dispensed is drawn into the chemical chamber from a chemical supply via the inlet. The method may further involve initiating a resetting stroke of the dispensing operation, where during the resetting stroke, the drive mechanism retracts the piston towards the inlet and the one-way valve of the piston is in an open state such that the corresponding amount of the chemical drawn in from the chemical supply is transmitted through the one-way valve for dispensing from the chemical chamber in a subsequent dispensing operation. The circumferential seal may maintain a seal between piston and the chemical chamber, and where the drive mechanism is fluidly isolated from the chemical chamber.

In various approaches, the chemical chamber may remain filled during the dispensing operation, and/or the chemical supply may be at atmospheric pressure such that the chemical is drawn into the inlet by vacuum during the dispensing stroke.

Methods may further involve adjusting an effective valve orifice area of the chemical outlet or the chemical inlet such that during the dispensing stroke, the amount of the chemical dispensed from the outlet and the amount of the chemical drawn into the inlet are simultaneously controlled. Adjusting the effective valve orifice area may involve moving a valve needle linearly relative to the valve orifice to linearly adjust the effective valve orifice area and the flow rate of the chemical.

In various approaches, during the resetting stroke, the chemical may be transmitted through at least one through hole of the one-way valve, the at least one through hole defined in a piston head of the piston, and where during the dispensing stroke, the chemical is blocked from passage along the at least one through hole by a seal of the one-way valve covering the at least one through hole.

In addition or alternatively, prior to initiating the dispensing operation, the method may further involve a step of priming the chemical chamber, where the step of priming may include causing the chemical to enter the chemical chamber via the one-way valve, venting air within the chemical chamber via the outlet, and moving the piston to a retracted position and an extended position within the chemical chamber.

At least one machine-readable medium may include instructions that, when executed by processing circuitry, result in the processing circuitry, in response to receipt of a control signal to initiate a dispensing operation, causing a drive mechanism to initiate a dispensing stroke of the dispensing operation for dispensing the chemical from a chemical chamber of the chemical delivery device as provided herein; and causing a resetting stroke of the dispensing operation to be initiated as provided herein.

DETAILED DESCRIPTION

Disclosed are vehicle wash components and fluid management systems including such vehicle wash components.

The vehicle wash components, according to the present disclosure, may include fluid delivery devices including but not limited to chemical delivery devices, motive fluid delivery devices, mixing sites, and assemblies thereof. The vehicle wash components may be configured to receive chemicals and/or fluids from upstream components, such as chemical supplies, motive fluid sources, driving fluid sources, pumps, regulators, electrical supplies, and so on. The received fluids and/or chemicals may be distributed by the vehicle wash components to downstream components such as fluid conduits for subsequent application to vehicles by vehicle wash applicators (e.g., nozzles and foamers) of a vehicle wash system. Control systems may be integrated with the vehicle wash components and/or the fluid management systems. Some control systems may be configured for closed loop control of the vehicle wash components and systems. Vehicle wash systems, e.g., car washes, of the present disclosure may include the vehicle wash components and/or their fluid management systems, alone or in combination with other components, devices and systems for use in vehicle wash system.

Fluids managed and dispensed by the vehicle wash components and fluid management systems include chemicals and motive fluid. Chemicals managed and dispensed may include but are not limited to concentrated chemicals, mixed chemicals, diluted chemicals such as aqueous solutions of diluted chemical in water, water, and other supplies of liquid chemicals for use in vehicle wash systems, e.g., car washes, such as liquid soap, degreasers, detergents, ceramic solutions, waxes, drying agents, fragrances, sealants, tire dressing, window cleaner, protectants.

Motive fluids managed and dispensed may include but are not limited to water, such as pressurized water delivered from a pump, or water delivered from a municipal water source, a reclaimed water source, a water softener or a reverse osmosis system.

Vehicle wash components may be responsible for the delivery of chemical, and in some implementations may be configured as a positive displacement syringe pump.

Syringe Pump

Figure 1A:
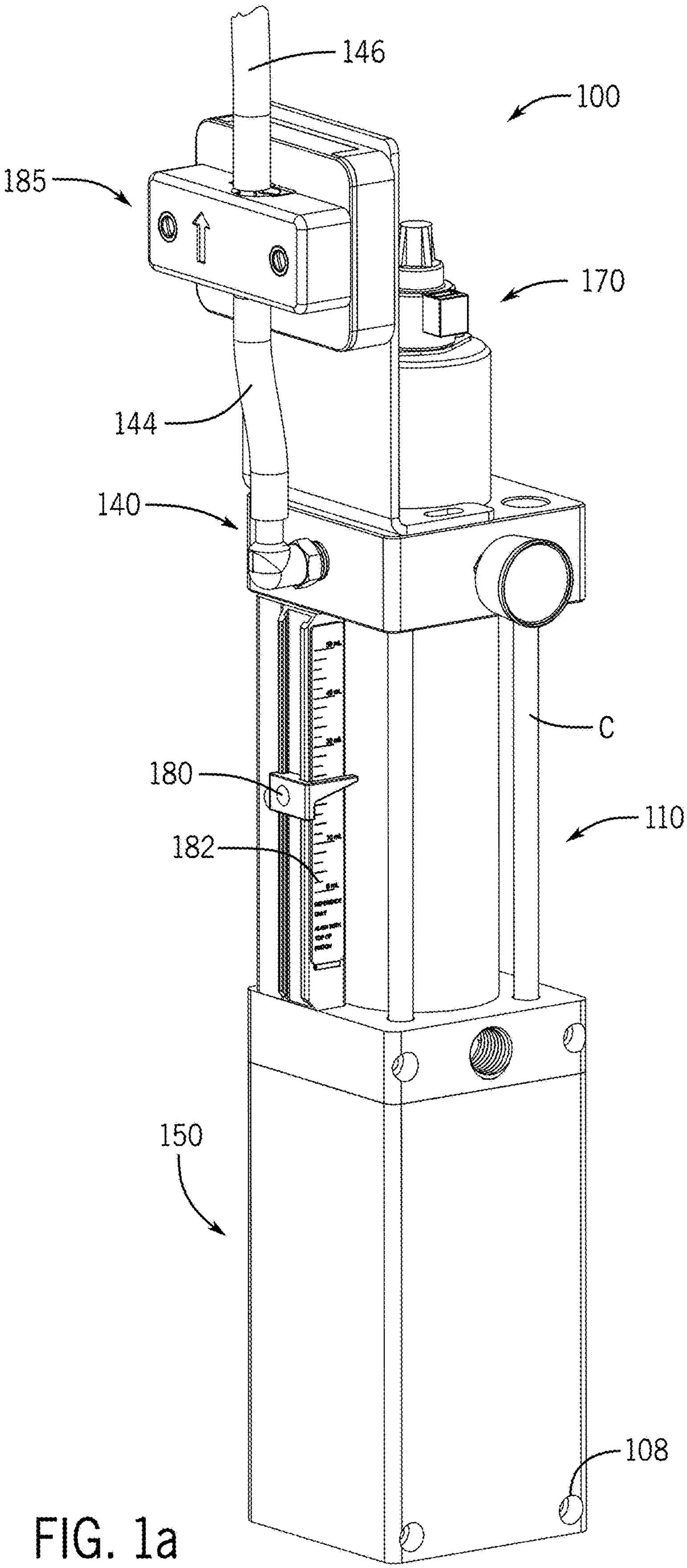
FIG. 1*a* illustrates an isometric view of a chemical delivery device according to the present disclosure.

Referring to FIG. 1*a*, the syringe pump 100 of the present disclosure may be a positive displacement pump in which chemical is drawn-in and pressurized, for instance to several times that of atmospheric pressure, and dispensed or injected into downstream components as provided herein. The syringe pump 100 may be coupled to an actuation source, such as a pressurized fluid supply, e.g., via the valve bank 103 (FIG. 3*a*), may include mounting structures 108 such as feet or fasteners, which may be integrally formed in the syringe pump 100, for securing to various external surfaces and/or objects at a vehicle wash location, such as a common panel 101 (FIG. 3*a*), and may be configured to dispense chemical from a chemical supply.

The syringe pump 100 is a departure from prior approaches by the elimination of venturi-style chemical injection, which relies on vacuum pressure, e.g., suction, for the injection of chemicals into downstream components. In addition, the syringe pump 100 may be configured as a continuous priming syringe pump in which a chemical supply is drawn into the syringe pump 100 during chemical dispensing therefrom, and the drawn-in chemical primes the syringe pump 100 during a resetting thereof.

Turning to FIGS. 1*a*-1*d*, the syringe pump 100 may be an assembly including a chemical chamber 110 with a piston 120, an inlet 130 and an outlet 140, a drive mechanism 150 with a drive shaft 160, an adjustable valve 170, a slider 180, a flow sensor such as a flow meter 185 and/or a linear encoder 186. One or more seals or gaskets, such as seals S1, S2 and S3 (FIG. 1*d*) may provide a fluid tight connection between various components of the syringe pump 100. Seals or gaskets may be formed of materials including but not limited to of fluoroelasomers or other synthetic rubbers such as highly fluorinated Viton™, or Aflas® fluoroelastomers.

The chemical chamber 110 may be a vessel configured to receive and dispense the chemical and may have a single inlet and a single outlet. The chemical chamber may sealingly receive the piston 120 at an internal wall 111 defining a fluid chamber 112 of the chemical chamber 110, which may have a fixed or predetermined volume and a constant cross-section along a longitudinal length. The fluid chamber 112 may be configured to hold chemical therein and be constructed of chemically resistant and/or chemically inert materials such as polymer resins, e.g., polyvinylidene difluoride (PVDF) (Kynar®), polyethylene, polypropylene, other engineered plastics such as polyether ether ketone (PEEK), polybutylene terephthalate (PBT). In some cases an inner lining of the chemical chamber 110 may be formed of chemically resistant material and an outer chamber or tube of the chemical chamber 110 may be formed of pressure bearing material. For example, a clear polycarbonate or PVC outer tube may be lined with a clear fluorinated ethylene propylene (FEP) tube. The chemical chamber 110, or portion thereof, e.g. an upper chemical chamber 112*a* provided herein, may be configured to hold a volume of chemical of about 20 to about 200 ml, such as about 50 to about 100 ml, about 50 ml, 100 ml, 150 ml, 200 ml, or 250 ml, or a hold a volume that is at least slightly larger than a maximum volume of a dispensing stroke of chemical from the chemical chamber 110 during a dispensing operation.

In some implementations, the chemical chamber 110 may be transparent and may permit a user to view the chemical being dispensed from and replenished into the chemical chamber 110 as well as the operation of the piston 120. At a proximal or inlet end, the fluid chamber 112 may be sealed by a first plug 113, which may be configured with an internal circumference for slidably receiving the drive shaft 160, and with an external circumference for sealing against the internal wall 111 of the fluid chamber 112, e.g., via one or more seals or gaskets. The first plug 113 may define a portion of the inlet 130 as provided herein. A distal or outlet end of the fluid chamber 112 may be sealed with a second plug 114, which second plug 114 may be configured with one or more egress channels 115 for receiving chemical during dispensing, and with an external circumference for sealing against the internal wall 111 of the fluid chamber 112. In some implementations, the second plug 114 may define a portion of the adjustable valve 170 provided herein.

Figure 1B:
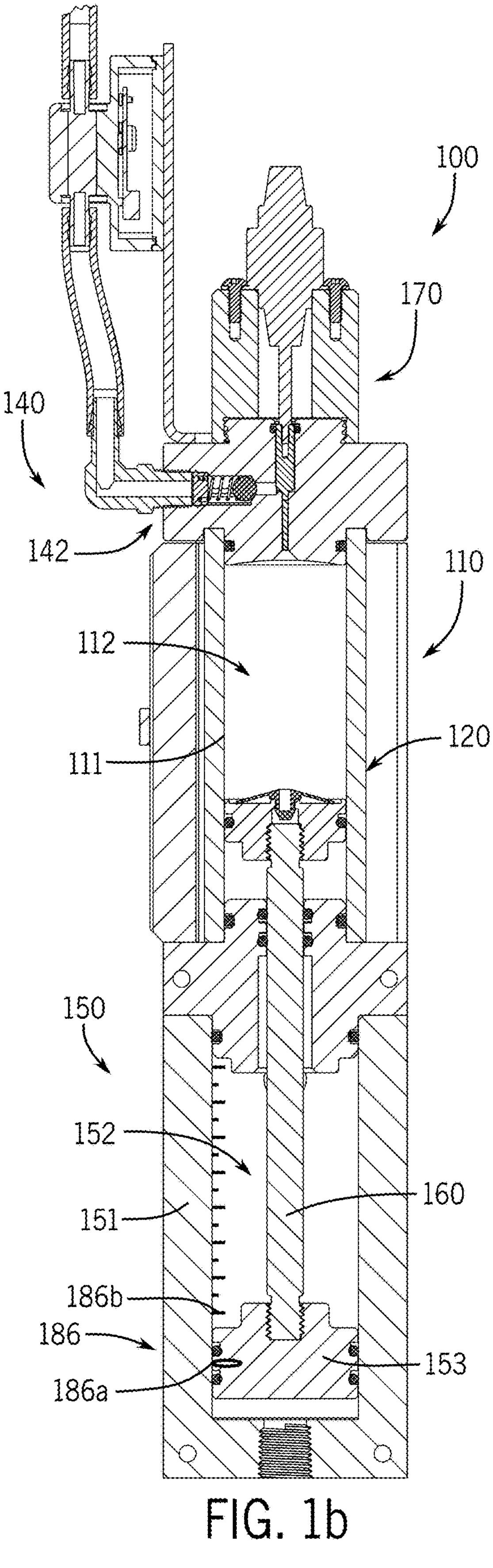
FIG. 1*b* illustrates a cross-sectional view of the chemical delivery device in FIG. 1*a* through the outlet.
Figure 1C:
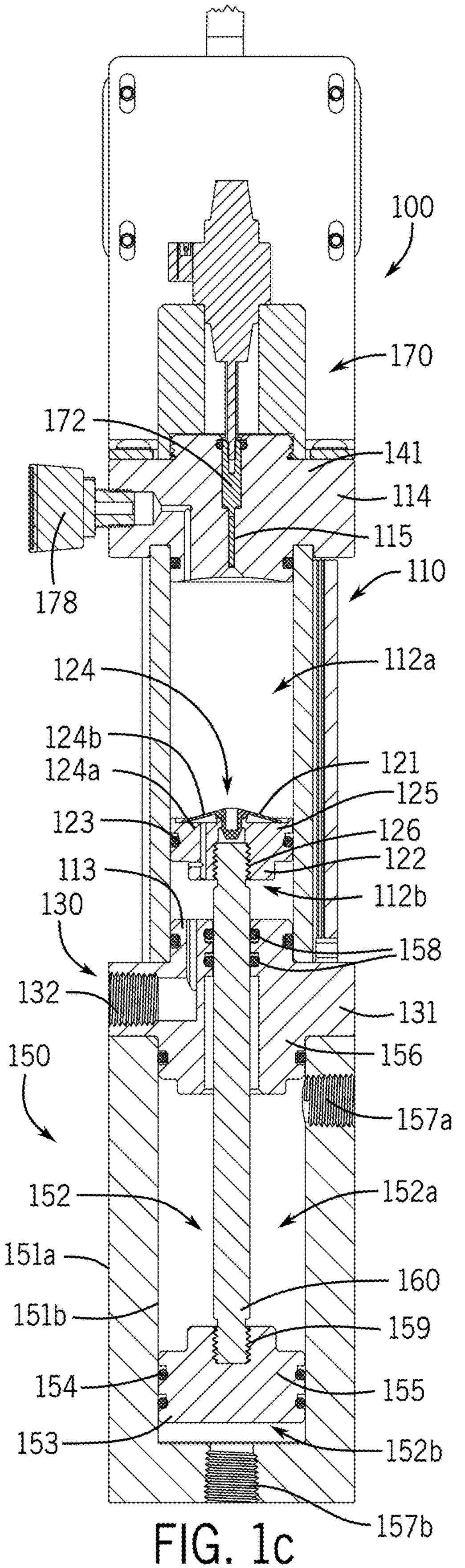
FIG. 1*c* illustrates another cross-sectional view of the chemical delivery device in FIG. 1*a* through the inlet.
Figure 1D:
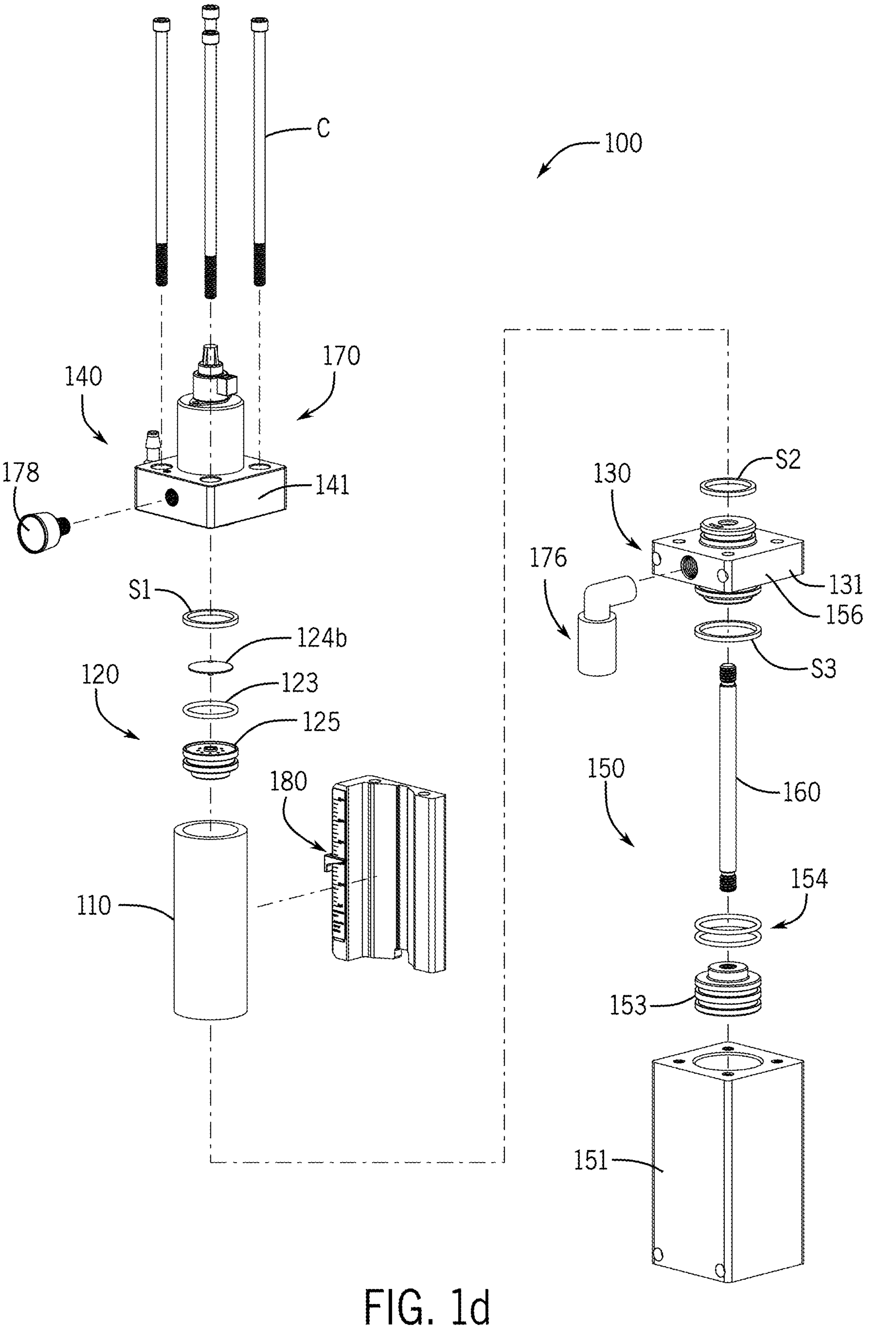
FIG. 1*d* illustrates an exploded view of the chemical delivery device of FIG. 1*a;*

The piston 120 may seal against the internal wall 111 of the fluid chamber 112, and may be configured to be movable bi-directionally along the longitudinal length of the fluid chamber 112. In FIGS. 1*a*, 1*b*, and 1*c*, the piston 120 may be movable between the proximal inlet 130 and the distal outlet 140 of the chemical chamber 110, and the outlet 140 may be on a first side 121 of the piston 120 and the inlet 130 may be on a second side 122 of the piston 120 opposite the first side 121. Pistons of the present disclosure may be formed of chemically resistant materials, which may be the same materials used to form the gaskets and seals provided herein.

Figure 1E:
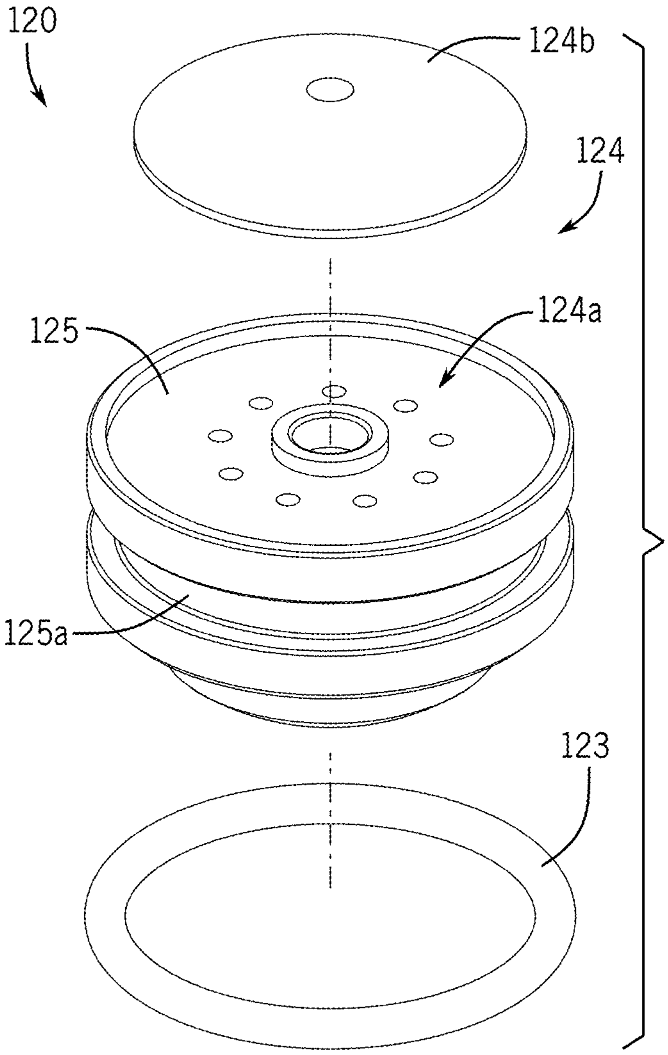
FIG. 1*e* is a top, left isometric, exploded view of the piston of the chemical delivery device of FIG. 1*a;*
Figure 1F:
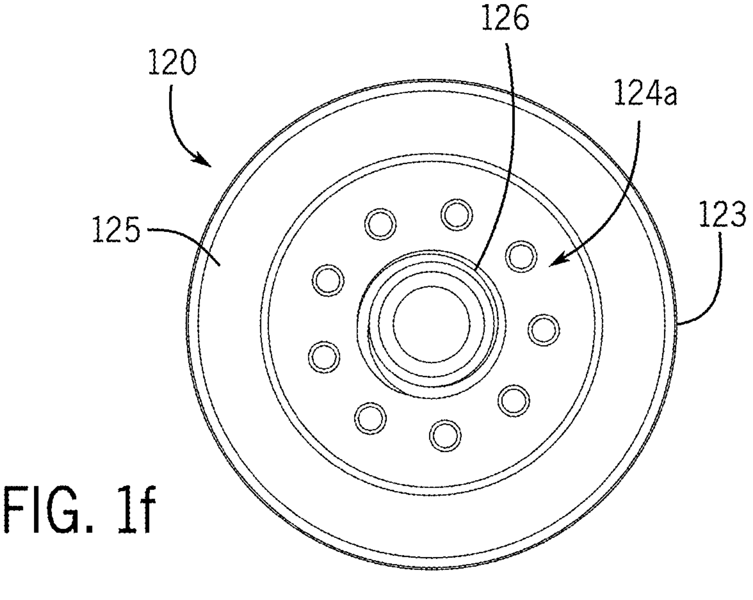
FIG. 1*f* is a bottom view of the piston assembly of the chemical delivery device of FIG. 1*a;*

A circumferential seal 123 may surround an external wall of the piston 120 and may seal against an internal circumference of the fluid chamber 112 to prevent passage of chemical between the circumferential seal 123 and the chemical chamber 110. As shown in FIGS. 1*c* and 1*e*, the circumferential seal 123 may surround a head or body 125 of the piston 120. For instance, the body 125 may define a recess 125*a* in which the circumferential seal 123 is retained, and when arranged in the recess 125*a*, the outer circumference of the circumferential seal 123 may be slightly larger than an outer circumference of the body 125 as shown in FIG. 1*f*. The circumferential seal 123 may maintain a seal between the fluid chamber 112 and the piston 120 throughout operation of the piston 120.

A one-way valve 124 may be provided in the chemical chamber 110, such as in the head or body 125 of the piston 120 and may permit passage of chemical from the second side 122 to the first side 121 of the piston 120 and prevent the passage of chemical from the first side 121 to the second side 122 thereof. The one-way valve 124 may be configured as a liquid piston check valve and be oriented to allow chemical to pass from the lower chemical chamber 112*b* to the upper chemical chamber 112*a*, and prohibit flow in the opposite direction. In the embodiment shown in FIGS. 1*b* to 1*f*, the one-way valve 124 is an umbrella valve with a plurality of through holes 124*a* defined in the head 125 of the piston 120 and a seal 124*b* of the one-way valve 124 blocks passage of chemical through the through holes 124*a* in one direction. As shown in FIG. 1*e*, the one-way valve 124 may receive the seal 124*b* at an upper face of the piston head 125 and may be flexible so as to permit chemical to pass through the egresses of the through holes 124*a* defined in the upper face during retraction or resetting of the piston 120, and move to a closed position during an advancing or dispensing movement of the piston 120. As shown in FIG. 1*f*, the lower face of the piston head 125 may define ingresses of the through holes 124*a* so as to permit chemical to enter the through holes 124*a* during such retraction or resetting position 120. Although nine through holes 124*a* are depicted in the one-way valve 124, more or fewer through holes may be provided and may have varying shapes and dimensions, and the configuration may be selected to allow various types of chemicals having various viscosities to pass through during resetting of the piston 120. For instance, at least one through hole 124*a* may be provided with a selected size, e.g., based on the chemicals and viscosities to be received therethrough, which may include one, two, three, four, five, six, seven, eight or more through holes. The umbrella valve is one type of one-way valve or check valve, and other check valve types may include but are not limited to: a flapper check valve, a duck bill check valve, a ball check valve or a poppet check valve. In other configurations, the circumferential seal 123 may be configured to serve as a check valve and for instance may circumferentially seal against the fluid chamber 112 and the piston 120 during dispensing and may permit passage of chemical during resetting.

The piston head 125 of the piston 120 may include a coupler 126 such as a threaded bore (e.g., FIGS. 1*c* and 1*f*) or a threaded projection for coupling with the drive shaft 160. The coupler 126 may be arranged along the longitudinal axis of the piston 120 to facilitate the linear movement of the assembly of the piston 120 and drive shaft 160. Where a plurality of through holes 124*a* of the one-way valve 124 are provided, these may be arranged concentrically about the area of the piston head 125 that couples to the drive shaft 160.

The inlet 130 of the chemical chamber 110 may be configured to be fluidly coupled to a chemical supply and receive chemical therefrom and may be referred to as a chemical inlet. The inlet 130 may include an inlet body 131 defining an inlet port 132 extending between an exterior of the syringe pump 100 and an interior of the fluid chamber 112 and may be configured to draw-in chemical from a fluid supply. The inlet port 132 may include a coupler, such as threads, barbs or a coupling (e.g., L-shaped coupler with barbs and/or threads), and may be configured to be fluidly connected to fluid conduits of a chemical supply or other upstream components. The inlet port 132 may provide the chemical to the lower chemical chamber 112*b* of the fluid chamber 112. In some implementations, the inlet body 131 and the first plug 113 of the chemical chamber 110 may be unitarily formed.

The outlet 140 of the chemical chamber 110 may configured to be fluidly coupled to downstream components for facilitating vehicle wash operations, such as components of a corresponding fluid management system of the present disclosure, and may be referred to as a chemical outlet. The outlet 140 may receive chemical from the fluid chamber 112, for instance via the adjustable valve 170 configured to adjust a valve orifice size and thus an amount of chemical dispensed from the outlet 140. The outlet 140 may include an outlet body 141 defining an outlet port 142 (FIG. 1*b*) extending between an exterior of the syringe pump 100 and an interior of the fluid chamber 112 and may be configured to dispense the chemical from the fluid chamber 112. The outlet port 142 may include a coupler as provided herein for fluidly connecting to downstream fluid conduits. In some implementations, the outlet body 141 and the second plug 114 of the chemical chamber 110 may be unitarily formed.

Figure 1G:
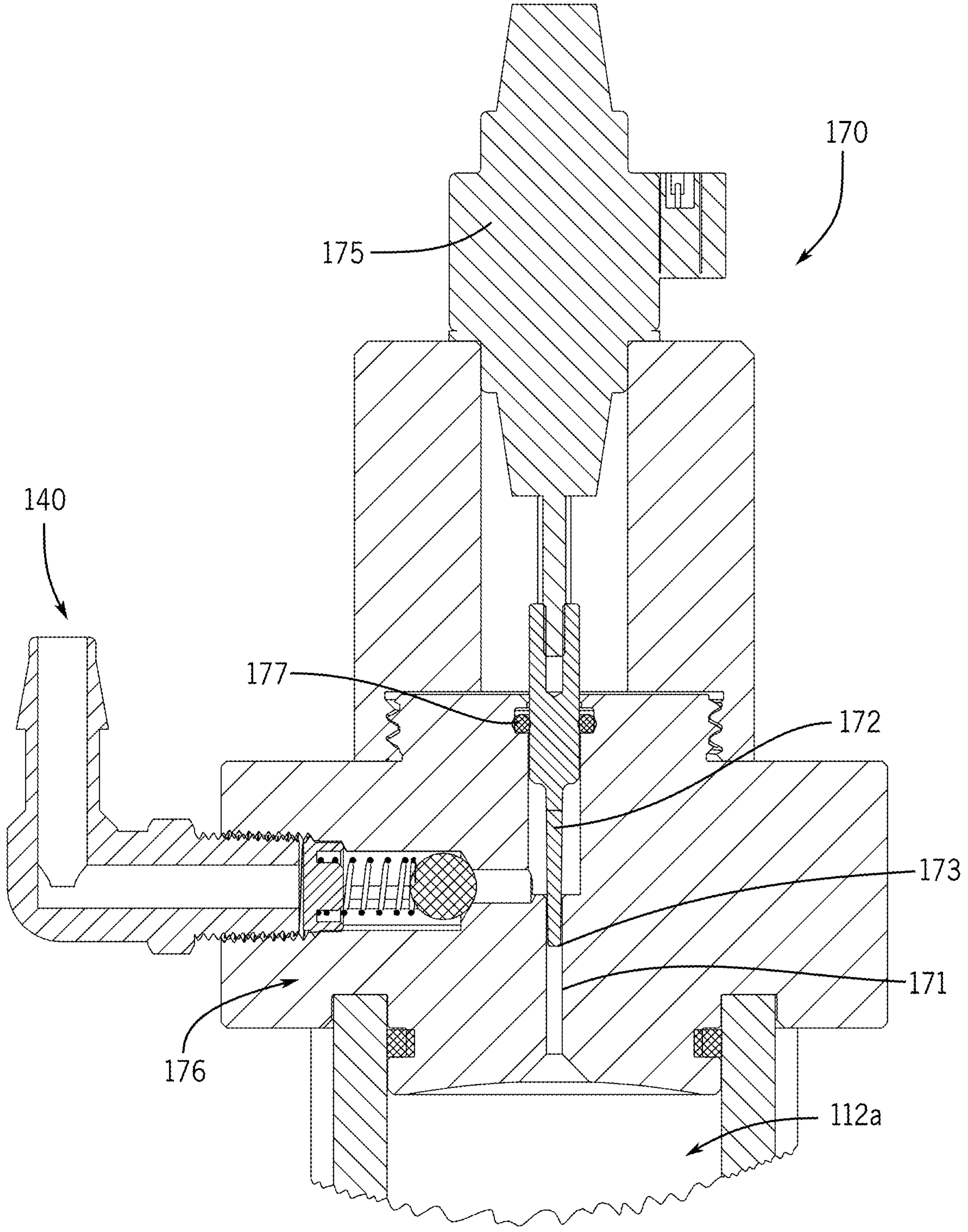
FIG. 1*g* is a detail view of an adjustable valve of the chemical delivery device of FIG. 1*a;*
Figure 1H:
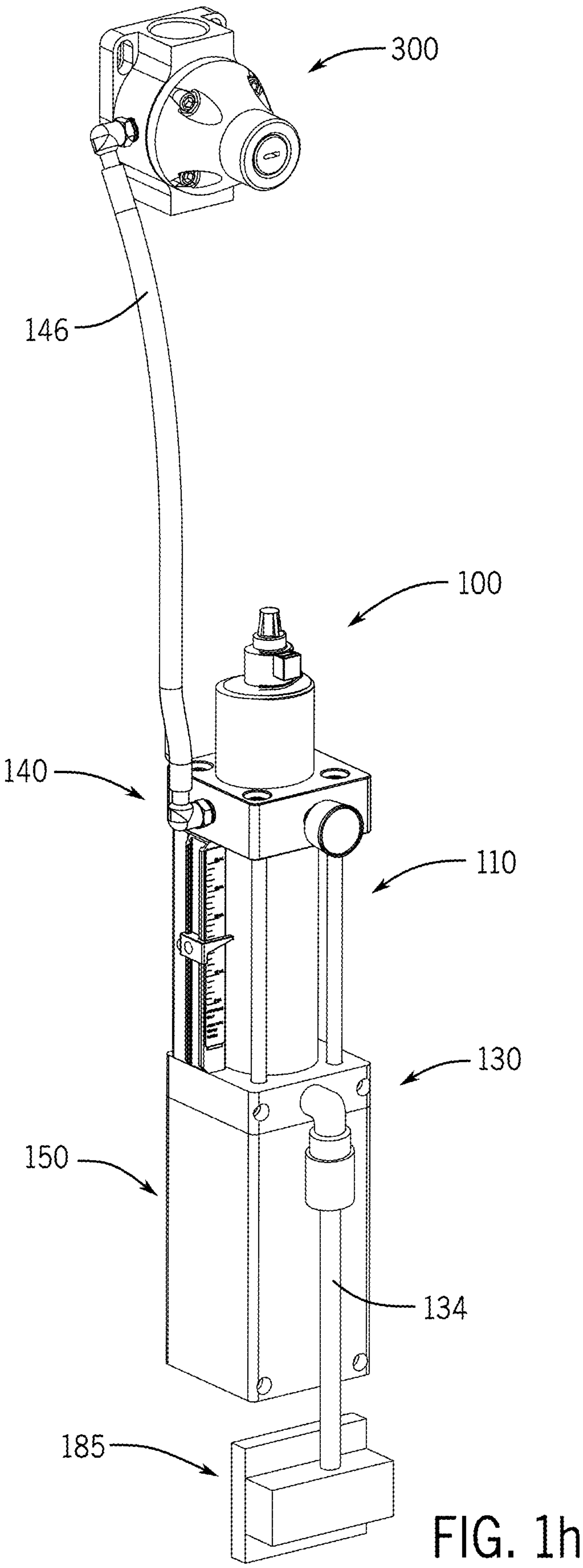
FIG. 1*h* illustrates an isometric view of the chemical delivery device of FIG. 1*a* coupled to a loading valve.

At either or both of the inlet 130 and the outlet 140 of the chemical chamber 110, the syringe pump may include a check valve, e.g., check valve 176 (FIGS. 1*g* and 1*h*). The check valve(s) may open when the piston 120 is driven in the advancing or dispensing direction, where pressure in the fluid chamber 112*a* opens the check valve arranged at the outlet 140, and/or vacuum opens the check valve arranged at the inlet 130. The check valve(s) may close when the piston 120 is retracted or moved in a resetting stroke to thereby prevent backflow of chemical at such port or ports. The check valves may prevent backflow of chemical when the drive mechanism 150 is in the idle state or when the drive mechanism 150 causes one-way valve 124 to open (e.g., causes the piston 120 to move in the proximal direction during priming of the upper chemical chamber 112*a*) during the resetting stroke. The check valve(s) at these ports of the chemical chamber 110 may have a configuration that differs from the one-way valve 124 arranged in the chemical chamber 110, and for instance may be configured as ball check valves (FIG. 1*g*), whereas the one-way valve 124 may be configured as an umbrella valve or any other suitable valve configuration disclosed herein.

The drive mechanism 150 may be configured to drive the piston 120 towards and away from the proximal and distal ends of the chemical chamber 110, e.g., the drive mechanism 150 may move the piston 120 bi-directionally. In FIGS. 1*a*-1*d*, the drive mechanism 150 may define a housing 151 including an external wall 151*a* and an internal wall 151*b* defining a drive chamber 152 (FIGS. 1*b*, 1*c*), a piston 153, a circumferential seal 154 surrounding a body 155 of the piston 153, a plug 156, ports 157*a*, 157*b*, and one or more seals 158 isolating the drive mechanism from the chemical chamber.

The housing 151 of the drive mechanism 150 may be configured be coupled to the chemical chamber 110 and house various components of the drive mechanism 150. For instance, the housing 151 may be coupled directly to the chemical chamber 110 or via the inlet body 131 and/or plug 156. In some implementations, couplers C such as threaded tie rods may couple the drive mechanism housing 151 to the chemical chamber 110, and with reference to FIGS. 1*a* and 1*d*, the couplers C may be received through openings defined in the outlet body 141 and/or plug 114 and the inlet body 131 and/or plugs 113, 156 with the chemical chamber 110 arranged therebetween, and the couplers C may be threadedly engaged with the drive mechanism housing 151.

The drive chamber 152 of the housing 151 of the drive mechanism 150 may have a fixed volume and a constant cross-section along a longitudinal length, which may enable a seal to be maintained between the drive chamber 152 and a piston 153 of the drive mechanism 150 throughout operation of the drive mechanism 150. For example, the drive chamber 152 may have a barrel or circular shape, and the piston 153 may have a complementary shape thereto with the circumferential seal 154 surrounding the body 155. The piston body 155 may include a coupler 159 such as a threaded bore (FIG. 1*c*) or a threaded projection for coupling with the drive shaft 160. The coupler 159 may be arranged along the longitudinal axis of the piston 153 to facilitate the linear movement of the assembly of the piston 153, the drive shaft 160 and the piston 120. The drive chamber 152 may be configured to receive driving fluid such as compressed air or compressed liquid, e.g., the drive mechanism 150 may be pneumatic or hydraulic, and may be divided into an upper cavity 152*a* and a lower cavity 152*b* by the piston 153 and as such the chambers 152*a*, 152*b* may have a variable volume during operation of the syringe pump 100, while the drive chamber 152 has a fixed volume divided between the upper and lower cavities. The drive chamber 152 may be sealed at an upper or proximal end by a plug 156, which may be configured with an internal circumference for slidably receiving the drive shaft 160, and with an external circumference for sealing against the internal wall 151*b* of the drive chamber 152, e.g., via one or more seals or gaskets. In some implementations, the plug 156 of the drive mechanism 150 may be formed unitarily with the inlet body 131 of the inlet 130 and the first plug 113 of the chemical chamber 110. The chambers 122, 152 of the chemical chamber 110 and the drive mechanism 150 may be isolated from each other by the one or more seals 158 such as a series of dynamic gaskets or O-rings arranged in the plug 156 and/or the inlet body 131 and/or the plug 113 of the chemical chamber 110. The drive chamber 152 may include an upper or distal pneumatic port 157*a* fluidly coupled to the upper cavity 152*a*, and a lower or proximal pneumatic port 157*b* fluidly coupled to the lower cavity 152*b*. Such ports of the drive mechanism 150 may include a coupler as provided herein for fluidly connecting to a supply of driving fluid (e.g., compressed air or liquid). In FIGS. 1*a*-1*d*, the chemical chamber 110 and the drive mechanism 150 may be arranged along a longitudinal axis of the syringe pump 100 and the chambers 122, 152 may be fixed relative to each other.

In alternative configurations, the drive chamber 152 may be integral with the plug 156, e.g., may define a single component, and a plug may be located on the bottom of the drive chamber 152 proximate the lower pneumatic port 157*b*, which for instance may facilitate installation of the piston 153 or servicing.

In FIGS. 1*a*-1*d*, the drive shaft 160 of the drive mechanism 150 may be joined to the piston 120 of the chemical chamber 110 and may drive the piston 120 in a first direction towards the outlet 140 and may drive or otherwise cause the piston 120 to move in a second direction opposite the first direction towards the inlet 130. For instance, the drive shaft 160 may be joined between the piston 120 of the chemical chamber 110 and the piston 153 of the drive mechanism 150 and may cause the piston 120 to be slaved in movement as the piston 153 is driven during operation of the drive mechanism 150. The drive shaft 160 may be slidably arranged in the syringe pump 100 and slide in the proximal and distal directions of the chemical chamber 110 and the drive mechanism 150. In some implementations, the drive shaft 160 may be non-rotatable and include a linear guide such as a longitudinal groove or splines configured to receive a guide or splines of the plug 156 for linearly guiding the drive shaft 160 during operation of the drive mechanism 150. In additional or alternative configurations, the drive shaft 160 may be threaded, for instance where the drive mechanism 150 includes a mechanical drive configured to drive the drive rod 160 during operation such as via a threaded engagement with a rotational drive sleeve or nut. In certain configurations, the drive shaft 160 may be configured to be linearly driven and guided via a longitudinal guide and include threading for being driven by the rotatable drive sleeve. Alternatively, the drive sleeve may be linearly driven and linearly drive the piston 120. The one or more seals 158 may surround the drive shaft 160 for fluidly isolating the drive mechanism 150 from the chemical chamber 110.

With reference to FIG. 1*g*, the adjustable valve 170 may include a valve orifice 171, valve needle 172, a linear stepper motor 175, an upper check valve 176, and a valve needle gasket 177. In some implementations, the valve orifice 171 may be the same as the one or more egress channels 115 of the second plug 114. The valve orifice 171 may be fluidly coupled to the outlet port 142 of the outlet 140, and the valve needle 172 may be movably arranged in the valve orifice 171 upon actuation of the stepper motor to adjust the size of an effective valve orifice area of the valve orifice 171 as provided herein. The upper check valve 176 may be arranged between the valve orifice 171 and the outlet port 142 and may prevent backflow of chemical into the fluid chamber 112. In addition or alternatively, a lower check valve 176 (FIGS. 1*d* and 1*h*) may be arranged at the inlet port 132 and may prevent backflow of chemical from the fluid chamber 112.

A pressure gauge 178 configured as a pressure sensor (FIG. 1*c*) may optionally be provided to measure the fluid pressure within the upper chemical chamber 112*a*.

The slider 180 may slide up and down (e.g., manually by hand or mechanically by being attached to the drive mechanism) along the longitudinal length of the chemical chamber 110 and point to a position on a graduated volumetric scale 182 to serve as a reference for a user to visually confirm an amount of chemical dispensed from the syringe pump 100 per dispensing stroke of a dispensing operation is at the desired amount. For instance, the user may confirm the end of a dispensing stroke corresponds to the position of the slider 180 along the scale 182.

The liquid flow meter 185 may be one type of flow sensor that may be used according to various implementations. The flow meter 185 may be used to derive a fluid flow rate or volume. Information from the flow meters may be used to calculate or determine flow rates by the control system 400 for instance based on voltage readings, voltage current readings, pulse counts or flow values from the flow meters. The flow meter 185 may be coupled to a fluid line of a vehicle wash component of the present disclosure and configured to measure the flow rate of the fluid therethrough. The liquid flow meter 185 may be a positive displacement flow meter; however the flow meter 185 may also be another type such as an ultrasonic flow meter, a thermal mass flux type flow meter, a turbine flow meter, etc. The flow meter 185 may be configured to measure liquid flow rate continuously, such as during each operational cycle or portion thereof, e.g., dispensing stroke. The flow meter 185 may be communicatively coupled to a control system 400 (FIG. 3*a*) and for instance may transmit flow rate data thereto. Due to configurations of the syringe pump 100, which simultaneously draws in an equal amount of chemical as what is being dispensed as provided herein, the flow meter 185 may be positioned at the outlet 140 (FIG. 1*a*) or the inlet 130 (FIG. 1*h*) of the chemical chamber 110. In examples, and with reference to FIG. 1*h*, the chemical drawn into the inlet 130 of the syringe pump 100 may first pass through the flow meter 185 for sensing the flow of chemical entering the syringe pump 100. The flow meter 185 may be fluidly coupled to the inlet 130 via a chemical inlet tube 134. Positioning at the inlet 130 may be advantageous since the flow meter 185 may experience only vacuum and not pressure, and may additionally allow for the shortening or elimination of one or more chemical outlet tubes thereby shortening the distance which the pressurized chemical travels. However, the flow meter 185 may be positioned at the outlet 140 of the syringe pump 100 and fluidly coupled via the outlet tube 144 and function to sense flow of chemical dispensed from the syringe pump 100 as shown in FIG. 1*a*. The flow meter 185 may be communicatively coupled to the control system 400 as provided herein. Alternatively, in embodiments in which the chemical flow information is derived from the use of a linear position feedback system (e.g., a linear encoder 186) coupled a the piston and drive shaft assembly (e.g., the assembly of the pistons 120, 153 and the drive shaft 160), the flow meter 185 may not be necessary, and the chemical may proceed to downstream component such as the upper chemical outlet tube 146 and/or a mixing or delivery site such as a loading valve 300, and/or a vehicle wash applicator 620 of the vehicle wash system 602 of FIG. 4*b*.

A linear encoder 186 (FIG. 1*b*), e.g., a linear position feedback system, is another type of flow sensor that may be used according to various implementations. The linear encoder 186 may be used to derive a fluid flow rate or volume. The linear encoder 186 may include a sensor 186*a* configured to sense each of a series of gradations 186*b*. For instance, the sensor 186*a* may be coupled to a piston and drive shaft assembly such as one of the pistons 120, 153 or the drive shaft 160 of the syringe pump 100, and the gradations 186*b* may be arranged along a length of the drive chamber 152 or the chemical chamber 110. The gradations may be constructed of metal (e.g., configured as a metal scale) and the sensor may be configured with a magnet configured to sense the gradations. Each gradation may correspond to a predefined volume of chemical dispensed, and the gradations may be evenly spaced. The linear encoder 186 may be used to determine the linear displacement of the drive shaft 160, which corresponds to a predetermined volume of chemical dispensed from the chemical chamber 110 for determining the flow rate of chemical dispensed from the syringe pump 100. The linear encoder 186 may be communicatively coupled to the control system 400 (FIG. 3*a*) and for instance may transmit linear displacement data thereto. Based on the linear displacement information, the control system 400 may determine a flow rate of the chemical dispensed from the syringe pump 100.

Figure 1I:
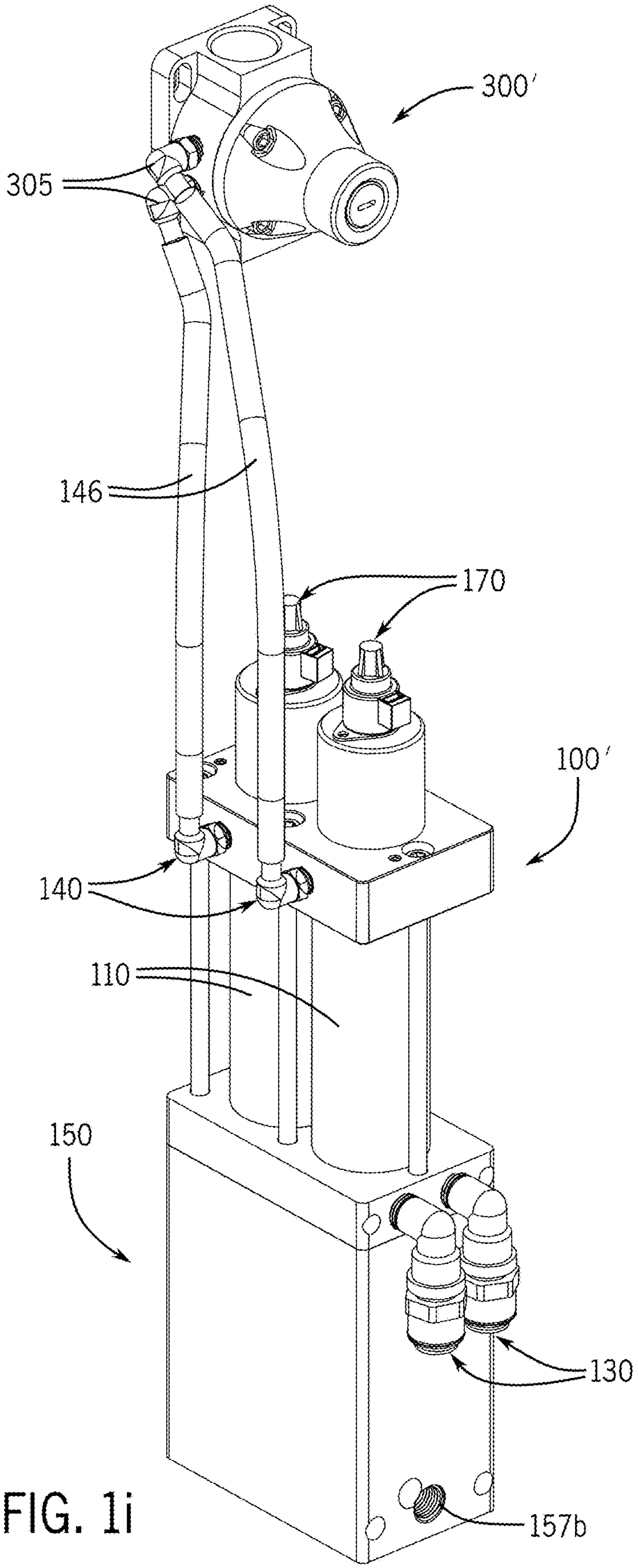
FIGS. 1*i* and 1*j* illustrate an isometric and a cross-sectional view of an alternative configuration of a chemical delivery device according to various implementations of the present disclosure.
Figure 1J:
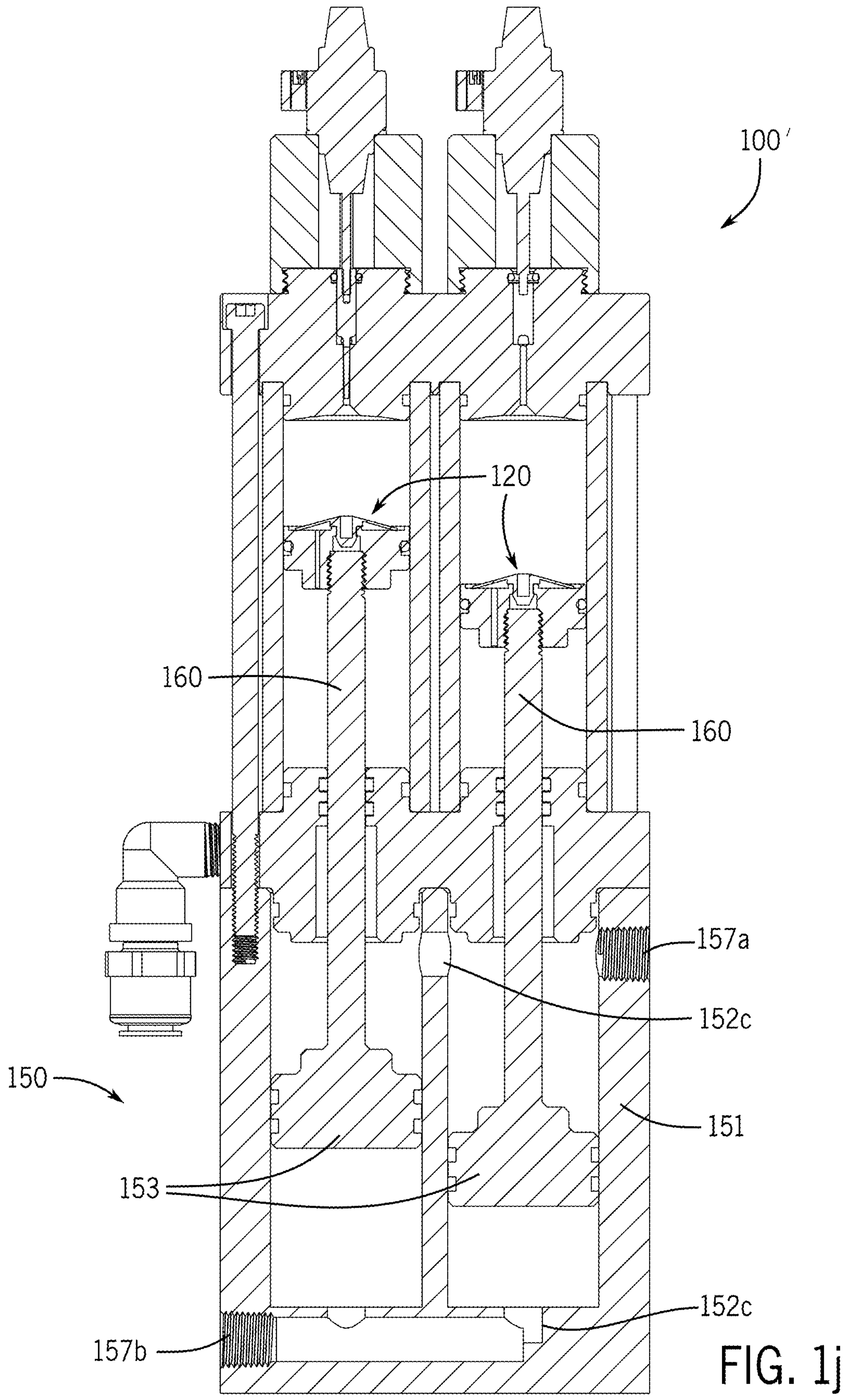

FIGS. 1*i* and 1*j* illustrate isometric and cross-sectional views of an alternative configuration of a chemical delivery device 100' according to various implementations of the present disclosure. The chemical delivery device 100' is illustrated as having two chemical chambers 110 in which the pistons 120 are driven by common components of a drive mechanism 150, and chemical dispensed from the outlets 140 of the chemical chambers 110 is fed to a common loading valve 300. Although two chemical chambers 110 are illustrated in the chemical delivery device 100' it will be appreciated that more chemical chambers 110 may be provided such as three, four, five, six, seven, eight, nine, ten or more chemical chambers with a corresponding number of pistons 120 and drive shafts 160. The components of the syringe pump 100' of the embodiment of FIG. 1*i* are the same as providing an assembly of two or more syringe pumps 100, with the exception that the drive mechanism 150 includes components for simultaneously operating all pistons 120 of the chemical delivery device 100'. For instance, the housing 151 may be modified to accommodate multiple pistons 153 and drive shafts 160, and the drive chamber 152 additionally include one or more fluid conduits 152*c* for fluidly coupling the portions of the drive chamber 152 defining the upper cavities 152*a* and the lower cavities 152*b* while continuing to enable a seal to be maintained between the drive chamber 152 and the pistons 153 throughout operation of the drive mechanism 150. Accordingly, for purposes of brevity, certain components of the chemical delivery device 100' will not be repeated herein.

Syringe Pump Operation

In operation, the syringe pump 100 may advance to dispense chemical and retract to recharge the syringe pump 100 with chemical drawn therein during dispensing. In a more particular example, the syringe pump 100 may undergo an operational cycle. The operational cycle may correspond to when the syringe pump 100 (or other vehicle wash component) is active, e.g., not in an idle state, and may have a dynamic or variable duration. This variable duration enables the syringe pump 100 to dispense different amounts of chemical across operational cycles. The operational cycle is also referred to as a dispensing cycle or a dispensing operation in which chemical is dispensed by advancing the piston 120 and the syringe pump 100 is reset by retracting the piston 120. In such dispensing operations, the drive mechanism 150 may cause the piston 120 and drive shaft 160 and optionally the piston 153 depending on the type of drive mechanism, referred to as the piston and drive shaft assembly, to extend once in a dispensing stroke and to retract once in a resetting stroke. The extension of the piston 120 in the chemical chamber 110 may thus be referred to as, or be a part of, a dispensing stroke of the dispensing operation, and the retraction of the piston 120 may thus be referred to as, or be a part of, a resetting stroke of the dispensing operation. In some cases, upon completion of the resetting stroke, before a subsequent dispensing operation is or can be initiated, the syringe pump 100 may be in an idle state. Further, the upper chemical chamber 112*a* may have a volume such that a sufficient amount of chemical will be available for the duration of the dispensing stroke for the majority of commercial vehicle wash applications. The benefit of a syringe pump 100 of this nature, e.g., which cycles once during an injection or dispensing operation, is that chemical delivery flow is uninterrupted and consistent, in contrast to a pump which cycles multiple times and/or frequently (e.g., such as diaphragm pumps, piston pumps, gear/lobe pumps) during a dispensing operation resulting in disruptions in chemical dispensing.

When chemical is to be dispensed from chemical chamber 110, the drive mechanism 150 may exert a force on the piston and drive shaft assembly in the distal direction or towards the outlet 140, which in turn causes the chemical within the upper fluid chamber 112*a* to be pressurized and the one-way valve 124 located on the head 125 of the piston 120 is forced shut, preventing the chemical from moving from the upper chemical chamber 112*a* to the lower chemical chamber 112*b* via the one-way valve 124, thus resulting in the chemical being dispensed from the upper fluid chamber 112*a* in the dispensing stroke. In addition, a circumferential seal may be constantly maintained between the fluid chamber 112 and the piston 120, e.g., throughout operation of the piston 120. For example, the fluid chamber 112 may have a barrel or circular shape, and a circumference of the piston 120 may have a complementary shape thereto, enabling such a seal to be maintained therebetween throughout movement of the piston 120 (e.g., throughout operation of the drive mechanism 150).

Figure 4A:
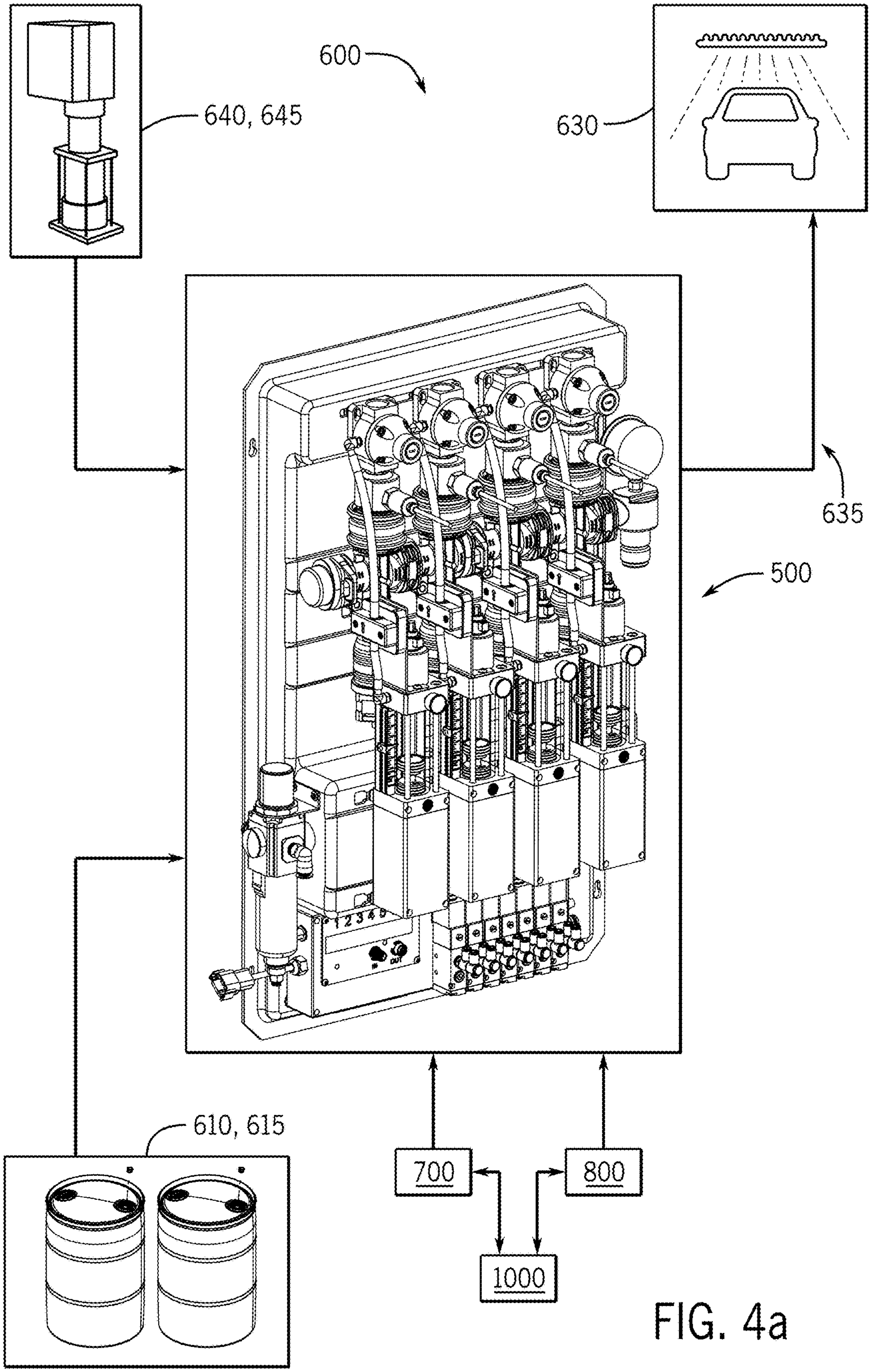
FIG. 4*a* illustrates a schematic diagram of the fluid management system of FIG. 3*a* in combination with components of a vehicle wash system, according to various implementations of the present disclosure.
Figure 4B:
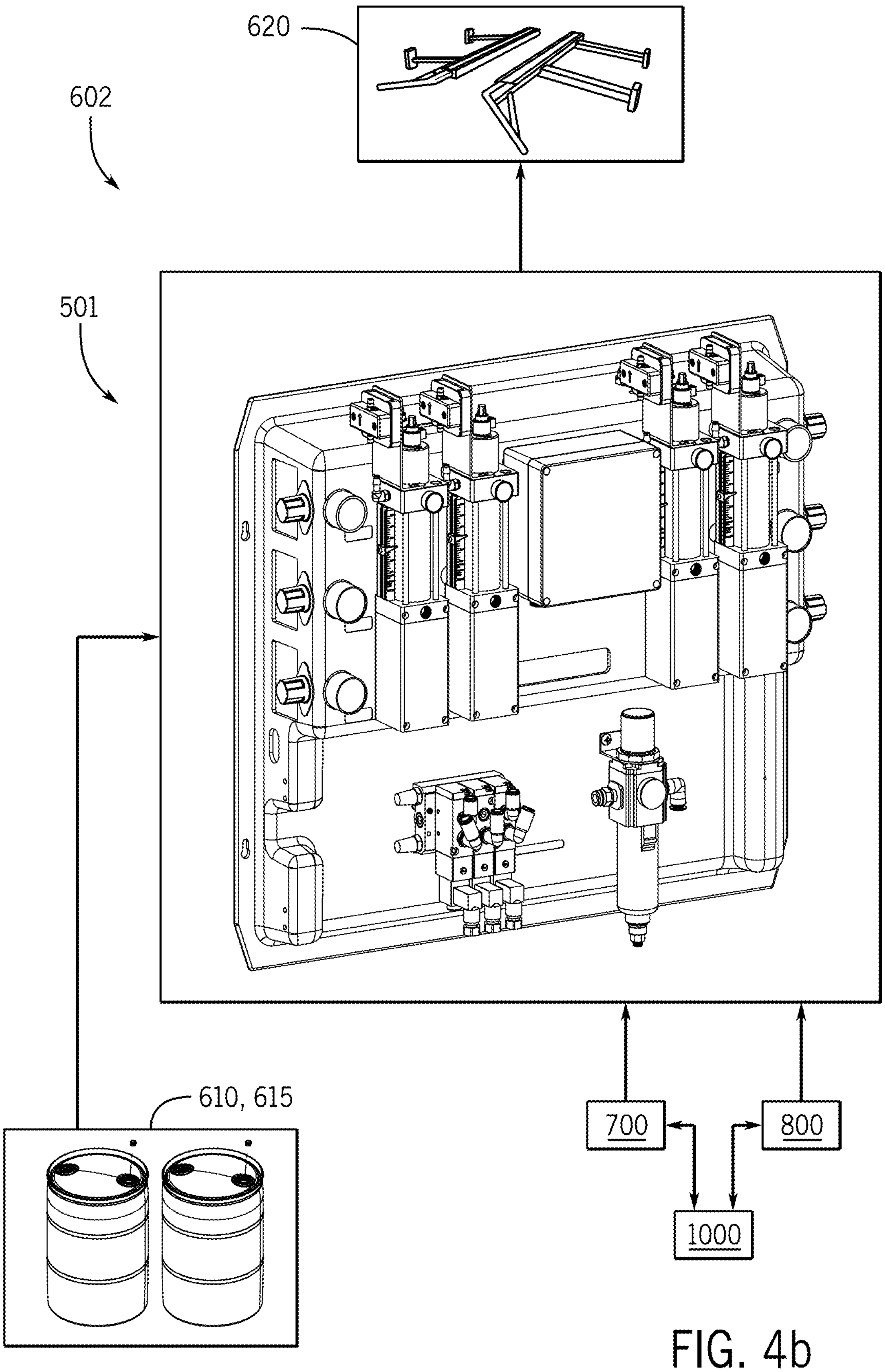
FIG. 4*b* illustrates a schematic diagram of the fluid management system of FIG. 3*b* in combination with components of a vehicle wash system, according to various implementations of the present disclosure.

As the piston and drive shaft assembly continues through its dispensing stroke, the chemical within the upper chemical chamber 112*a* continues to be dispensed and flow out of the syringe pump outlet 140 to downstream components. During such dispensing, a vacuum occurs (pressure lesser than atmospheric) in the lower chemical chamber 112*b* resulting in chemical being drawn into the lower chemical chamber 112*b* from a chemical supply through the inlet 130. Consequently, during the dispensing stroke, the chemical chamber 110 receives staged chemical in the lower chemical chamber 112*b*. For instance, as shown in FIGS. 4*a* and 4*b*, the chemical may be drawn into the syringe pump(s) 100 from a chemical supply such as barrels 610, 615 of a vehicle wash systems 600, 602 during piston 120 advancement or dispensing, due to the chemical supply being at atmospheric pressure, the chemical is drawn into the inlet 130 by the vacuum or suction.

In some implementations, the syringe pump 100 may be a closed system, and during dispensing, the rate at which the chemical is drawn into the lower chemical chamber 112*b* is approximately equal to the rate at which fluid is dispensed from the upper chemical chamber 112*a* via the outlet 140. Consequently, the syringe pump 100 may be configured such that the upper chemical chamber 112*a* and the lower chemical chamber 112*b* remain entirely filled with chemical throughout the operation of the syringe pump 100. In some implementations the inlet 130 may be configured to flow more volume of chemical than a maximum flow rate of the outlet 140. For instance, an orifice of the inlet may be larger than an orifice of the outlet, or larger than the largest orifice size of an adjustable outlet. This configuration may ensure that the fluid chamber 112 is always full due to the inlet 130 being able to draw in chemical at least as fast as chemical is being dispensed from the outlet 140, and in some cases faster than dispensing, which can prevent vacuum voids from being created in the fluid chamber 112, e.g., the lower chemical chamber 112*b*.

Once the dispensing stroke of the dispensing operation has been completed by the syringe pump 100, the drive mechanism 150 may retract the piston 120 in the resetting stroke, for instance by a valve node 102 or by the control system 400 (e.g., FIGS. 2*b*, 3*a* and 3*b*) triggering an associated actuator or valve 104 within the valve bank 103 to switch positions to initiate the resetting stroke.

In the resetting stroke, since the one-way valve 124 allows flow from the lower chemical chamber 112*b* to the upper chemical chamber 112*a*, the piston 120 passes freely through the chemical within the fluid chamber 112 and the chemical contained within the lower fluid chamber 112*b* passes into the upper fluid chamber 112*a* of the fluid chamber 112 via the one-way valve 124. As such the newly received chemical in the upper fluid chamber 112*a* may be primed chemical in a condition for dispensing from the outlet 140 in a subsequent dispensing operation. A check valve may additionally be located prior to (e.g., upstream from) the inlet 130 of the chemical chamber 110 and may be configured to permit chemical to enter into the inlet 130 but prevent chemical from exiting when the piston and drive shaft assembly returns to the retracted position. The fluid pressure in the lower fluid chamber 112*b* may remain constant or may slightly increase during the resetting stroke due to the piston 120 generating pressure in its resetting or retracting movement in the chemical chamber and as the chemical passes through the one-way valve 124.

The rate at which the piston and drive shaft assembly retracts during the resetting stroke may be dependent upon a number of factors, such as: friction between contacting surfaces, the flow coefficient (Cv) through the one-way valve 124, the viscosity of the chemical contained within the chemical chamber 110 and the force/speed of the drive mechanism 150. For instance, the retract time may be less than a second in duration for chemicals having a viscosity of ~1000 cPs within the chemical chamber 110. This rapid "recharge" time (e.g., the time in between dispensing strokes, which may be the time it takes for the upper chemical chamber 112*a* to be filled with chemical from the lower chemical chamber 112*b* so that the fluid chamber 112 is ready to cycle again in a subsequent dispensing operation) may provide advantages in vehicle washes, since the time between dispensing strokes of sequential dispensing operations may be as short as a few seconds. Due to syringe pumps 100 of the present disclosure receiving staged chemical during the dispensing stroke of the dispensing cycle, the syringe pumps 100 can be recharged within a few seconds, e.g., during the resetting stroke where the upper chemical chamber 112*a* is primed, while traditional syringe pumps with an equivalent size can take more than a minute to draw in and become fully filled with fluid having a viscosity of ~1000 cPs.

Once the piston and drive shaft assembly has completed its resetting stroke, e.g., is fully retracted or in a retracted position, and fluid pressure between the upper chemical chamber 112*a* and lower chemical chamber 112*b* has equalized, the syringe pump 100 is ready for the next dispensing stroke of the next dispensing operation, e.g., pending a command from the valve node 102 or control system 400. Prior to the next dispensing operation, the syringe pump 100 may be in its idle state with the piston 120 remaining in its retracted position.

Returning to the dispensing stroke, and with reference to FIG. 1*g*, as chemical is pressurized, the chemical is forced from the upper chemical chamber 112*a* into the adjustable valve 170, e.g., through the valve orifice 171. The rate at which the chemical flows through the valve orifice 171 may be controlled by the valve needle 172 (additionally dependent upon fluid viscosity, pressure differential, etc.). To control the linear displacement of the valve needle 172 a linear stepper motor 175, or other linear actuator such as a proportional solenoid, may be operably coupled to the valve needle 172. When the linear stepper motor 175 is fully extended the valve needle 172 may be seated within the valve orifice 171 effectively allowing no flow to pass (e.g., FIG. 1*c*). When the linear stepper motor 175 is in the fully retracted position (e.g., FIG. 1*g*), the effective valve orifice area of the valve orifice 171 is at its largest and permits the maximum amount of flow for which the adjustable valve 170 has been designed for. Partial extension of the valve needle 172 within the valve orifice 171 permits a portion of the maximum amount of flow, which may be controlled in steps using the linear stepper motor 175.

The valve needle 172 may be configured with a parabolic tip 173, which may be dimensioned to achieve a linear relationship between the effective valve orifice area, which is the cross-sectional area of the valve orifice 171 minus the cross-sectional area of the valve needle 172, and linear displacement of the valve needle 172 during linear displacement of the valve needle 172. Having a linear relationship between the valve needle 172 displacement and the area of the valve orifice 171 using the parabolic tip 173 may facilitate providing a linear adjustment of the flow rate of the chemical across the full area of the valve orifice 171, resulting in consistent flow control resolution across the entire flow control span. Using a linear stepper motor 175 to control linear displacement of valve needle 172 may provide a finite number of steps of the flow control span. For instance, the number is steps is determined by the displacement range of the linear actuator, pitch of the linear actuator lead screw, and step angle of the stepper motor. Since the number of steps within the flow control span is finite, having an appropriately designed parabolic tip 173 may ensure that each step of the motor will change the flow rate by the same amount. This is in contrast to a traditional tapered valve needle, in which the relationship between the flow rate and needle valve displacement will be logarithmic. This is especially problematic when high resolution at low flow rates is necessary, since the flow adjustment resolution per step of the motor will be large at the beginning of the needle adjustment span and will continue to decrease as the displacement of the valve needle increases.

Upon passing through the effective valve orifice area created by the valve orifice 171 and valve needle 172, the dispensed chemical may then pass through an upper check valve 176. The upper check valve 176 may be configured to allow chemical to flow out from the adjustable valve 170 but not back in. Additionally, the chemical is blocked from traveling up the stem of the valve needle 172 due to the valve needle gasket 177. After passing by the upper check valve 176 the chemical may enter the syringe pump outlet 140 such as the outlet port 142, which may be fluidly coupled to one or more fluid conduits such as outlet tubes 144, 146 (FIG. 1*a*). Although the adjustable valve 170 is illustrated as being downstream of the outlet 140, in some implementations, the adjustable valve 170 may be fluidly coupled to the inlet 130 and may adjust the flow of upstream chemical passing into the chemical chamber 110 via the inlet 130. In such a modification, the adjustable valve 170 may control the effective valve orifice area to control the amount of flow of chemical into the lower chemical chamber 112*b* via the inlet 130 to thereby control the amount of flow of chemical out of the upper chemical chamber 112*a* during dispensing. Alternatively, although the adjustable valve 170 is shown as being integrated into the outlet body 141 (e.g., top cap of the syringe pump) providing a compact package, the adjustable valve 170 may be located further downstream of the check valve 176 to control the flow of chemical from the syringe pump 100.

The dispensing stroke of the piston and drive shaft assembly may be variable for instance based on a control signal delivered to the drive mechanism 150. Accordingly, in some cases, the slider 180 may be positioned along the length of the chemical chamber 110 and point to a position on the graduated volumetric scale 182 for use as a reference to visually confirm an amount of chemical dispensed per dispensing stroke is at the desired amount. This may provide a rapid approach for a user to determine the dispensed chemical volume through mechanical means, particularly where the chemical chamber 110 is transparent, allowing the user to view the chemical being dispensed from the syringe pump 100 during operation. In addition or alternatively, a flow sensor such as the flow meter 185 and/or the linear encoder 186 may be used to determine the dispensed chemical volume as provided herein.

The operation of the syringe pump 100 may be controlled by the valve node 102 or by the control system 400, and the drive mechanisms 150 of the syringe pumps 100 of the fluid management systems may be individually operated. As such, the control system 400 and/or valve node 102 may be configured as a controller with a processor and memory (e.g., as a computer), may be communicatively coupled to such a controller, or both, and may be programmed with instructions to control or perform the methods or the operations described herein. In some examples, the control system 400 and/or valve node 102 includes a programmable logic controller (PLC) configured to, or be programmed to, control or perform methods or operations described herein. As such machine-readable medium including instructions may be executed by the processing circuitry of the control system 400 and/or valve node 102 of the present disclosure.

Prior to initiating a dispensing operation, the chemical chamber 110, e.g., in an empty state, may be primed or charged with chemical to commission the syringe pump 100 for undergoing the dispensing operations. In a priming operation, for instance, the chemical may be caused to enter the chemical chamber 110 via the one-way valve 124, and air within the chemical chamber 110 may be vented via the outlet 140 as the piston 120 moves to a retracted and an extended position within the chemical chamber 110 multiple times.

The rate at which the chemical is dispensed from the syringe pump 100 may at least be partially controlled by the effective valve orifice area of the valve orifice 171 of the adjustable valve 170 of the syringe pump 100 (additionally dependent upon fluid viscosity, pressure differential, etc.). The effective valve orifice area of the valve orifice 171 of the adjustable valve 170 is controlled by the position of the valve needle 172, as provided above in connection with FIGS. 1*a*-1*g*. Accordingly, in operation of the syringe pump 100 the effective valve orifice area of the valve orifice 171 at the outlet 140 of the syringe pump 100 may be adjusted to facilitate regulating a distance the piston 120 and drive shaft 160 travels during the dispensing stroke of the dispensing cycle, and thus the effective valve orifice area of the valve orifice 171 may facilitate regulating an amount of pressurized chemical dispensed from the outlet 140 during the dispensing stroke of the dispensing cycle. For instance, the drive mechanism 150 may be actuated for a pre-determined period of time during the dispensing stroke, and the amount of chemical dispensed may be based on the orifice size of the adjustable valve 170. Other approaches to controlling the amount of chemical dispensed from the syringe pump 100 may include but are not limited to adjusting the pre-determined dispensing cycle time; and/or using a flow rate adjustment device to adjust an orifice size of the top and/or lower pneumatic port 157*a*, 157*b*, which may be used alone or in combination with the adjustable valve 170 coupled to the inlet 130 or the outlet 140. Accordingly, flow rate adjustment devices may include but are not limited to providing an adjustable valve 170 at or in the pneumatic port(s) and/or fluid port(s), use of a pinch valve, use of a needle in the flow path, providing a tortuous path, use of a proportional solenoid; and/or adjusting a driving speed of the drive mechanism 150 configured with a variable drive.

The control system 400 may control the duration in which the syringe pump 100 is cycled, e.g., a duration of the operational cycle. For instance, the control system 400 may be communicatively coupled to one or more sensors such as the flow sensor, e.g., the liquid flow meter 185 or linear encoder 186, and may use data from the sensor(s) for determining the flow rate of chemical dispensed from the syringe pump 100, such as during the dispensing stroke or the dispensing cycle. Based on the information received from the sensor, the control system 400 may determine a predetermined volume of chemical has been dispensed and may cause the drive mechanism 150 to cease chemical dispensing, continue chemical dispensing, and/or may cause the adjustable valve 170 to adjust the effective valve orifice area of the valve orifice 171 to thereby adjust a rate of flow of chemical through the outlet 140. In some implementations, the adjustable valve 170 may be operated between operational cycles or during a resetting stroke. In such embodiments, the control system 400 may provide closed loop control of the syringe pump 100.

The control system 400 may be communicatively coupled with a centralized or main car wash controller 700 (FIGS. 4*a*-4*c* and 5) and may be configured to receive signals from the centralized controller 700, interpret and process that signal, and generate and send the generated signal to the valve drive mechanism. For instance, in the absence of a signal from the centralized controller 700, the control system 400 and/or the drive mechanism 150 may be in their idle state, e.g., following a retraction stroke of the dispensing cycle. A signal from the centralized controller 700 may serve as a trigger for the control system 400, which may result in the control system 400 generating a separate signal for operation of the syringe valve 100 and other components of the fluid management system 500.

The signal from the centralized controller 700 may be a dispensing signal for causing the dispensing cycle to operate, e.g., at a specific time, for a first pre-determined period of time or both, and the control system 400 may generate a different signal for operating the syringe valve 100 at a second time or for a different pre-determined period of time.

In another example, the signal from the centralized controller 700 may be a signal configured for a type or model of vehicle wash component that differs from the syringe pump 100. In this case, the signal received by the control system 400 may interpreted simply as a trigger or timing signal for the fluid management system 500 or components thereof to operate. For instance, the control system may generate a signal to operate the syringe pump 100 in a dispensing cycle for a pre-determined period of time as set by the control system 400.

In operation of the alternative chemical delivery device 100' with the two or more chemical chambers 110, the drive mechanism 150 may simultaneously drive each of the pistons 120 in the dispensing and resetting strokes of the dispensing operation in substantially the same manner as provided herein in connection with the operation of the syringe pump 100. For instance, the drive mechanism 150 may be configured with a drive chamber 152 or a linear actuator common to the pistons 120. In a pneumatically operated drive mechanism 150, the drive chamber 152 may include a single upper pneumatic port 157*a* and a single lower pneumatic port 157*b* for driving each of the pistons 153 and each of the piston rods 160 may be coupled to a respective piston 120 of a chemical chamber 110 of the two or more chemical chambers. Although the number of pistons 153 in the drive mechanism 150 correspond to the number of pistons 120 in the chemical chambers 110, it will be appreciated that the drive mechanism 150 may include a different number of pistons, such as a single drive mechanism piston joined to multiple piston rods 160 for driving the multiple pistons 120 in the drive chambers 110. During dispensing, the one-way valves 124 are in the closed state and chemical from each of the chemical chambers 110 may simultaneously be dispensed from the respective outlets 140, and corresponding amounts of the chemicals to the amounts dispensed may be drawn into the respective lower chemical chambers 112*b* via the inlets 130. The resetting operation results in the drawn-in chemical passing into the upper chemical chamber 112*a* of the chemical chamber 110 via the one-way valves 124 for dispensing in a subsequent dispensing operation.

In some implementations, an adjustable valve 170 may be coupled to the chemical outlet or the chemical inlet of one or more of chemical chambers 110 the chemical delivery device 100' in substantially the same manner as disclosed herein in connection with the syringe pump 100. The adjustable valve 170 may enable adjustment of the effective valve orifice area of the valve orifice 171 leading to the respective chemical outlet 140 or the inlet 130. As such, the amount of chemical dispensed from and drawn into each chemical chamber 110 of the chemical delivery device 100' during the dispensing operation may differ from one another at least based on the effective valve orifice area of the valve orifice 171 of the respective the chemical chamber 110. Controlling the orifice size and/or length of time each drive mechanism 150 is actuated may thus control the volume of the chemical solution dispensed from each the corresponding outlet 140. The dispensed chemicals may be mixed with each other at a common mixing site, such as at a common loading valve 300' fluidly coupled to each of the chemical delivery device 100' via two inlets 305, or may be simultaneously distributed to separate downstream locations.

Sensors including flow sensors such as flow meters 185 or a linear actuators 186 may be integrated into the chemical delivery device 100' in substantially the same manner as disclosed herein in connection with the syringe pump 100, and one or more flow sensors may be coupled the chemical delivery device 100'. For instance, the number of flow sensors may correspond to the number of chemical chambers 110 of the chemical delivery device 100' and may be communicatively coupled to and controlled by the control system 400 as provided herein.

Other structures and functions of the chemical delivery device 100' substantially correspond to the structure and functions of the syringe pump 100 disclosed herein, and accordingly is not repeated in the interest of brevity, and the following disclosure of the pneumatic and mechanical operation of the features of the syringe pump 100 applies to the chemical delivery device 100'.

Pneumatic Operation of the Syringe Pump

The syringe pump 100 may be pneumatically operated and the drive mechanism 150 may be an integral double-acting pneumatic cylinder. The pressurized air source 106 may provide the pressurized air to the drive mechanism 150 to cause pneumatic operation. The pressurized air source 106 may be communicatively coupled to the one or more processors 410 of the control system 400 and optionally the power source 520 for causing chemical dispensing. For instance, the valve 104 or valve bank 103 may receive control signals from the control system 400 to cause the pressurized air source 106 to deliver pressurized air to cause the dispensing and resetting strokes of the drive mechanism 150. In another example, the one or more processors 410 may cause control signals to be transmitted to the pressurized air source 106 for delivery of pressurized air to the drive mechanism 150 of the syringe pump 100 via the valve 104. The valve 104 and actuators of the valve bank 103 may be configured as solenoid valves containing an electrical coil. The solenoid valves may be pneumatically piloted valves such as coaxial valves, double acting coaxial valves, or as solenoid actuated coaxial valves, as pneumatic actuated angle seat valves or as a pneumatically actuated ball valves.

With reference to FIGS. 1*a*-1*d*, the drive shaft 160 may be directly coupled to the piston 120 of the chemical chamber 110 and to the piston 153 of the drive mechanism 150. In an idle state of the drive mechanism 150, the upper cavity 152*a* of the drive chamber 152 may be pressurized with air through the top or distal pneumatic port 157*a*, and the lower cavity 152*b* of the drive chamber 152 may be open to atmosphere through the lower or proximal pneumatic port 157*b*. This pressure differential across the piston 153 forces the piston 153 to the furthest retracted position in the drive chamber 152, and the piston 153 may be at or near the proximal end of the drive chamber 152 resulting in a minimal volume in the lower cavity 152*b*. Since the piston 153 of the drive mechanism 150 is coupled to the piston 120 of the chemical chamber via the drive shaft 160, the piston 120 is also drawn proximally into a furthest retracted position when the drive mechanism 150 is in the idle state.

For initiating the dispensing stroke, the pneumatic air signals at the drive mechanism 150 are instantaneously flipped, such that the lower cavity 152*b* is pressurized through the lower pneumatic port 157*b* and the upper cavity 152*a* is opened to atmosphere through the top pneumatic port 157*a*. This switching may occur from the valve 104 and/or valve bank 103, which may be controlled in communication with the valve node 102 or the control system 400. When this switching occurs, the air pressure in the lower cavity 152*b* is now greater than the pressure in the upper cavity 152*a*, and as a result, a force is imparted on the piston and drive shaft assembly, which in turn drives the piston 120 to the extended position during the dispensing stroke resulting in the chemical within the fluid chamber 112 being pressurized. The pressure experienced by the liquid chemical in the fluid chamber 112 is approximately equal to the air pressure in the lower cavity 152*b* multiplied by the ratio of the piston 153 area to the piston 120 area (assuming that frictional losses are negated). As a result the one-way valve 124 located on the head 125 of the piston 120 is forced shut, preventing the chemical from moving from the upper chemical chamber 112*a* to the lower chemical chamber 112*b* via the one-way valve 124.

When the valve 104 switches, the air signals to the syringe pump 100 are instantaneously reversed. The top pneumatic port 157*a* is now pressurized with air and the lower pneumatic port 157*b* is opened to atmosphere. This causes a pressure differential between the upper air cavity 152*a* and lower air cavity 152*b*, and as a result the piston and drive shaft assembly is forced back into the retracted position (e.g., FIG. 1*c*) in the resetting stroke, and the one-way valve 124 allows flow of chemical from the lower chemical chamber 112*b* to the upper chemical chamber 112*a* for its dispensing from the outlet 140 in a subsequent dispensing operation.

The rate at which the piston and drive shaft assembly retracts during the resetting stroke using a pneumatic drive mechanism 150 may, in addition to the factors discussed above, additionally be dependent upon a number of factors, such as: the flow coefficient (Cv) of air entering through the top pneumatic port 157*a*, and the flow coefficient of air exiting through the lower pneumatic port 157*b*. Since the flow coefficient (Cv) may be changed for either the air entering through the top pneumatic port 157*a* or the air exiting through the lower pneumatic port 157*b* using a flow adjustment device, the speed at which the piston and drive shaft assembly retracts may be adjusted, e.g., decreased or increased, by adjusting this flow coefficient (Cv) for either port.

Figure 2A:
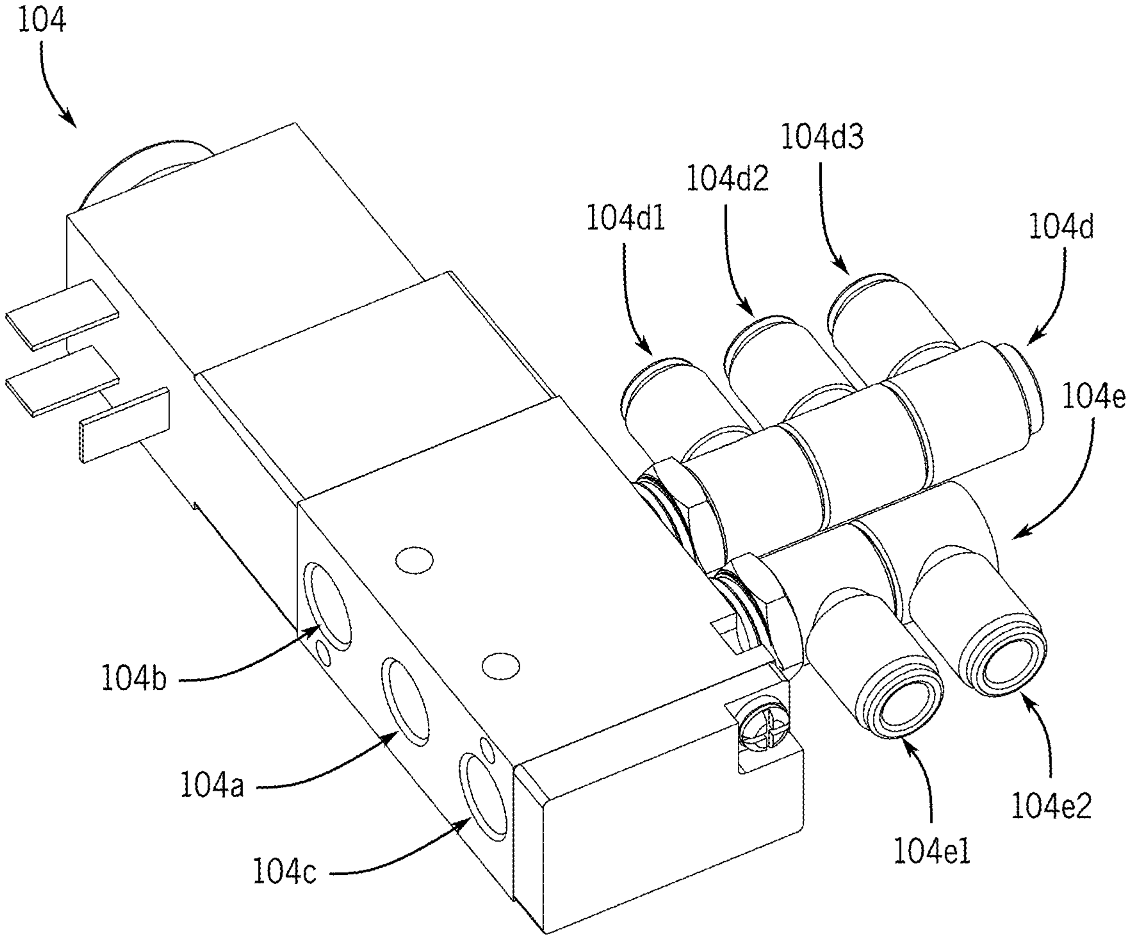
FIG. 2*a* illustrates an exemplary valve, according to various implementations of the present disclosure.

The operation of the syringe pump 100 may be controlled by the valve node 102 or by the control system 400, which may incorporate the functions of the valve node 102, and for instance the duration which the syringe pump 100 is cycled may be controlled by such component(s). The valve bank 103 may include a plurality valves 104, and the valves 104 may be configured to be fluidly coupled and cooperate with the pneumatic ports of the drive mechanism 150 of the syringe pump 100, as well as other pneumatic ports of the fluid management systems disclosed herein. The valve bank 103, under direction of the valve node 102 or control system 400, may enable individual actuation of the valves 104, which may be electrically connected to a power source, e.g., power source 520, for causing one or more of the individual valves 104 to switch resulting in a change in air pressure within the drive mechanism 150 or other components of the fluid management systems. The valve node 102 may be configured as a controller with a processor and memory (e.g., as a computer), may be communicatively coupled to such a controller, or both. In some implementations, the valve node 102 may be integrated in the control system 400 of the fluid management systems as provided herein.

Where the drive mechanism 150 is pneumatically operated, the drive mechanism 150 may be configured as a double acting linear pneumatic cylinder, and air pressure may be applied to actuate the piston 120 as well as the one-way valve 124 depending on the direction of the piston's 120 movement. In this regard, FIG. 2*a* is an illustration of a 5/2 solenoid actuated valve, which may be the configuration of the valves 104 when used in operating pneumatic systems, such as a pneumatic drive system 150. More particularly, as provided, the fluid management systems, or components thereof, may be operated using pressurized air routed from a pressurized air source 106 (e.g., a pump), through the valves 104 configured as electronic solenoid-actuated valves, and to the drive mechanisms or air-driven actuators.

In FIG. 2*a*, the valve 104 may share a common pressurized air inlet 104*a*, two exhaust ports 104*b*, 104*c*, and two outlets 104*d*, 104*e* in which the first outlet 104*d* is normally closed, and the second outlet 104*e* is normally open. The exhaust port 104*b* fluidly couples to the outlet 104*d*, and the exhaust port 104*c* fluidly couples to outlet 104*e*. The common air inlet 104*a* may be fluidly coupled to the pressurized air source 106 such as an air pump via fluid conduits such as flexible tubes for receipt of pressurized air therefrom, as well as to a pressure regulator 105 for regulating the pressure of the pressurized air delivered to the common air inlet 104*a*. The outlets 104*d*, 104*e* may be fluidly coupled to one or more syringe pumps 100, as well as other downstream components via fluid conduits, for transmission of the pressurized air by the valve 104. The exhaust ports 104*b*, 104*c* may receive air exhausted from one or more syringe pumps 100 or other downstream components via the respective outlets 104*d*, 104*e*, for instance when such components transition to their non-actuated or idle state. For instance, exhaust port 104*b* may normally be open when the first outlet 104*d* is open to atmosphere, and exhaust port 104*c* may be normally closed when the second outlet 104*e* is open and in a normal position or idle state. In this example, the second outlet 104*e* is decoupled from the exhaust port 104*c* until the valve switches as provided herein.

As shown in FIG. 2*a*, the first outlet 104*d* may be split into three ports 104*d*1, 104*d*2, 104*d*3, for example, to supply air to the lower cavity 152*b* of one or more syringe pumps 100 during a dispensing cycle (e.g., to the syringe pumps of FIGS. 1*a*, 1*i*, 2*b*) and/or to a pressurized air port of a corresponding fluid delivery manifold 200 (e.g., FIGS. 3*a* and 6*a*), and/or a pressurized air port of a vehicle wash applicator 620 such as a foamer, tire cleaner, brushes, or other components configured to receive pressurized air, such as a pressure regulator.

Figure 2B:
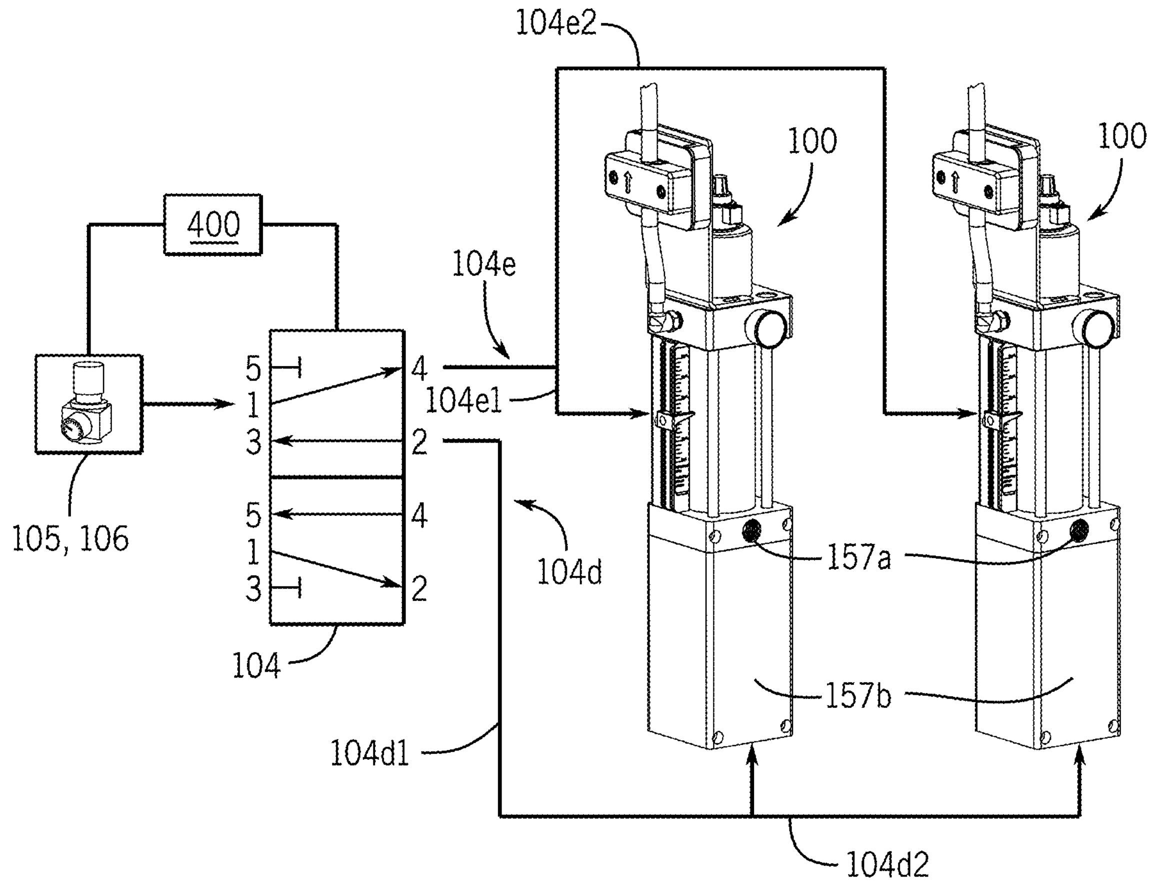
FIG. 2*b* is a schematic diagram of a valve circuit of fluid management systems, according to various implementations of the present disclosure.

Turning to FIG. 2*b*, the valve 104 may be used to pneumatically operate two syringe pumps 100 and the first outlet 104*d* is split to the lower cavities 152*b* of a respective drive mechanism 150 such that activation of the valve 104 cause the first outlet 104*d* move to an open position and the pressurized air from the split ports (e.g., 104*d*1 and 104*d*2) routed to activate each respective plunger 153 to simultaneously dispense pressurized chemical solution from the outlets 140. In this example, and as shown in FIG. 2*a*, the second outlet 104*e* is also split into two or more ports, 104*e*1 and 104*e*2, and fluidly coupled to the upper cavities 152*a* of the two syringe pumps 100 of FIG. 2*b*. In the idle state of the valve 104, the second outlet 104*e* may be normally opened and fluidly coupled to the upper cavities 152*a* of a respective drive mechanism 150 causing pressurized air delivered from ports 104*e*1 and 104*e*2 to simultaneously retract each respective plunger 153 to a retracted position, which may be retained in this position under pressure until the valve 104 activates or switches. In the retracted position, the drive mechanism 150 may be in its idle state, and the flow of the pressurized air may cease, while the upper chamber remains pressurized. Operating the syringe pumps 100 simultaneously using the same control signal, e.g., by using a common valve 104 or coordinated operation of the control system 400, may ensure the chemicals are dispensed together, which may allow for their simultaneous distribution, for instance to separate areas of the vehicle wash applicator 620.

As shown in FIG. 2*b*, the two syringe pumps 100 may be communicatively coupled to the control system 400 at least via the valve 104, and optionally via the valve node 102 and/or the valve bank 103 of the fluid management systems of the present disclosure. Additionally or alternatively, a centralized or main car wash controller 700 (e.g., FIGS. 4*a*-4*c* and 5) may be communicatively coupled to the fluid management systems. Accordingly, the control system 400 may be configured to receive control signals from a centralized or main car wash controller 700, interpret and process that signal, generate a new signal and send the newly generated signal to the valve 104 for closed loop operation of the syringe pumps 100. The valve 104 may receive compressed air from a pressurized air source 106 via the pressure regulator 105 and distribute the compressed air to each drive system 150 as provided herein based on control signals received from the control system 400 and/or controller 700.

In FIG. 2*b*, the syringe pumps 100 are in the idle state due to the valve 104 routing the pressurized air to the top pneumatic ports 157*a* of the drive mechanisms 150, resulting in the pistons 153 being driven to their most proximal position within the drive chamber 152. In this idle state, any air within the lower cavities 152*b* may be vented via the lower pneumatic ports 157*b* and exhausted via exhaust port 104*b*. Due to the configuration of the piston and drive shaft assembly, the piston 120 is also in its most proximal position in the chemical chamber 110. Actuation of the drive mechanism 150 to cause movement of the piston 120 in the distal direction may involve the control system 400 sending a signal to switch the valve routing of the valve 104, resulting in the pressurized air being routed to the lower pneumatic ports 157*b*, and any air within the upper cavity 152*a* being vented via the top pneumatic ports 157*a*, and exhausted via exhaust port 104*c*. Due to the switch in air signals, the pistons 153 together with other components of the piston and drive shaft assemblies of the respective syringe pumps 100 are driven distally such that the chemical solution is dispensed from each outlet 140 under pressure, with the one-way valve 124 being closed. During such dispensing, a new supply of the chemical solution is drawn into the lower chemical chamber 112*b* of the chemical chamber 110 via the inlet 130 from a respective chemical supply 610, 615 (FIG. 4*b*). Upon the control system 400 causing the valve 104 to switch the air signal to route the pressurized air back to the top pneumatic port 157*a* resulting in venting of air via the lower pneumatic port 157*b*, the piston and drive shaft assemblies move in the proximal direction thus carrying the pistons 120 proximally and causing the one-way valve 124 to be opened such that the newly received supply of the chemical solution in the lower chemical chamber 112*b* passes through the piston head 125 and into the upper chemical chamber 112*a* (FIG. 1*c*) for subsequent dispensing.

Accordingly, the pneumatically operated syringe pump 100 may be a continuous priming syringe pump due to the chemical chamber 110 being primed during movement of the piston and drive shaft assembly in both directions. Particularly, when the drive mechanism 150 is in the unactuated, or idle state, the piston 153 of the piston and drive shaft assembly may be forced in the proximal direction, e.g., during the resetting stroke, by the valve 104 delivering the pressurized air from the second outlet 104*e* (when in its normally open position) to the upper cavity 152*a* to thereby cause the chemical chamber 110 to be primed with the chemical solution as the chemical solution passes from the lower chemical chamber 112*b* into the upper chemical chamber 112*a* via the one-way valve 124. The chemical chamber 110 may additionally be primed with staged chemical solution during dispensing, e.g., during the dispensing stroke, when the new chemical solution is drawn into the lower chemical chamber 112*b* from the chemical supply via the inlet 130 while the valve 104 delivers the pressurized air from the first outlet 104*d* to the lower cavity 152*b* when opened from its normally closed position.

The rate at which the chemical is dispensed from each respective syringe pump 100 may be controlled by the controlling effective valve orifice area of the valve orifice 171 of the adjustable valve 170, as provided above in connection with FIGS. 1*a*-1*i* as well as the other approaches to controlling the amount of chemical dispensed from each respective syringe pump 100 provided herein.

Mechanical Operation of the Syringe Pump

In other implementations, the syringe pump 100 may be actuated by means of electrical signals in place of air signals, and the drive mechanism 150 may be mechanically driven such as via a linear stepper motor or a proportional solenoid. For instance, the control system 400 may cause electrical signals to be sent to cause mechanical operation of the drive mechanism 150. More particularly, other linear driving mechanisms may be used in place of the disclosed pneumatic or hydraulic drive mechanisms 150. One such example would be a linear stepper motor drive. With this implementation the linear stepper drive may be coupled to the piston and drive shaft assembly and may take the place of the drive chamber 152. The linear stepper drive may operate by rotating the stepper motor, resulting in extension of a linear actuator at the rate necessary to achieve the desired chemical flow rate. For instance, the drive shaft 160 may be threaded and be extended during rotation of the stepper motor. This implementation may achieve the same benefits of the continuous priming function of the syringe pump 100 disclosed herein due to the staged chemical being received during the dispensing stroke of the dispensing cycle, and the syringe pump 100 being quickly recharged during the resetting stroke in which the upper chemical chamber 112*a* is primed. This implementation could also potentially eliminate the need for a control valve 170 and a flow meter 185, since the flow rate should be directly proportional to the rate at which the piston 120 is extended by the linear stepper. However, in pressurized fluid delivery systems in which a pump is required to inject chemical into a pressurized system, this type of mechanical drive mechanism may experience challenges with achieving the correct delivery pressure while maintaining the target flow rate. For example, in the event that a viscous fluid is required to be dispensed at a high flow rate, the stepper motor may not have enough torque to achieve the desired flow rate at high pressure, resulting in the motor slipping and missing steps. To ensure that the stepper motor remains accurate, an encoder may be used track the motor steps and ensure that steps are not missed.

Fluid Management Systems

The syringe pumps 100 may dispense chemicals in fluid management systems and vehicle wash systems according to various implementations of the present disclosure. Fluid management systems may be configured as chemical distribution systems, fluid distribution systems, and/or diluted chemical distribution systems. Such systems may be electrically actuated and driven by mechanical- and/or pressure-driven drive mechanisms, such as a pressurized air source or a pressurized liquid source. In implementations, the vehicle wash components and fluid management systems may inject or dispense chemicals and motive fluid for downstream mixing, and may use a control system, such as a closed loop feedback system, to monitor and regulate variables impacting dilution solutions including but not limited to: pressure, flow rates, and/or dilution ratios of fluids, chemicals, and mixtures thereof.

Fluids managed and dispensed by the vehicle wash components and systems include chemicals and motive fluid (e.g., water) as provided herein.

The vehicle wash systems of the present disclosure may include vehicle washes at a vehicle wash location (e.g., at a car wash) and vehicle wash stations (e.g., tunnels or bays) within such locations. The vehicle wash systems generally include a centralized or main car wash controller 700 configured for operation of the vehicle wash system in connection with vehicle wash operations applied to a vehicle such as washing, rinsing, shining, coating, and drying the vehicle. The vehicle wash components and fluid management systems of the present disclosure may be utilized on-site within these vehicle wash systems.

Figure 3A:
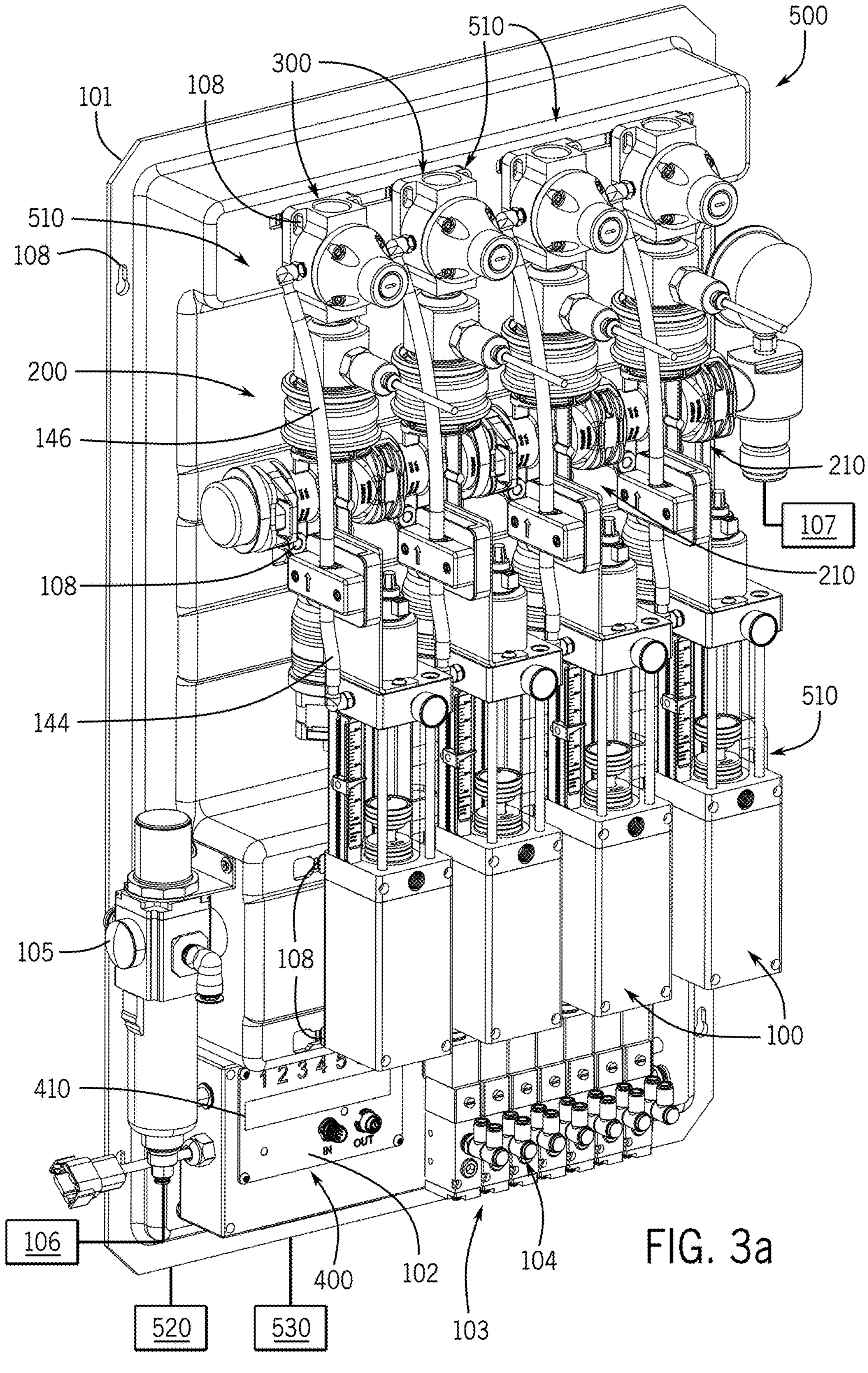
FIGS. 3*a*-3*c* illustrate fluid management systems according to various implementations of the present disclosure.

Turning to FIG. 3*a*, illustrated is a fluid management system 500 including four positions 510 or vehicle wash assemblies, e.g., four chemical delivery devices such as the syringe pumps 100, motive fluid delivery devices such as a motive fluid delivery manifold 200 with four outlets, and four mixing sites such as loading valves 300, a control system 400, a power source 520, and a user interface 530.

As provided hereinabove, the chemical delivery devices configured as syringe pumps 100 may be responsible for the delivery of chemical from the fluid management system 500, and motive fluid delivery devices may responsible for delivery of motive fluid (e.g., water) from the fluid management system 500 and in some implementations may be configured as a fluid delivery manifold 200 configured for metering motive fluid from the system. For instance, the fluid delivery manifold 200 may serve as an on/off valve for the motive fluid delivery from a motive fluid source (e.g., a pump), as well as a throttling/metering device to control motive fluid flow rate. The fluid delivery manifold 200 may have a modular construction for coupling with other fluid delivery manifolds 200, may have integrated manifold assemblies, and/or be adapted to fluidly couple to a variety of downstream components of the systems provided herein. For instance, as shown in FIG. 3*a*, the fluid delivery manifold 200 is of a modular construction and the assembly defines a common inlet channel and four outlets fluidly coupled to four mixing sites for delivery of motive fluid to respective inlets thereof. Although the fluid management system 500 illustrated in FIG. 3*a* includes a fluid delivery manifold 200 for dispensing motive fluid, in some implementations, other motive fluid delivery devices may be employed such as a motive fluid distribution plenum including a fluid inlet and multiple fluid outlets configured for dispensing motive fluid to multiple downstream locations.

Mixing sites may be responsible for receipt, mixing and discharge of dispensed chemical and motive fluid from a respective chemical delivery device and motive fluid delivery device of the fluid management system 500, and in some implementations may be configured as loading valves 300. Prior to reaching the mixing site, the chemical and motive fluid may accordingly be separate and unmixed with each other. Loading valves 300 may be configured to mix pressurized chemical received from a respective syringe pump 100 with pressurized motive fluid received from the fluid delivery manifold 200. The mixing site may be responsible for the delivery of a mixed solution of the motive fluid and chemical to downstream components of the systems provided herein. While the fluid management system 500 illustrates loading valves 300 for mixing pressurized chemical and motive fluid, in some implementations, the fluid management system may include other mixing sites such as eductors for mixing dispensed chemical and pressurized motive fluid.

Figure 3B:
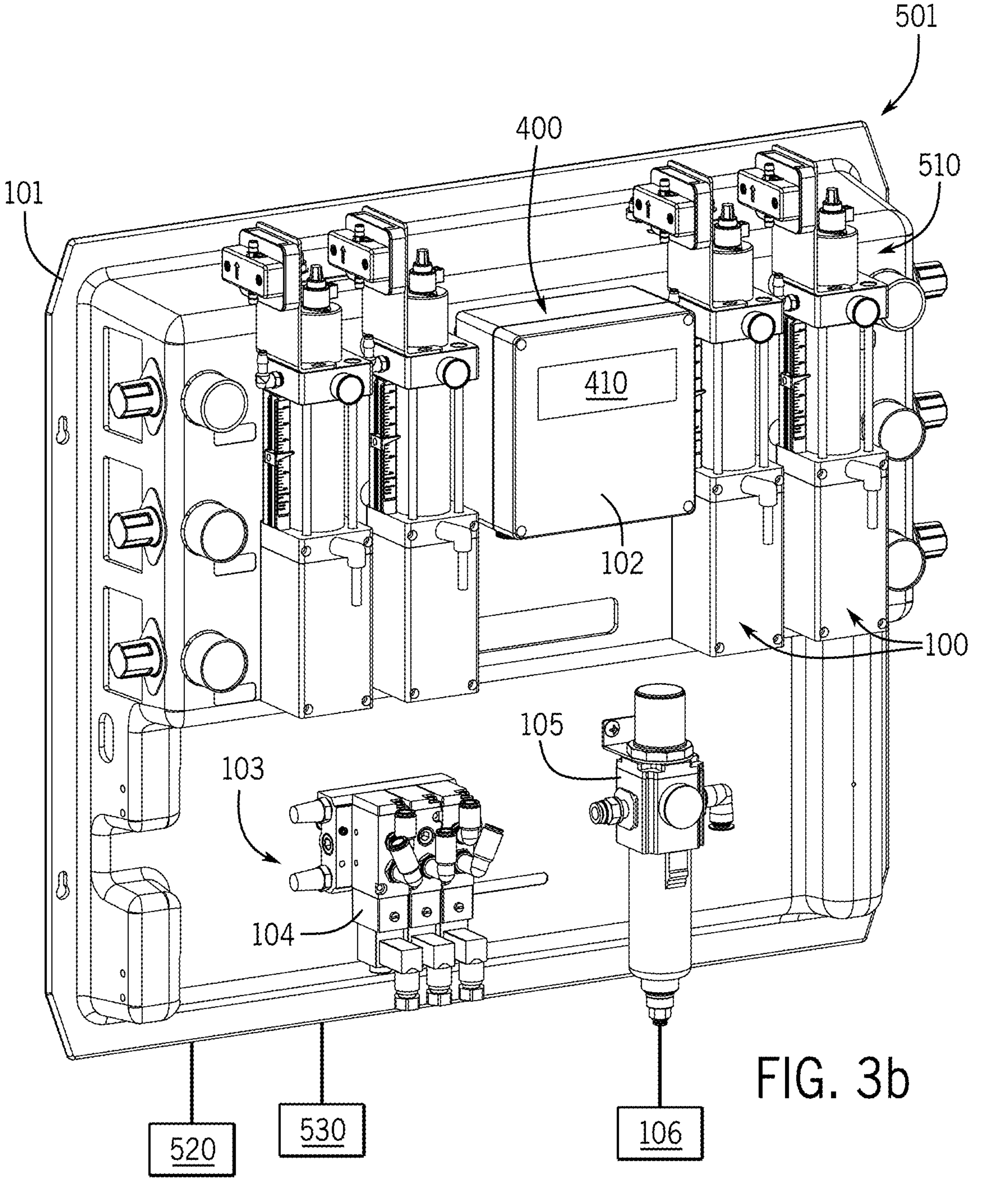

While the fluid management system 500 includes four positions 510, it will be appreciated that the system 500 may include more or fewer positions 510, for instance, based on the target wash site or target vehicle wash applicator, such as one, two, three, four, five, six, seven, eight, nine, ten or more positions. In addition, while the positions 510 of the fluid management 500 system are illustrated as vehicle wash assemblies including three vehicle wash components (e.g., a syringe pump 100, a fluid delivery manifold 200 and a loading valve 300), it will be appreciated that each position may include more or fewer vehicle wash components. For instance, FIG. 3*b* illustrates a fluid management system 501 including four positions 510 each with a chemical delivery device, e.g., a syringe pump 100. Aspects of the disclosure generally referring to fluid management systems or the fluid management system 500 are also applicable to the other fluid management systems of the present disclosure (e.g., fluid management system 501) except where specified.

The fluid management systems of the present disclosure may be controlled by the control system 400. The control system 400 may be responsible for controlling the vehicle wash components, e.g., the syringe pumps 100, fluid delivery manifold 200, loading valves 300, as well as the other components of the fluid management systems, e.g., a valve node 102, a valve bank 103, individual valves 104, a pressure regulator 105, a pressurized air source 106, and a pressurized fluid source 107, all of which may be configured with electrical and/or mechanical components operable by the control system 400. In some implementations, the control system 400 may be configured to control components of vehicle wash systems such as external pumps and/or fluid supplies, as provided herein. The control system 400 may include one or more processors 410 with associated memory and may be programmed to cause various operations of the fluid management systems and components thereof including closed loop control thereof, e.g., closed loop control of a rate of chemical and/or motive fluid dispensing. The control system 400 may be configured to individually control the one or more vehicle wash components of the position 510, e.g., a syringe pump 100 and fluid delivery manifold 200, as well as other communicatively coupled components provided herein below. For instance the control system 400 may control dispensing from an assembly of one syringe pump 100 and/or fluid delivery manifold 200 by sending control signals, such as separate or common control signals for its/their operation, e.g., for coordinated or simultaneous operation. In some cases one or more processors 410 of the control system 400 may be configured to individually control one position 510 (e.g., one syringe pump 100 and/or one valve of the fluid delivery manifold 200) of the fluid management system, resulting in the control system 400 having at least one dedicated processor for each position 510 for instance by controlling a power source 520 of the fluid management system. The control system 400, or components thereof may also be integrated into the physical assemblies of the disclosed vehicle wash components and fluid management systems.

The control system 400 may be configured to individually control each of the syringe pumps 100 of the fluid management systems. For instance, the control system 400 may determine the flow rate or volume of chemical dispensed from the syringe pumps 100 during their dispensing strokes or the dispensing cycles. Based on the sensed flow information received from the communicatively coupled flow sensor, the control system 400 may individually control the adjustable valves 170 to adjust and effective valve orifice area of the valve orifice(s) 171 to thereby adjust the flow of chemical through the outlet(s) 140. In such embodiments, the control system 400 may provide closed loop control of the individual syringe pump(s) 100. In some implementations, the closed loop control may involve controlling the duration which the syringe pump 100 is cycled, in addition to or as an alternative to adjusting the effective valve orifice area of the valve orifice 171.

The fluid management systems may be powered via a power source 520, which may be independent from a power source of a car wash controller 700 (e.g., FIG. 4*a*). In some implementations, the control system 400 may be configured to control delivery of power from the power source 520, and thus actuation of the mechanical and/or electrical components of the components of the position 510 of the fluid management systems. Accordingly, the control system 400 may be configured to send instructions to cause the component(s) of the position 510 to be powered at a voltage independent of the sensed voltage from the car wash controller 700 or otherwise. For example, the mechanical and/or electrical components of the vehicle wash component(s) may not be communicatively coupled to the car wash controller 700 and may not be capable of receiving instructions therefrom. The mechanical and/or electrical component(s) of the position 510 may instead be caused to operate by the control system 400 causing the power source 520 to power such components. The power source 520 may be integrated into the fluid management system or may be arranged separately within the confines of the vehicle wash location and may be configured as a breaker box, for example.

The user interface 530 may enable a user to enter inputs into the control system 400 such as selections of operating parameters, chemical types to be delivered from the system 500, applicator nozzles, fluid lines, and so on. The user interface 530 may be configured with a processor and memory and be communicatively coupled to the control system 400 via a wired or wireless connection. For instance, the user interface 530 may be provided as a tablet, mobile phone, computer, etc., or may be a local user interface integrated into the system 500, e.g., on the panel 101. Accordingly, the user interface 530 may be located at the vehicle wash location housing the system 500, may be remote from the system 500, or may be integrated into the assembly forming the system 500.

In FIG. 3*b*, the illustrated fluid management system 501 includes the same components as the fluid management system of FIG. 3*a* with the exception that chemical delivery devices 100 are provided at the four positions 510 without the fluid delivery manifold 200 and loading valves 300.

Figure 3C:
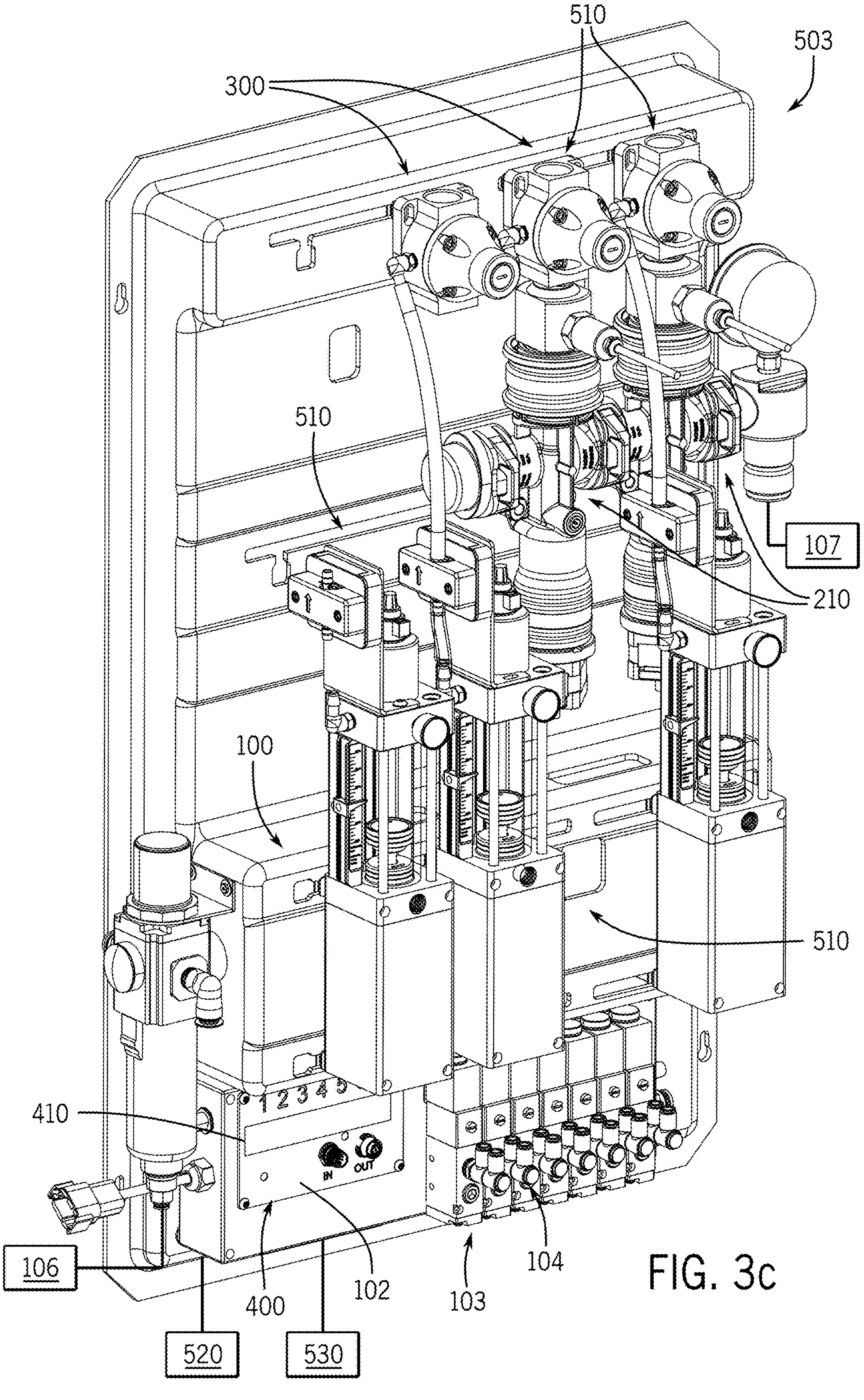

In FIG. 3*c*, the illustrated fluid management system 503 includes the various components from the fluid management systems of FIGS. 3*a* and 3*b* with the exception that the fluid management system 503 includes four position 510 each having a different combination of vehicle wash components. For instance, one position 510 (second from the left) includes a chemical delivery device fluidly coupled to a mixing site without the fluid delivery manifold 200. For purposes of brevity, the components of the fluid management systems 501 and 503 will not be repeated herein.

The vehicle wash components as well as other components of the fluid management systems may form a unitary assembly, may optionally be mounted on or in the fluid management systems, such as on a common structure including as a panel 101, which may include a frame, a thermoformed structure, a sheet metal substrate and so on. The assembly or structure may be free-standing, may be mounted on a wall, and/or be secured at a vehicle wash location. In implementations, the valve node 102, the valve bank 103, individual valves 104, the pressure regulator 105, the pressurized air source 106, the pressurized fluid source 107, and mounting structure 108 are example components that may be used in connection with or integrated into the vehicle wash components and fluid management systems and assemblies of the present disclosure. In some implementations, chemical supplies such as vessels containing chemical may be integrated into the assembly or structures provided herein.

Vehicle Wash Systems

In FIG. 4*a*, the fluid management system 500 of FIG. 3*a* may be provided in combination with components of a vehicle wash system 600, a main car wash controller 700, and a communications gateway 800.

The vehicle wash system 600 may include chemical supplies 610, 615 (e.g., individual barrels of a chemical), vehicle wash applicators 630, one or more fluid lines 635, a fluid source 640 which may be in addition to or the same as the pressurized fluid source 107 (e.g., a pressurized water pump) of the fluid management system 500, and a pressure sensor 645. The components of the vehicle wash system 600 may be housed within a single vehicle wash location. The chemical supplies 610, 615 may include individual vessels (e.g., barrels) of a chemical, such as a concentrated chemical, pre-mixed chemicals, or a chemical solution (e.g., a pre-mixed or pre-diluted chemical solution in water). Although two chemical supplies 610, 615 are illustrated as being fluidly coupled to the fluid management system 500, more or fewer chemical supplies may deliver chemical to the system 501. The vehicle wash applicators 630 may include chemical and/or mixed solution applicators such as fluid nozzles, foamers, and other dispensers. The fluid lines 635 may carry the fluid dispensed from the system 500 to the vehicle wash applicators 630. The fluid source 640 may be configured as a water pump and/or a municipal water supply. The fluid source 640 may be the same or different from the pressurized motive fluid source 107 and may provide motive fluid to the motive fluid delivery device or mixing site. The fluid source 640 may be communicatively coupled to the control system 400 and optionally the power source 520 for the delivery of the motive fluid. For instance, the control system 400 may cause control signals to be transmitted to the fluid source 640 for delivery of motive fluid to the fluid management system. In another example, upon receipt of power from the power source 520 in response to control signals received from the one or more processors 410, the fluid source 640 may deliver fluid pressure to cause motive fluid to be delivered to the fluid delivery manifold 200 during an on-cycle. In addition to providing water pressure to the fluid management system 500, the fluid source 640 may provide pressure assistance to a water supply, e.g., a municipal water supply, or may provide the sole source of pressure to the motive fluid delivered to the fluid management system 500.

The main car wash controller 700 illustrated in FIG. 4*a* may generally be a power source that delivers timed control voltage signals to car wash devices at the vehicle wash location. Such signals generally provide timing signals and operational parameters for operating devices within the vehicle wash facility during the vehicle wash operations. While the car wash controller 700 may control the operation of other car wash devices at the vehicle wash location, the car wash controller 700 more simply delivers a signal to the fluid management system 500 for subsequent interpretation by the control system 400 and action. This configuration provides the fluid management system 500 autonomy relative to other devices within the car wash that are controlled in a customary manner by the car wash controller 700. More particularly, the main car wash controller 700 is responsible not only for initiating operations such as initiating proper air, water, and chemical dispensing, but also for coordinating other aspects of the car wash including the position of the vehicle relative to the dispensing and cleaning apparatus. It does this by using programmable logic controller (PLC) or similar technology to send signals to various car wash equipment. These signals might be control voltages, analog signals, or digital signals. While the car wash controller 700 can control a variety of different vehicle wash components, the fluid management systems (e.g., fluid management systems 500 and 501) of the present disclosure are responsible for orchestrating their own operation due to the ability of the control system 400 to interpret control signals, e.g., timing signals, received from the car wash controller 700 and generate separate control signals for operation of the vehicle wash component according to parameters set by the control system 400. In a vehicle wash location, a number of car wash components may thus be controlled by the car wash controller 700, while fluid management systems provided according to implementations of the present disclosure operate independently from the car wash controller's 700 commands.

The communications gateway 800 illustrated in FIG. 4*a* may be configured to communicatively couple the fluid management system 500 to a computer network 1000, and may be configured with a processor and memory. Each vehicle wash location may include its own communications gateway 800 and the gateway 800 may be coupled to remote locations via the internet, as well as to the local devices and systems at the vehicle wash location via the internet via a local area network (LAN) or other near range communication equivalents, e.g., Wi-Fi, Bluetooth or LoRa, RFID, NFC, ANT, Zigbee, or WLAN, or via long range communication equivalents such as WAN. Accordingly, the communications gateway 800 may be coupled to multiple fluid management systems located at the vehicle wash location. The communications gateway 800 may be configured to send programming updates or operational parameters to the control system 400 of the fluid management system(s).

Returning to the fluid management system 500 of FIG. 3*a*, the system 500 may be configured to facilitate car wash operations of the vehicle wash system 600 of FIG. 4*a* under the control of the control system 400 by causing the fluid management system 500 to dispense chemical received from the chemical supplies 610, 615, dispense motive fluid from fluid received from the fluid source 640, and dispense a mixed solution of chemical and motive fluid to one or more vehicle wash applicators 630. The control system 400 may be configured to receive control signals from external sources such as the main car wash controller 700 and communications gateway 800 located at the same vehicle wash setting as the fluid management system 500, and in response to receiving the control signals, the one or more processors 410 may interpret the signals and instruct one or more of the components of the fluid management system 500 to operate, for instance according to separate instructions as provided herein.

Returning to FIG. 4*b*, implementations may provide the fluid management system 501 of FIG. 3*b* in combination with a vehicle wash system 602 such that the fluid management system 501 is fluidly coupled to chemical supplies 610, 615 and delivers pressurized chemical to a vehicle wash applicators 620 of the vehicle wash system 602, such as a tire applicator, to facilitate car wash operations of the vehicle wash system 602. For instance, the control system 400 may cause the fluid management system 501 to dispense the chemical received from the chemical supplies 610, 615 at individual desired flow rates and/or volumes to the same or different vehicle wash applicators 620. Chemical delivery devices configured as syringe pumps 100 and other components of the fluid management system 501 are described at least in connection with FIGS. 1*a*-1*i*, and consequently, a detailed description of the operation of these elements will not be repeated in the interest of brevity. In some implementations the chemical stored in the chemical supplies 610, 615 may be a chemical solution of a pre-diluted mixture of chemical and water.

Referring to FIG. 4*b*, the fluid management system 501 is illustrated as being fluidly coupled to the first chemical supply 610, e.g., via the inlet 130 of a first syringe pump 100, and a second chemical supply 615, e.g., via the inlet 130 of a second syringe pump 100 of the system 501. Flow meters 185 are shown as coupled to each respective syringe pump outlet 140 but may alternatively be coupled to the inlet 130 (see e.g., FIGS. 1*a* and 1*h*). In some implementations, other flow sensors may be used in addition to or as an alternative to the flow meters 185, and for instance a linear encoder 186 may be coupled to at least one of the piston or drive shaft of a respective syringe pump 100.

Figure 4C:
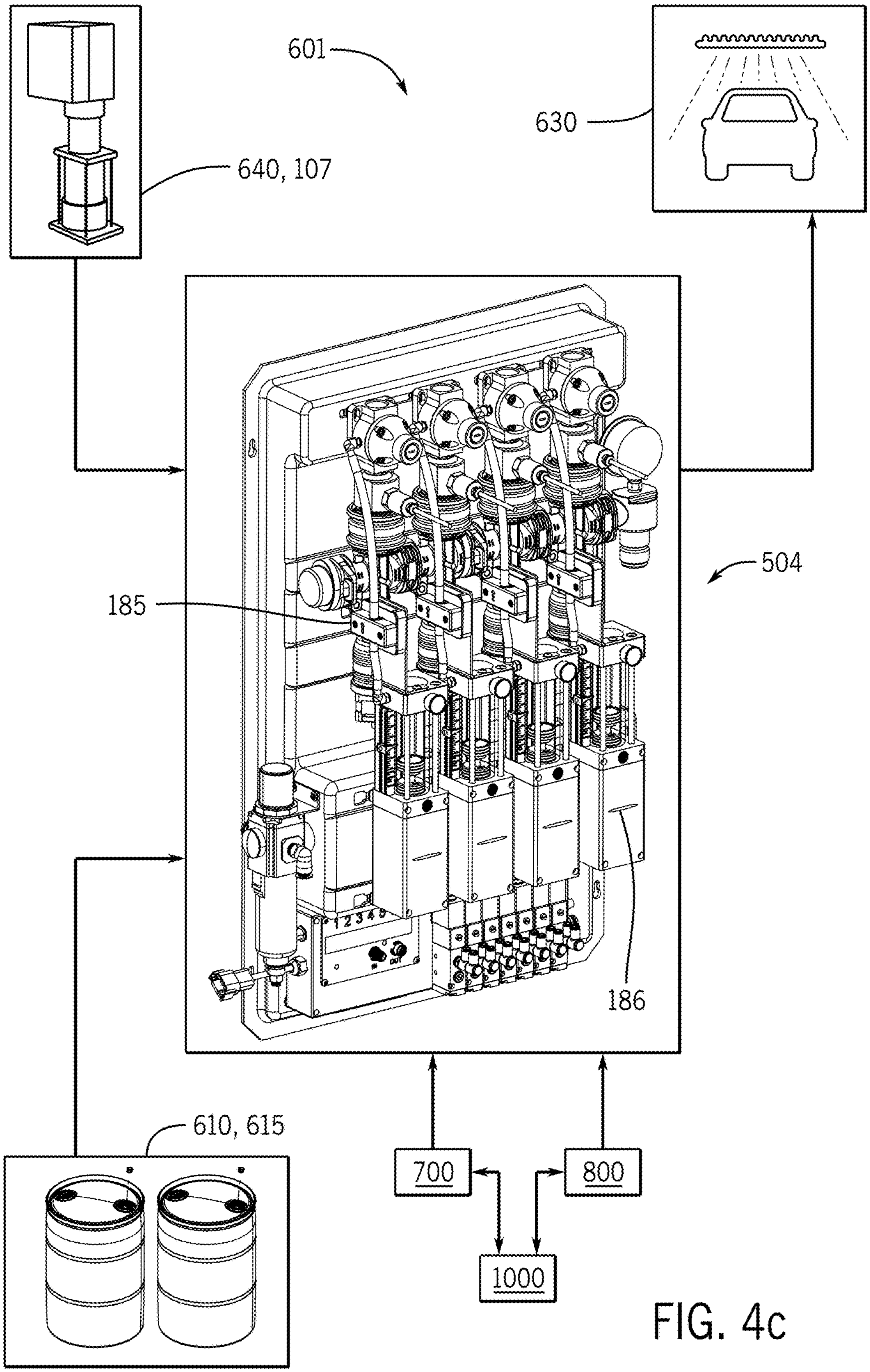
FIG. 4*c* illustrates a schematic diagram of including modified fluid management system from the fluid management system of FIG. 3*a* in combination with components of a vehicle wash system, according to various implementations of the present disclosure.
Figure 4D:
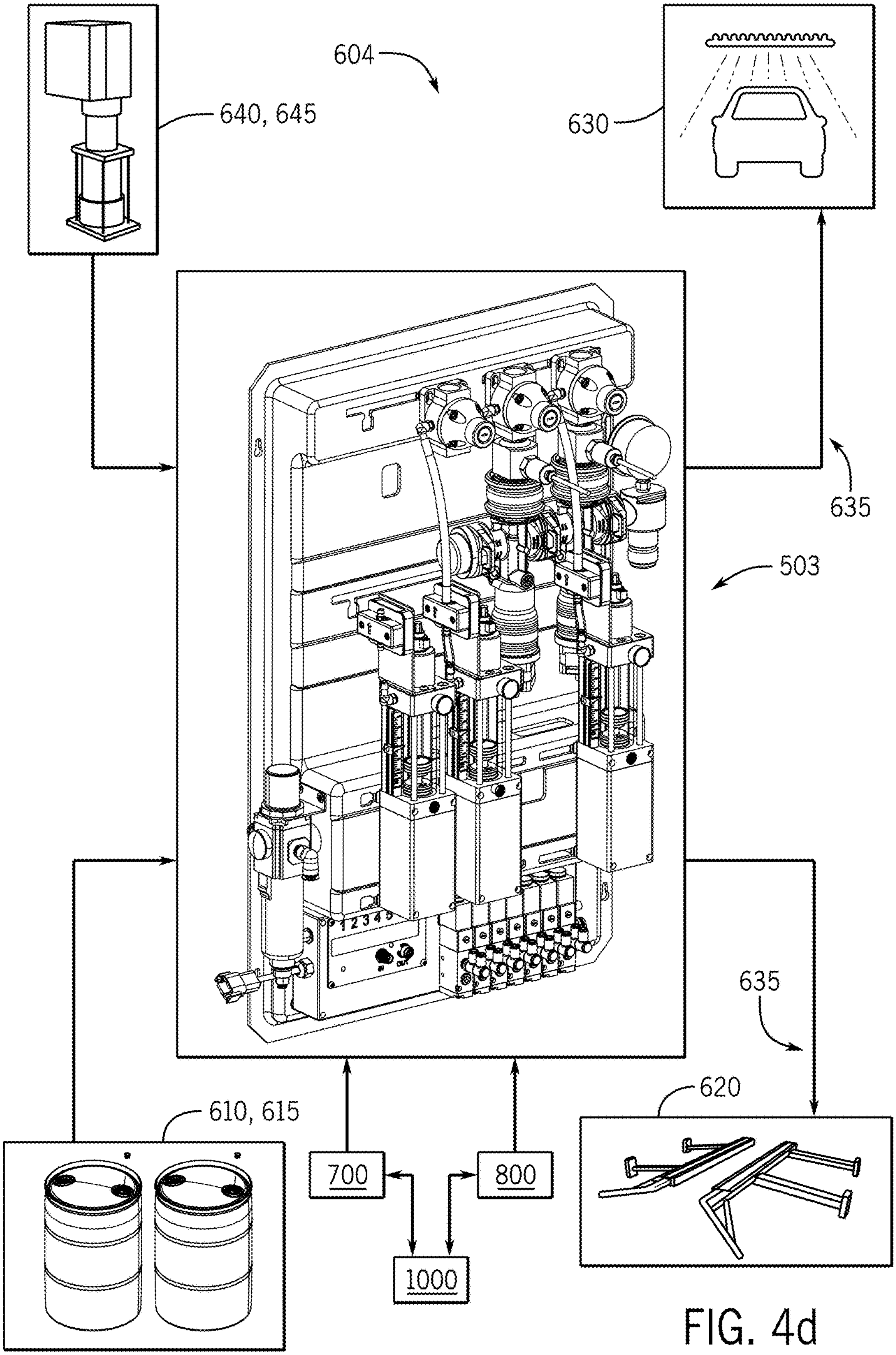
FIG. 4*d* illustrates a schematic diagram of the fluid management system of FIG. 3*c* in combination with components of a vehicle wash system, according to various implementations of the present disclosure.

Referring to FIG. 4*d*, the fluid management system 503 of FIG. 3*c* may be provided in a vehicle wash system 604 such that the fluid management system 503 is fluidly coupled to the chemical supplies 610, 615 and delivers pressurized chemical and a pressurized mixed solution to vehicle wash applicators 620, 630 to facilitate car wash operations of the vehicle wash system 604.

Control of Syringe Pump Dispensing of Chemical in Pressurized System using a Flow Rate Measurement Device In FIG. 4*c*, a fluid management system 504 may be provided in combination with the components of a vehicle wash system 604, which may have substantially the same configuration as the vehicle wash system 600 of FIG. 4*a*. The fluid management system 504 may be the same as the fluid management system 500 of the present disclosure except that at least one of the syringe pumps 100 may not include the adjustable valve 170 and may instead be configured with an outlet 140 having a fixed outlet orifice size, and one or more flow sensors, such as liquid flow meters 185 and/or linear encoders 186, may be used in connection with the control system 400 to measure and adjust the flow of chemical from such syringe pumps. The components of the fluid management system 504 and the vehicle wash system 604 are described at least in connection with the fluid management system 500 vehicle wash system 600, and consequently a detailed description of the operation of these elements will not be repeated in the interest of brevity.

In operation of the fluid management system 504, the drive mechanism 150 causes the piston 120 to dispense the pressurized chemical from the outlet 140 of the syringe pump 100 and to retract the piston 120 to prepare the syringe pump for subsequent dispensing. Due to the fixed outlet orifice size of the outlet 140 of the at least one syringe pump 100 of FIG. 4*c*, the rate at which the chemical flows through the outlet 140 may be a function of the speed at which the piston 120 travels, and the amount or volume of chemical dispensed per dispensing cycle may be a function of the amount of time the piston 120 is driven towards the outlet 140 and the fixed orifice size of the outlet 140.

The rate at which the piston and drive shaft assembly advances and retracts is dependent upon a number of factors, such as: friction between contacting surfaces, the viscosity of the chemical contained in the upper chemical chamber 112*a* (during the dispensing stroke), the flow coefficient (Cv) through the one-way valve 124 and the viscosity of the chemical contained within the lower chemical chamber 112*b* (during the resetting stroke), the flow coefficient (Cv) of air entering and exiting through the top and lower pneumatic ports 157*a*, 157*b* (for a pneumatic drive). As a result, some implementations may provide a liquid flow meter 185 at the outlet 140 or the inlet 130 of the syringe pump 100 to sense the flow of chemical through one of these ports. That is, as provided herein, due to the configuration of the syringe pump 100 drawing in an equal amount of chemical as is being dispensed, the flow meter 185 may be positioned at either the inlet 130 or the outlet 140. The control system 400 may be communicatively coupled to such liquid flow meter 185 to determine the flow rate and/or volume of chemical dispensed from or drawn into the syringe pump 100 during dispensing. Based on the flow information received, the control system 400 may cause operation of the drive mechanism 150 to be adjusted to reach a target, e.g., a target chemical flow rate, a selected amount or volume of chemical to be dispensed, and/or a target dilution ratio of chemical into motive fluid.

Flow information may additionally or alternatively be derived from the use of a linear encoder 186, which may be used to determine the linear displacement of the piston and drive shaft assembly, and as provided herein, the distance may correspond to a predetermined volume of chemical dispensed from the chemical chamber 110, and the displacement information may be used in determining the flow rate and/or volume of chemical dispensed from the syringe pump 100. Based on the flow information, the control system 400 may cause operation of the drive mechanism 150 to be adjusted to reach the target.

Adjusting the flow of chemical from the syringe pump 100 based on the information from the above flow sensors may involve the control system 400 being configured as a flow adjustment device by causing a duration of the dispensing cycle to be adjusted, e.g., being caused to be increased or decreased to a different pre-determined dispensing cycle time to reach the target.

In some implementations, the control system 400 may be communicatively coupled to the flow rate measurement device and configured to control chemical dispensing from the outlet 140 using data therefrom. For instance, the control system 400 may be configured to determine whether the selected amount of chemical was dispensed during a prior dispensing using the data from the flow rate measurement device and may adjust operation of the drive mechanism 150 to reach the target in subsequent dispensing. This may involve controlling the duration which the drive mechanism 150 operates, and/or controlling a level of force exerted on the piston 120, and/or controlling a speed of delivery of pressurized driving fluid to a pneumatic or hydraulic drive, and/or controlling a speed at which the drive mechanism 150, configured as a variable drive, drives the piston during dispensing.

For a pneumatic drive, the speed at which the piston and drive shaft assembly extends and retracts may be adjusted using a mechanical flow adjustment device operably coupled to the drive mechanism 150 and controlled by the control system 400 to reach the target. The flow adjustment device may include an adjustable valve (e.g., similar to the adjustable valve 170 or a pinch valve) and may adjust the orifice size of either or both the top and/or lower pneumatic ports 157*a*, 157*b*. The flow adjustment device may adjust a flow coefficient (Cv) of air entering and/or exiting therethrough by adjusting the port orifice size. The speed of a hydraulic drive may be adjusted similarly using a flow adjustment device that adjusts a port orifice size and which may be controlled by the control system 400.

For a mechanical drive, the speed at which the piston and drive shaft assembly extends and retracts may be adjusted by the control system 400 by causing a driving speed of the drive mechanism 150 to be increased or decreased to thereby modify the speed at which the drive rod 160 moves to reach the target. As such the drive mechanism 150 may have a variable drive speed and may provide the flow adjustment device controlled by the control system 400. In a more particular example, a variable rotational drive (e.g., a rotational sleeve or nut of the drive mechanism 150) in which the drive rod 160 is in a threaded engagement, may be operated by the control system 400 at varying speeds, e.g., may be caused to be increased or decreased to reach the target.

In such embodiments, the control system 400 may provide closed loop control of the fluid management system 500. It will be appreciated that the described embodiments of the control system 400 causing adjustments to reach the target(s) may be used in combination with any of the fluid management systems of the present disclosure, and for instance, the control system 400 may cause the aforementioned adjustments in fluid management systems and vehicle wash assemblies that include one or more syringe pumps 100 with an adjustable valve 170.

Figure 5:
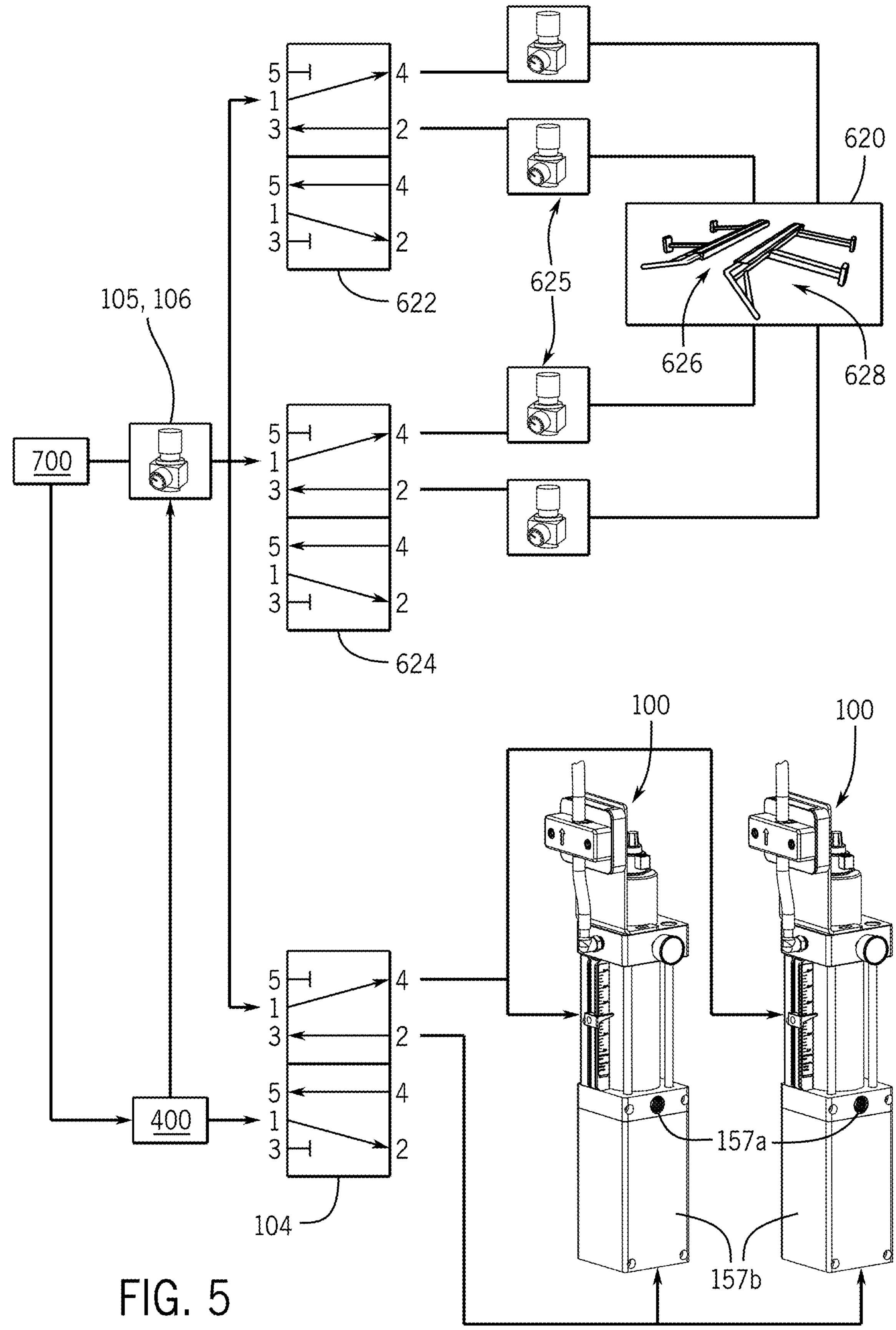
FIG. 5 illustrates a schematic diagram of valve circuits of the fluid management systems and a vehicle wash applicator, according to various implementations of the present disclosure.

Turning to FIG. 5, the fluid management systems, e.g., systems 500, 501, or variations thereof, may be configured for routing and regulating air pressure across multiple pneumatically operated vehicle wash components of such fluid management systems, as well as pneumatically operated components of the vehicle wash system, such as a vehicle wash applicator 620 of the vehicle wash system 602 of FIG. 4*b*. In FIG. 5, the valve 104 of the valve bank 103 may be operated in combination with valves 622, 624 of the vehicle wash applicator 620 to coordinate operation of the syringe pumps 100 and the pneumatically driven components of the vehicle wash applicator 620. The valves 622, 624 may be integrated into the panel 101 of the fluid management systems, and may be actuated along with the valve 104 using a common compressed air supply. In some implementations, the centralized or main car wash controller 700 may signal operation of the vehicle wash applicator 620 by sending a signal to the control system 400 of the fluid management system 500, and the control system 400 may analyze the received signal and generate different instructions (e.g., a new control signal) for sending to the mechanical and/or electrical components of the syringe pump 100, the fluid management system 500, and the vehicle wash system 602, e.g., the valves 104, 622, 624, the pressure regulator 105, and/or the pressurized air source 106 for pneumatic operation, e.g., to initiate the dispensing operation of the syringe pumps 100 and/or extension of the vehicle wash applicator 620. In the absence of a signal from the centralized controller 700 and/or the control system 400, the valves 104, 622, 624 may be in their idle state, and for instance the pressurized air may be routed through normally open ports or outlets of the valve 622, 624 (e.g., corresponding to the second outlet 104*e* of the valve 104), and any air in the normally closed ports may exhaust to atmosphere (e.g., corresponding to the first outlet 104*d* and exhaust port 104*b* of the valve 104). In this idle state, the plunger 153 and applicators 626, 628 may be held in a retracted position under pressure until the valves 104, 622, 624 activate or switch. The valves 622, 624 may have the same 5/2 solenoid valve configuration as the valve 104 fluidly coupled to one or more syringe pumps 100. The valves 622, 624 of the vehicle wash applicator 620 may each be coupled to respective applicators 626, 628, which may be configured to extend when actuated to contact the vehicle, and to retract to allow vehicles to pass without contact when in the idle state. As such, the normally open port of the valves 622, 624 may be routed to a pressure regulator 625 and then routed to the car wash applicator 620 to keep the car wash applicator 620 in the retracted state, while the port 104*e* maintains the syringe pump 100 in the idle state. A signal from the centralized controller 700 and/or the control system 400 may trigger one or more of the valves 104, 622, 624 to switch valve routing, which may open the normally-closed valve and close the normally-open valve. Air pressure in the normally-open line can now be exhausted to atmosphere and air pressure can be routed through the normally-closed port to a pressure regulator and then to extend the applicators 626, 628, while the port 104*d* causes the syringe pump 100 to undergo the dispensing stroke of the dispensing cycle such that the chemical solution is dispensed from the car wash applicators 626, 628, e.g., sprayed, while in the extended position. Accordingly, the dispensed chemical solution from the fluid management system 501 described in connection with FIG. 4*b* may be applied to vehicles via the applicators 626, 628.

In additional examples of pneumatic operation of the syringe pump(s) 100 in combination with other air driven components, the first outlet 104*d* may be split to the lower cavity 152*b* of the syringe pump(s) 100 as well as to the fluid delivery manifold 200, and activation of the valve 104 may cause the first outlet 104*d* move to an open position and the pressurized air to be routed to activate the plunger 153 such that the drive mechanism 150 dispenses the pressurized chemical solution from the outlet 140 of the syringe pump 100, while the pressurized air from the split first outlet 104*d* simultaneously delivers pressurized air to an integrated air valve of the fluid delivery manifold 200 or another air-driven actuator for actuation thereof, which may result in dispensing of motive fluid for downstream mixing with the dispensed chemical from the syringe valve 100, e.g., at a vehicle wash applicator 620.

In addition or alternatively, the first outlet 104*d* may be split to send pressurized air to one or more pressure regulators, such as auxiliary pressure regulators of the fluid management system. Some vehicle wash applicators may use pressurized air to facilitate agitation of the chemical solution, for instance to generate a foamed chemical solution, before being dispensed from a downstream applicator (e.g., a foam dispenser). The additional air-line(s) branched from the first outlet 104*d* may deliver this pressurized air to a chamber, such as a foaming chamber, configured to receive the chemical solution from the outlet 140 and the pressurized air from the first outlet 104*d*. In this example, one or more auxiliary air lines and corresponding pressure regulators may also be provided where the chemical solution dispensed from the outlet 140 of the syringe pump is split to multiple applicators; and for example, the additional pressure regulators may be used to tune-in the right amount of foam by adjusting a ratio of air pressure-to-dispensed chemical solution pressure at the outlet 140.

Positions of Fluid Management Systems including Syringe Pumps

Figure 6A:
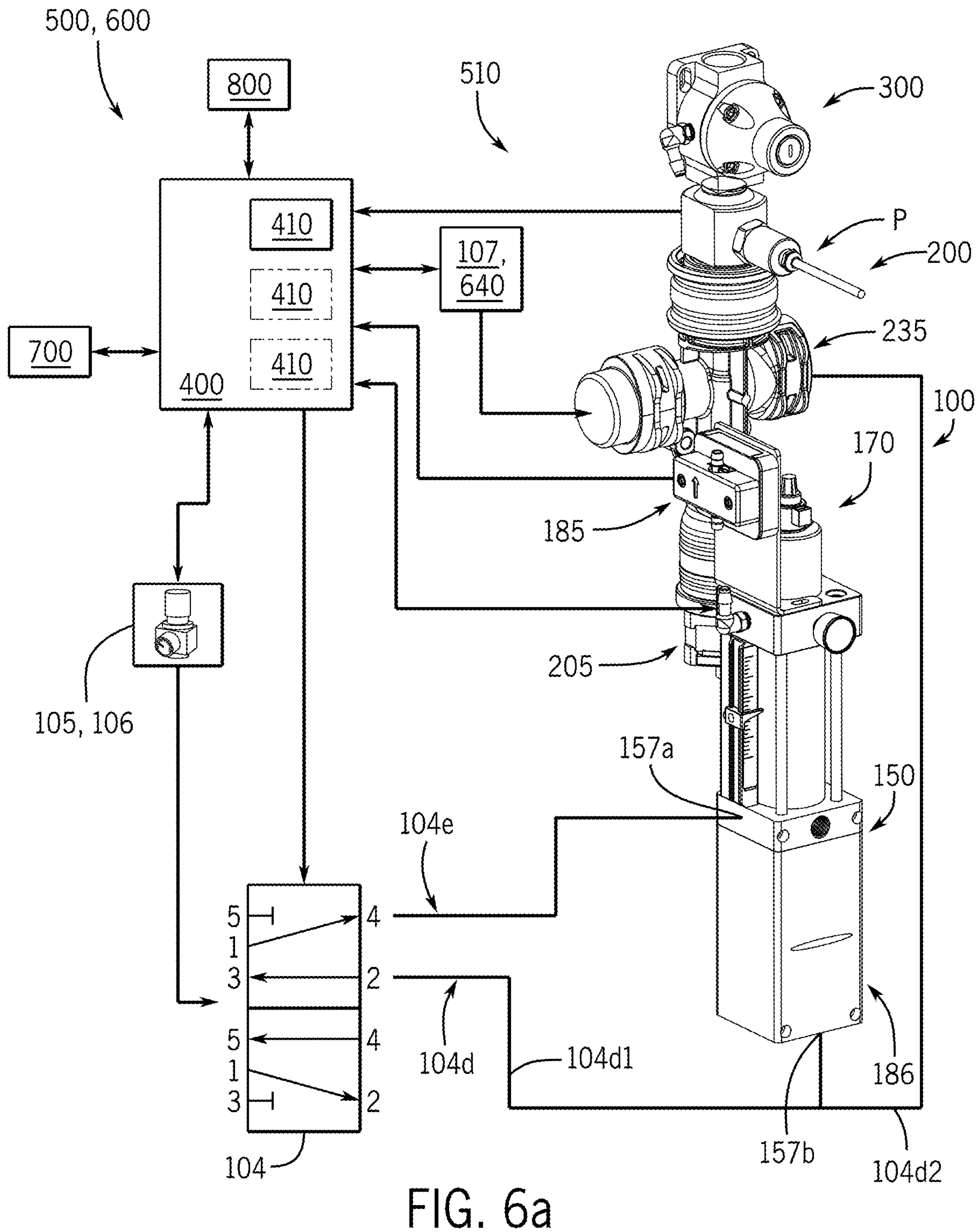
FIG. 6*a* illustrates a position of a fluid management system according to various implementations of the present disclosure.
Figure 6B:
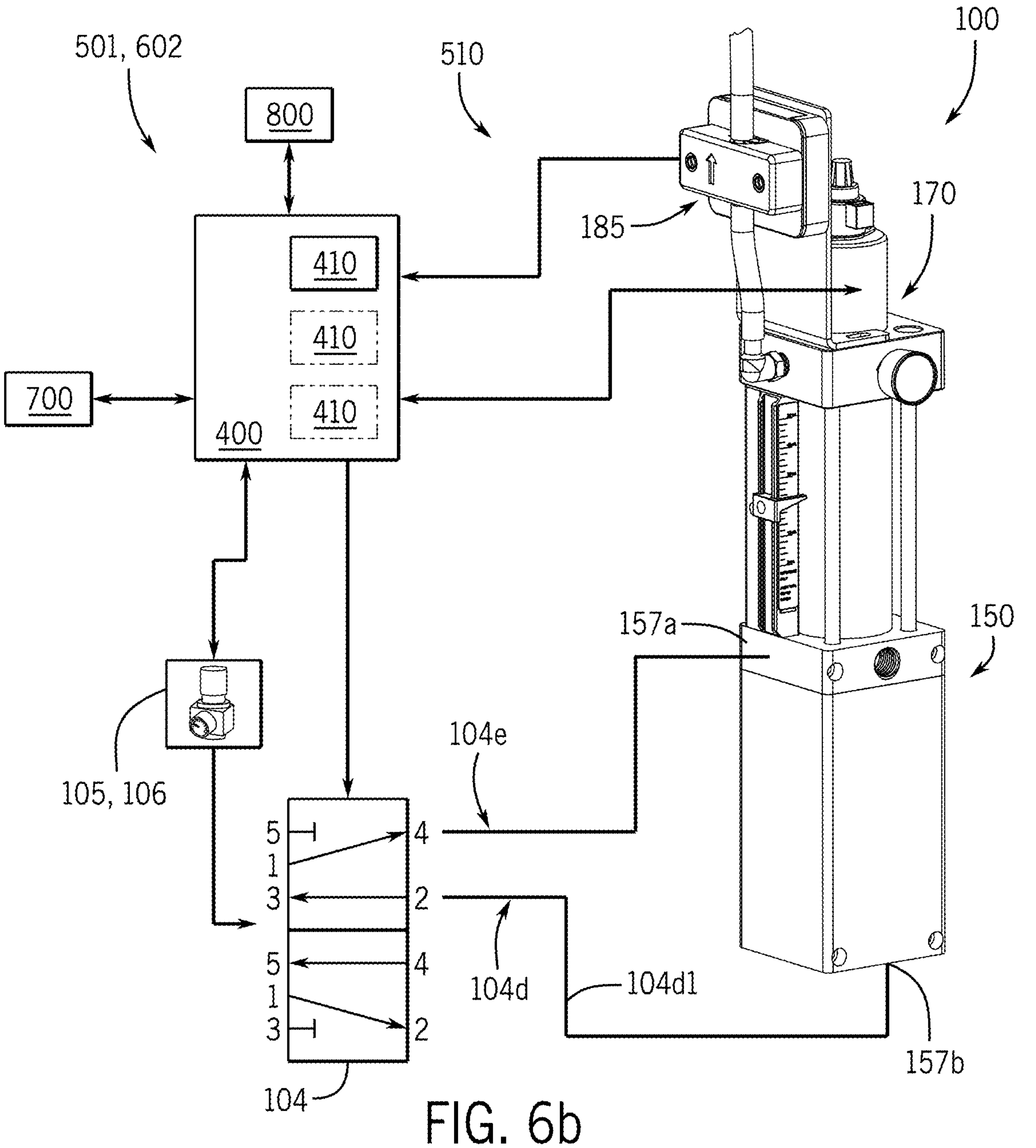
FIG. 6*b* illustrates another position of a fluid management system according to various implementations of the present disclosure.
Figure 6C:
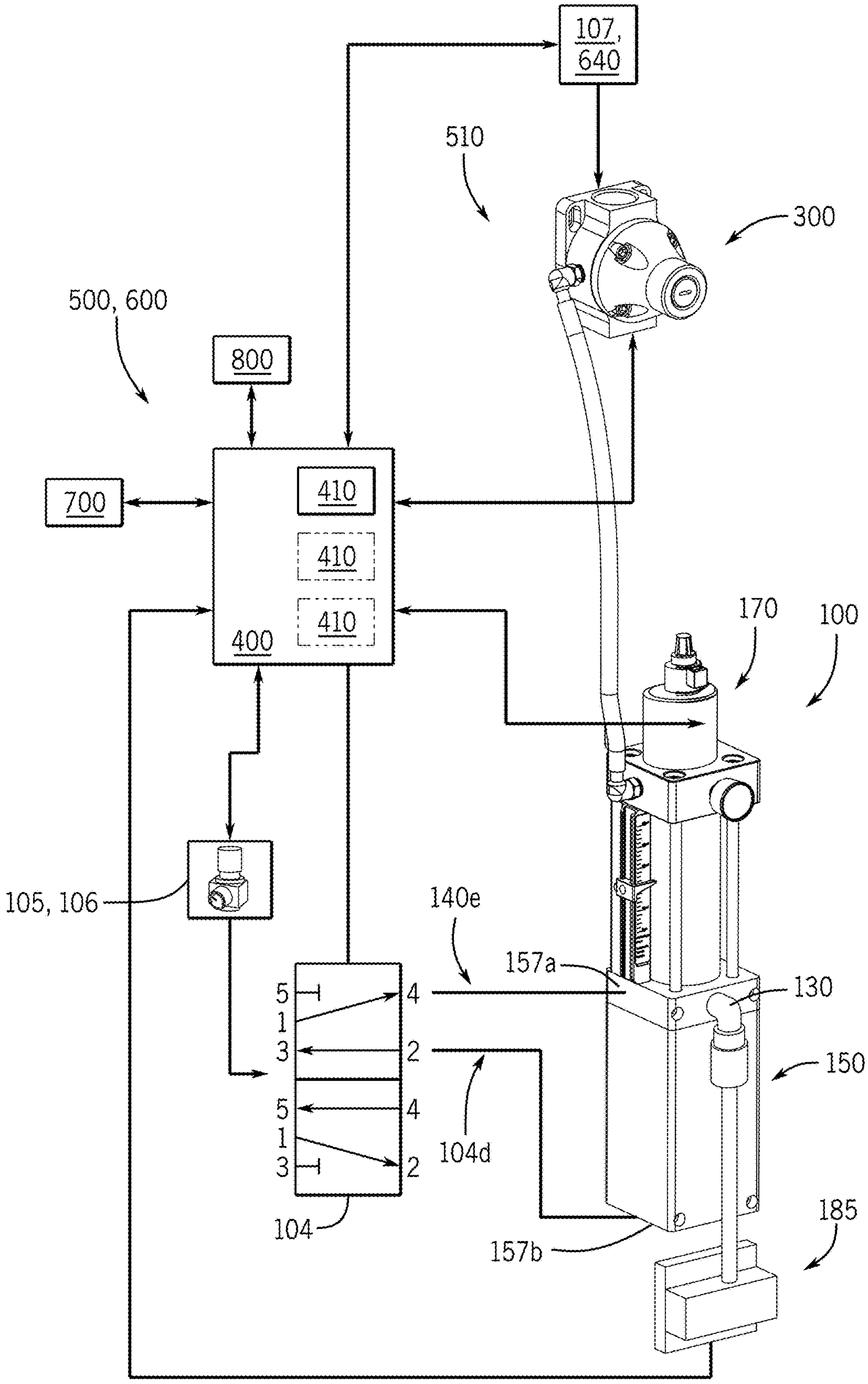
FIG. 6*c* illustrates yet a further position of a fluid management system according to various implementations of the present disclosure.

FIGS. 6*a*-6*c* illustrate positions 510 of the fluid management systems that may be operatively coupled to various components of the vehicle wash systems of FIGS. 4*a* and 4*b*. The position 510 may include one or more vehicle wash components operable to cause fluid to be dispensed from an outlet thereof into a fluid line 635 for application onto a vehicle by a downstream vehicle wash applicator 630 within the vehicle wash system 600 at the vehicle wash location. The positions 510 may be fluidly coupled to one another via a common motive fluid channel such as a common fluid channel 211 or a motive fluid plenum configured to receive the position 510 via a motive fluid inlet thereof. In some cases, an inlet or the outlet of the vehicle wash component may include or be associated with a port configured with an adjustable effective orifice area that may be controlled by the control system 400 as provided herein. The vehicle wash component(s) of the position 510 may have various configurations and may include a combination of the aforementioned mechanical and/or electrical components. For instance, as illustrated in FIG. 6*a*, the position 510 may include a chemical delivery device such as a syringe pump 100, a fluid delivery device such as a fluid delivery manifold 200, a mixing site such as a loading valve 300, one or more flow sensor(s) 185, a linear position feedback system 186, a pressure sensor P or another sensor as well as other mechanical and/or electrical components provided herein. The position 510 is schematically illustrated as being communicatively coupled to the control system 400 and operatively (e.g., fluidly or electrically) coupled to an actuator 104, a pressure regulator 105, a pressurized air source 106 and a pressurized fluid source 107, 640; however, the control system 400 may be coupled to multiple actuation sources as will be appreciated from the various implementations of the present disclosure. Fluid couplings to upstream chemical and motive fluid supplies and to downstream vehicle wash components are illustrated at least in connection with FIGS. 1*a*-1*i*, 4*a*-4*b*, 7*a*-7*d*, 8*a*-9*d* and not repeated herein for the sake of brevity.

Figure 7A:
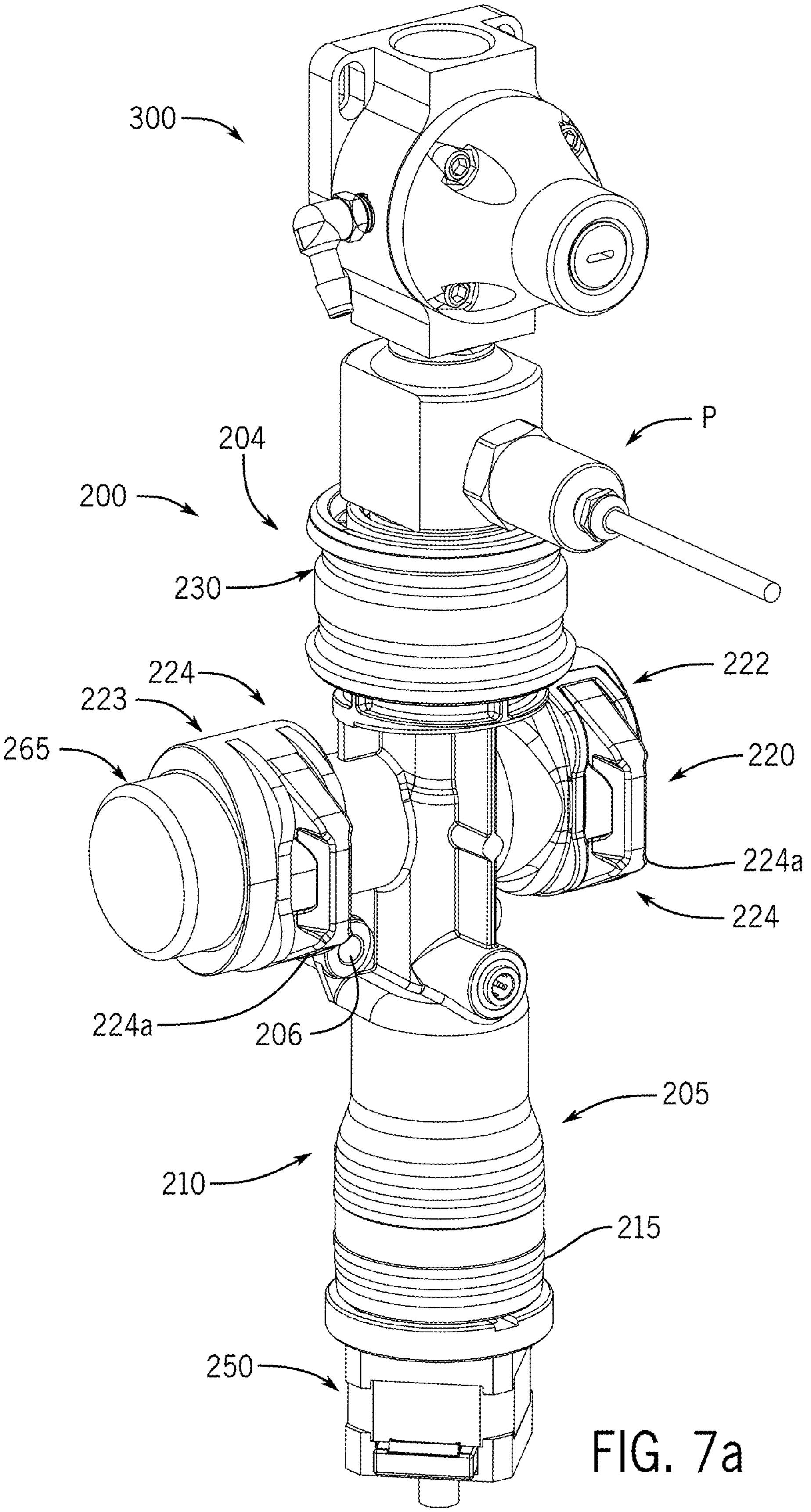
FIGS. 7*a*-7*d* illustrate various views of a fluid delivery manifold, according to various implementations of the present disclosure.
Figure 7B:
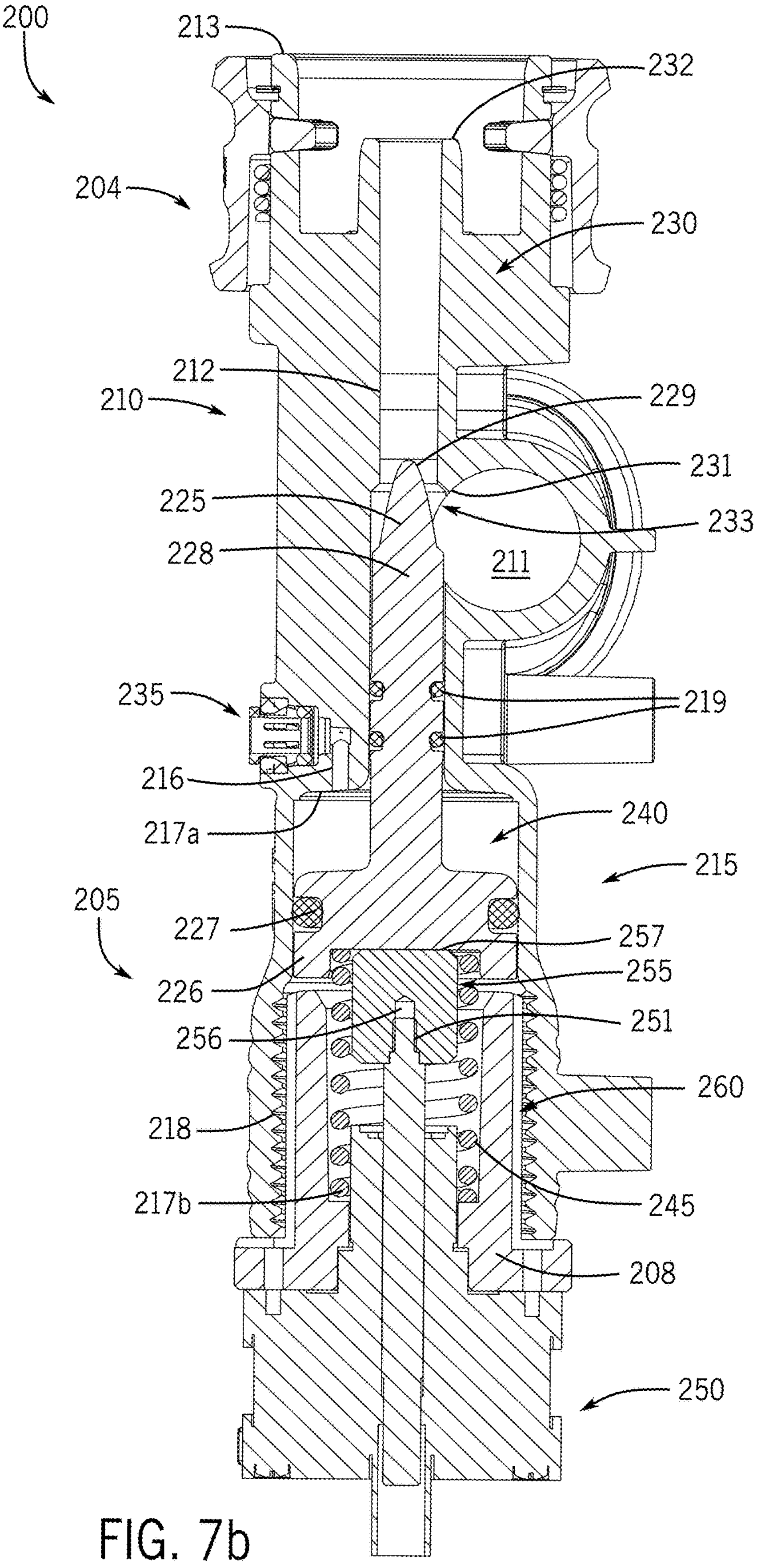

The one or more processors 410 of the control system 400 may be configured to be communicatively coupled at least to the chemical delivery device and the fluid delivery device of the position 510 of FIG. 6*a* to cause chemical and motive fluid to be dispensed therefrom. For instance, the one or more processors 410 may be configured to cause operation of a drive mechanism 150 of the syringe pump 100 such that chemical is dispensed from a chemical outlet 140 (FIG. 1*a*). The one or more processors 410 may also be communicatively coupled to and configured to cause operation of an integrated valve 205 of a fluid delivery manifold 200 such that motive fluid is dispensed from a motive fluid outlet 230 the fluid delivery device 200 (FIGS. 7*a*-7*b*). Details of routing and regulating air pressure to cause actuation of the syringe pumps 100 and the fluid delivery manifold 200 of the fluid management systems are described at least in connection with FIGS. 1*a*-1*j* and 7*a*-7*d*, and are not repeated herein in the interest of brevity.

Figure 9A:
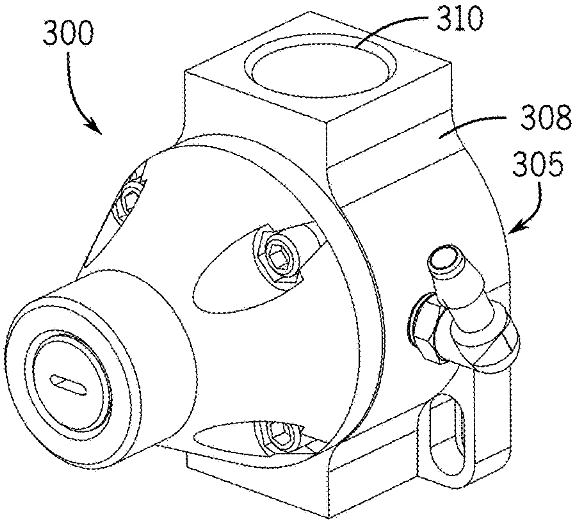
FIGS. 9*a*-9*f* illustrate various views of a loading valve, according to implementations of the present disclosure.

A mixing site, such as a loading valve 300, may be fluidly coupled to the chemical outlet 140 and the motive fluid outlet 230 and configured to receive and mix the dispensed chemical and motive fluid to form a mixture, which may be dispensed from a mixed fluid outlet such as an egress of a motive fluid pathway 310 of the loading valve 300 (FIG. 9*a*). The one or more processors 410 may also be communicatively coupled to and configured to cause a biasing mechanism 315 of the loading valve 300 to operate for instance to change an opening pressure of a loading chamber 335 (FIG. 9*d*). Details of mixing sites configured as a loading valve 300 are described at least in connection with FIGS. 9*a*-9*e*, and are not repeated herein in the interest of brevity.

FIG. 6*b* illustrates another position 510 of the fluid management system 602 along with components of the vehicle wash system 602, according to various implementations of the present disclosure. The position 510 in FIG. 6*b* may include a chemical delivery device such as a syringe pump 100, one or more flow sensor(s) 185, a linear position feedback system 186, a pressure sensor or another sensor as well as other mechanical and/or electrical components provided herein. The features of FIG. 6*b* shared in common with FIG. 6*a* having common reference numbers described above are not repeated herein in the interest of brevity. In addition, any of the positions 510 of FIGS. 6*a*-6*b* may be used in connection with any of fluid management systems and vehicle wash systems of the present disclosure.

FIG. 6*c* illustrates yet a further position 510 of the fluid management systems of the present disclosure, along with components of the vehicle wash system 600. The position 510 in FIG. 6*c* may include a chemical dispensing device such as the syringe pump 100 and a mixing site such as the loading valve 300 fluidly coupled to a motive fluid source, e.g., the pressurized fluid source 107, 640. In FIG. 6*c*, the control system 400 may be communicatively coupled to a biasing mechanism 315 of the loading valve 300, and the control system 400 may be configured to cause the biasing mechanism 315 to operate to change an opening pressure of a chemical loading chamber 335 (FIG. 9*d*) of the loading valve 300 in connection with controlling the delivery of pressurized chemical into motive fluid passing through the motive fluid pathway 310. The features of FIGS. 6*c* shared in common with FIGS. 6*a* and 6*b* having common reference numbers described above are not repeated herein in the interest of brevity. In addition, any of the positions 510 of FIGS. 6*a*-6*c* may be used in connection with any of fluid management systems and vehicle wash systems of the present disclosure.

The positions 510 may be mounted on a common panel 101 or other structure as provided herein. In some examples the multiple positions 510 of a given panel 101 may be dedicated to a single bay or tunnel of a vehicle wash location. Alternatively, the multiple positions 510 of a given panel 101 may dispense to multiple bays or tunnels at the vehicle wash location. In another example, the multiple positions 510 of a given panel 101 may be dedicated to dispensing on a single car during a vehicle wash operation. Alternatively, the positions of the panel may dispense on multiple vehicles simultaneously or substantially simultaneously as the vehicles pass through the vehicle wash location in sequence within the tunnel or in parallel when multiple bays or tunnels are used simultaneously at the vehicle wash location.

Fluid Delivery Manifold

Figure 7C:
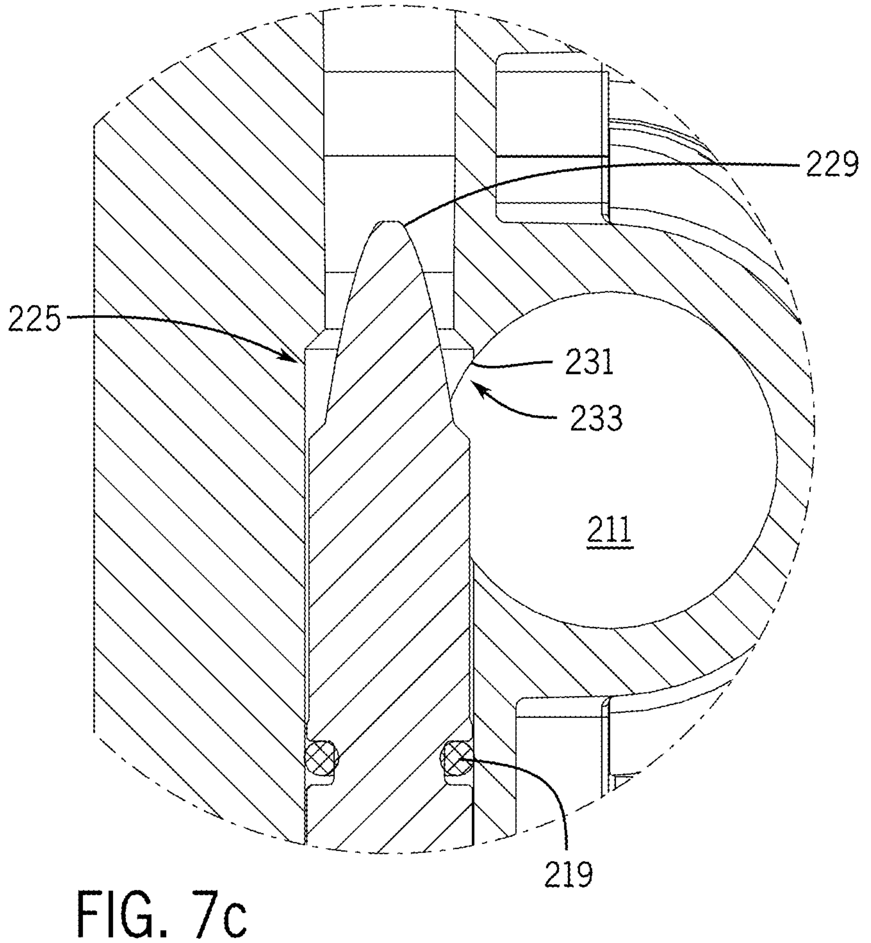
Figure 7D:
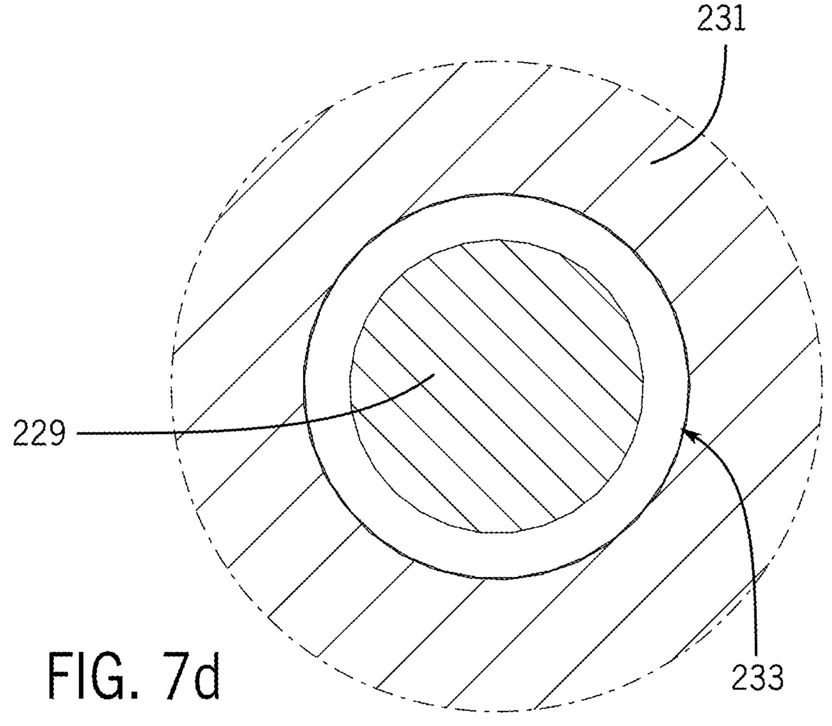

According to certain implementations, a fluid delivery manifold 200 may be configured to deliver motive fluid for mixing with dispensed chemical from the syringe pump 100. FIGS. 7*a*-7*d* illustrate a fluid delivery manifold 200 according to various implementations of the present disclosure. In FIG. 7*a*, the fluid delivery manifold 200 is coupled to a loading valve 300 via a coupling mechanism 204. FIG. 7*b* is a cross-section of the fluid delivery manifold 200. FIGS. 7*c* and 7*d* are detail views of the cross-section of FIG. 7*b* taken parallel and perpendicular to the cross-sectional plane of FIG. 7*b*. FIG. 7*d* The fluid delivery manifold 200 may be a single inlet, single outlet manifold with an integrated valve 205, however, the fluid delivery manifold 200 may be coupled to adjacent fluid delivery manifolds 200 via their inlets to form a single fluid delivery manifold 200 with a single inlet and multiple outlets, for instance as shown in the fluid management system 500 of FIG. 3*a*. The coupling mechanism 204 may be formed integrally with the fluid delivery manifold 200 and may couple to downstream components such as the loading valve 300, a pressure sensor P, or other fluid delivery components and conduits. Mounting structures 206 such as feet or fasteners may be integrally formed in the fluid delivery manifold 200 for securing to various external surfaces and/or objects, such as the common panel 101 of the disclosed fluid management systems.

The fluid delivery manifold 200 of FIGS. 7*a* and 7*b* additionally includes a manifold housing 210, a plunger housing 215, a motive fluid inlet 220, a valve plunger 225, a motive fluid outlet port 230, an air inlet port 235, an air chamber 240, a return spring 245, a linear actuator 250, a valve limiter 255, and an end cap 265.

The integrated valve 205 may be arranged opposite the coupling mechanism 204 and may be configured as an air-actuated integrated valve 205. The integrated valve 205 may be configured to house and receive at least portions of the valve plunger 225, the air inlet port 235, the air chamber 240, the return spring 245, the linear actuator 250, and the valve limiter 255. The integrated valve may include a sleeve 208 configured to facilitate receipt of such components and may be threaded or have another coupler for engagement with the integrated valve 205 and/or the plunger housing 215.

The valve plunger 225 may be configured to be received in the integrated valve 205, e.g., the plunger housing 215, and extend into the motive fluid outlet port 230. Movement of the valve plunger 225 during operation of the fluid delivery manifold 200 may unblock the fluid coupling between the inlet 220 and the fluid outlet port 230 to permit motive fluid to flow through the outlet port 230.

Actuation of the fluid delivery manifold 200 may involve actuation of the valve plunger 225 using pressurized driving fluid, such as pressurized air, delivered via the air inlet port 235 resulting in pressurization of the air chamber 240. Upon reaching a pressurization threshold within the air chamber 240, the pressure causes the valve plunger 225 to overcome the biasing force of the return spring 245 that normally forces the valve plunger 225 into the retracted position, resulting in the tip 229 carried by the stem 228 moving by a predetermined opening distance to an open position to thereby permit the motive fluid to pass from the common channel 211 through the outlet ingress 231 at a rate determined by the size of the opening defined by the movement of the valve plunger 225 away from outlet ingress 231. In FIG. 7*d*, the ingress 231 of the fluid outlet 230 is illustrated as a circle at which point the water outlet is the most necked down.

The actuation of the fluid delivery manifold 200 may correspond to an on cycle where the motive fluid is dispensed from the fluid outlet port 230 such that the motive fluid can mix with dispensed chemical at a mixing site, such as the loading valve 300 described herein. In some cases, the fluid outlet port 230 may be fluidly coupled a motive fluid inlet or pass-through conduit 310 of the loading valve 300, e.g., directly via the coupling mechanism 204, and a check valve may be provided between the outlet port 230 and pass-through conduit 310 to prevent backflow. When the check valve is closed, the fluid outlet port 230 may be sealed, thereby maintaining a fluid tight connection with the loading valve 300 and causing fluid between the check valve and the pass-through conduit 310 to remain pressurized to facilitate passage of the fluid through the pass-through conduit 310 when the check valve is open for instance in a next on cycle of the fluid delivery manifold 200.

In some implementations, the delivery of the motive fluid is controlled by a solenoid valve, such as valve 104 configured to deliver the pressurized air to the integrated valve 205 of the fluid delivery manifold 200 during the on cycle to cause motive fluid to be dispensed. After the on cycle, the valve stops the delivery of the pressurized air to the integrated valve 205 and the fluid delivery manifold 200 may be in an idle state until the valve 104 switches the routing of air delivery to initiate a subsequent on cycle.

In some cases, the valve 104 may deliver pressurized air to both the syringe pump 100 and a corresponding integrated valve 205 of the fluid delivery manifold to cause the valve plunger 225 to retract from a valve orifice 233 to cause the on cycle such that the drive mechanism 150 of the corresponding syringe pump 100 and integrated valve 205 are operated by a common control signal and/or by a common pressurized fluid source. For instance, the valve 104 may deliver pressurized air to both the drive mechanism 150 of the syringe pump 100 and a corresponding integrated valve 205 of the fluid delivery manifold 200 to cause the on cycle by the valve plunger 225 retracting from a valve orifice 233 and to cause the dispensing stroke of the corresponding syringe pump 100 thereby resulting in operation by a common control signal and/or by a common pressurized fluid source. For instance, the valve 104 may be coupled between the pressurized fluid source, e.g., a compressed air pump, and ports of the integrated valve 205 and the drive mechanism 150, and actuation of the valve 104 may result in the syringe pump 100 and the fluid delivery manifold 200 being operated by a common control signal.

The valve 104 may be controlled by the control system 400, and as a result, the common control signal may be a signal sent from the control system 400 for operating the valve 104, which may be a signal that causes the valve 104 to switch.

When used in a fluid management system, e.g., 500, the fluid delivery manifold 200 may have a single inlet and a plurality of fluid outlet ports 230. For instance, inlets 220 of the individual manifolds may be coupled to define a common fluid channel 211 (FIG. 7*b*) so that motive fluid received at the inlet 220 flows through the common fluid channel 211 and through a respective fluid outlet port 230 during actuation of a corresponding integrated valve 205.

The fluid delivery manifold 200 may be controlled by the control system 400 to deliver the pressurized motive fluid, and for instance the control system 200 may be operably coupled to the linear actuator 250 and/or to the valve 104 when the integrated valve 205 is operated using pressurized air. The control system 400 may be integrated into the fluid management system 500 or components thereof.

The fluid outlet ports 230 of the fluid delivery manifold 200 may be fluidly coupled to the loading valve 300 via an inlet of the pass-through conduit 310 to enable dispensed motive fluid to be mixed with dispensed chemical from the syringe pump 100 as provided herein.

Fluid Dispensing from Syringe Pump and Fluid Delivery Manifold

Figure 8:
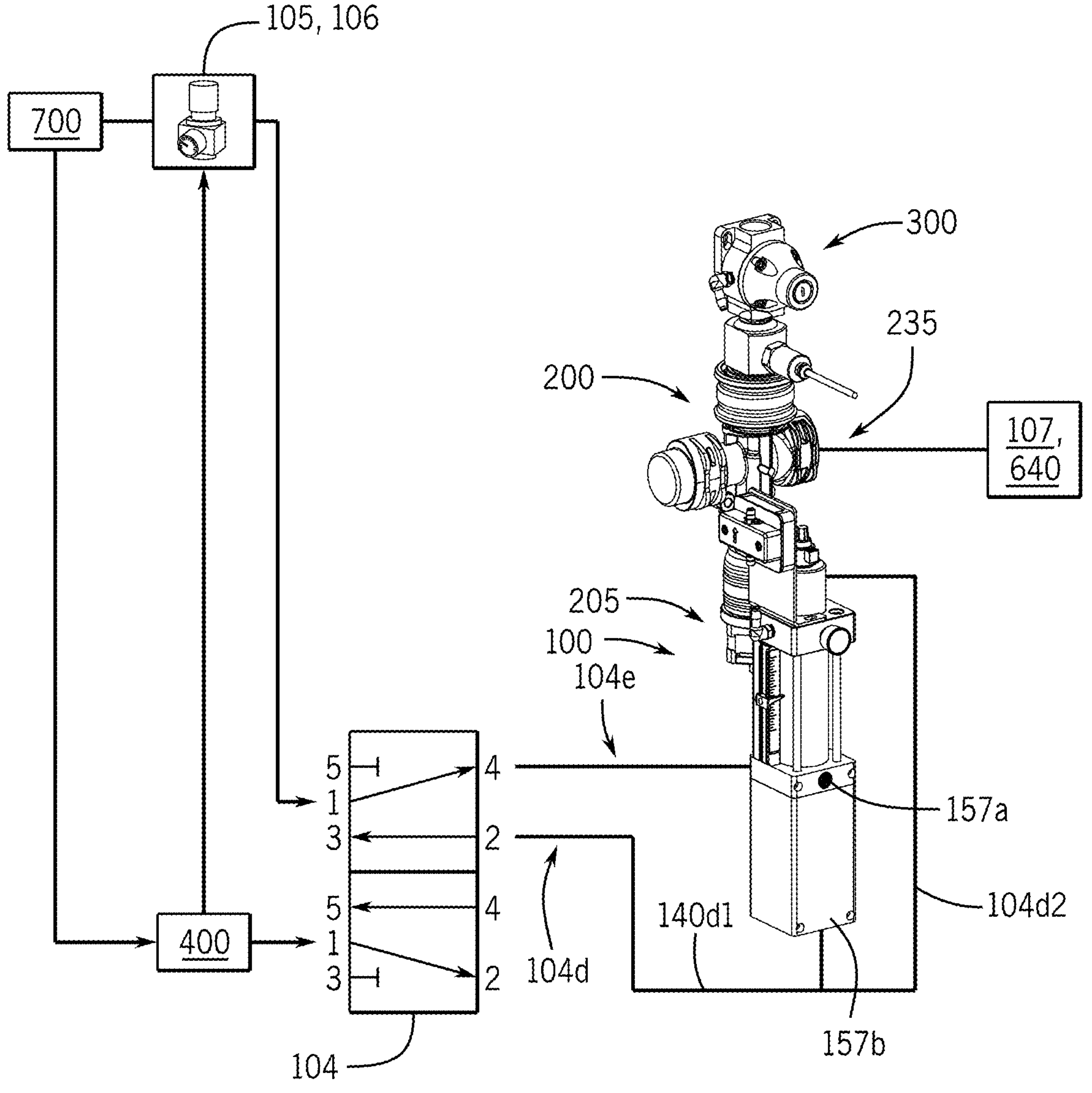
FIG. 8 is a schematic diagram of a valve circuit of the fluid management systems, according to various implementations of the present disclosure.

According to certain implementations, the syringe pump (s) 100 may operate in combination with other air driven components including the fluid delivery manifold 200 to dispense chemical and motive fluid. Turning to FIG. 8, the valve 104 may be operated to coordinate operation of the syringe pump 100 and the fluid delivery manifold 200, which are shown as a vehicle wash assembly. Although one vehicle wash assembly is shown in FIG. 8, it will be appreciated that multiple valves 104 may be provided to operate multiple assemblies, and for instance, the inlets of the fluid delivery manifold 200 may be coupled to define a fluid ingress channel 211 (FIG. 7*b*) and be implemented in a fluid management system of the present disclosure. In FIG. 8, the first outlet 104*d* of the valve 104 is illustrated as being split to the lower cavity 152*b* of the syringe pump 100 as well as to the fluid delivery manifold 200.

In operation of the assembly, in the absence of a control signal, the valve 104 may be in the idle state, and the piston 153 may be held under pressure in its retracted state, and the valve plunger 225 (FIG. 7*b*) may block the valve orifice 233 to prevent flow of motive fluid from the fluid outlet 230 of the fluid delivery manifold 200, e.g., due to the biasing force of the return spring 245 holding the valve plunger 225 in the closed position.

Upon receipt of a control signal, the valve 104 may switch and cause the first outlet 104*d* move to an open position and the pressurized air to be routed from the split port 104*d*1 to the lower pneumatic port 157*b* to activate the plunger 153 such that the drive mechanism 150 dispenses the pressurized chemical from the outlet 140 of the syringe pump 100, while the pressurized air from the split port 104*d*2 simultaneously delivers pressurized air to the air inlet port 235 of the integrated valve 205 of the fluid delivery manifold 200 (FIG. 7*b*), resulting in dispensing of motive fluid for downstream mixing with the dispensed chemical at the loading valve 300 or other mixing site.

During the dispensing stroke of the syringe pump 100, the pressure experienced by the liquid chemical in the fluid chamber 112 is due to the drive mechanism 150 exerting a driving force on the piston 120 in the distal or dispensing direction of the syringe pump 100. More particularly, the force of the drive mechanism 150 in the dispensing direction results in the one-way valve 124 of the piston 120 being forced shut, thus pressurizing the chemical in the upper chemical chamber 112*a*, which is sealed via the circumferential seal 123 and closed one-way valve 124. The pressurized chemical is thus forced from the upper chemical chamber 112*a* into the adjustable valve 170, first through a valve orifice 171 (FIG. 1*g*), and then past the upper check valve 176 to the outlet 140 and fluidly coupled downstream components, e.g., one or more outlet tubes 144, 146. Due to the fluid coupling of the syringe pump 100 to the loading valve 300, e.g., directly or via the outlet tube 146 (FIG. 1*h*), the loading valve 300 begins to pressurize during the dispensing stroke as the pressurized chemical is received therein from the syringe pump 100. As the fluid pressure builds within a normally closed loading chamber 335 (FIG. 9*d*) of the loading valve 300, the pressure eventually reaches a point at which the force of the pressurized chemical in the loading chamber 335 is great enough to overcome an opening threshold, e.g., of a biasing mechanism 315 (e.g., FIG. 9*b*), and cause the loading valve 300 to open and permit passage of pressurized chemical from the loading chamber 335 into a motive fluid pathway 310 (e.g., FIG. 9*d*) of the loading valve 300 such that a mixed solution of motive fluid and pressurized chemical is directed to the one or more vehicle wash applicators 630. In such embodiments, the pressurized chemical may be injected into the motive fluid stream by pressurizing the chemical to a pressure greater than that of the motive fluid. In other words, in implementations, the pressure delta from the fluid to the chemical must be greater than zero to achieve chemical injection.

Once the dispensing stroke of the dispensing cycle ends, the fluid pressure within the loading chamber 335 rapidly drops and it returns to its normally closed position to stop the flow of chemical from the loading valve 300. Since the loading valve 300 closes or shuts-off once the chemical pressure has dropped below its opening threshold, the chemical within the fluid coupling between the loading valve 300 and the syringe pump 100 (e.g., in the chemical outlet tubes 144, 146 or other fluid conduit defined in a body or housing of the assembly) remains pressurized between dispensing cycles. As a result, when the next dispensing cycle starts, only a small amount of pressure needs to be built up in order to overcome the opening threshold of the loading chamber 335, also resulting in a rapid injection response upon the start of the next or subsequent operational cycle of the syringe pump 100 or system 500.

Once the on cycle of the fluid delivery manifold 200 has ended, the valve 104 switches returning the fluid delivery manifold 200 to its idle state, and the air inlet port 235 is relieved or vented to atmosphere. The pressure within the integrated valve 205 drops and the valve plunger 225 returns back into its fully extended position to block the valve orifice 233, e.g., under the force of a return spring 245, thereby prohibiting flow of motive fluid. The valve plunger 225 remains in this extended position with the valve orifice 233 closed-off until the next on cycle is triggered.

The end of the on cycle and dispensing stroke may coincide with each other for instance when a same or a common valve 104 is fluidly coupled to each of the syringe pump 100 and fluid delivery manifold 200, for instance as shown in FIG. 8. In such cases, a duration of the dispensing stroke and a duration of the on cycle may be the same. Further, the dispensing stroke and the on cycle may be initiated simultaneously. In alternative configurations, separate valves 104 of the valve bank 103 of the fluid delivery system 500 may be responsible for actuating a respective syringe pump 100 and fluid delivery manifold 200. In such cases, the air signals delivered to the fluid delivery manifold 200 and the syringe pump 100 from separate valves 104 may differ from one another, for instance in order to provide a different duration of the air signal delivered for the dispensing stroke of the syringe pump 100 compared to the duration of the air signal delivered for the on cycle of the fluid delivery manifold 200, to stagger the air signals, to split the air signals for use with other pneumatically operated vehicle wash components, to operate the components at different pressures, and combinations thereof.

In some implementations, the control system 400 and/or the main car wash controller 700 may signal operation of the assembly components. The car wash controller 700 may send a signal to the control system 400, and the control system 400 may analyze the received signal and generate a new control signal for sending to the pressure regulator 105 and/or the valve(s) 104, to initiate the dispensing operation of the syringe pump 100 and the fluid delivery manifold 200.

The rate at which the chemical is dispensed from the syringe pump 100 and into the loading chamber 335 may be controlled by the effective valve orifice area of the valve orifice 171 of the adjustable valve 170 of the syringe pump 100, as provided above in connection with FIGS. 1*a*-1*j*, or may be controlled using other approaches provided herein.

Syringe Pump Distribution of Pressurized Chemical to Loading Valve/Mixing Site

The loading valve 300 may be used in combination with the vehicle wash components or be included in the fluid management systems herein to provide improved dosing consistency and responsiveness. The loading valve 300 may sometimes be referred to herein as a mixing chamber and may be a type of mixing site. The loading valve 300 is a departure from prior vehicle wash components and systems by the elimination of venturi-style chemical injection, which relies on vacuum pressure for the injection of chemicals into the system, e.g., for mixing with motive fluid. The syringe pumps 100 and other components of the fluid management system 500 that may be used in connection with the loading valve 300 are described at least in connection with FIGS. 1*a*-1*j*, and consequently, a detailed description of the operation of these elements will not be repeated in the interest of brevity.

The loading valve 300 may be located downstream of a respective syringe pump 100 and fluid delivery manifold 200, when present, for example as shown in FIG. 3*a*. When downstream of the syringe pump 100 alone (e.g., FIG. 1*h*), the loading valve may serve to regulate chemical dosing into downstream components based on receipt of pressurized chemical. When downstream of both the syringe pump 100 and the fluid delivery manifold 200 (e.g., FIG. 3*a*), the loading valve 300 may also function as a mixing site in which the fluid and chemical are mixed.

As illustrated in FIGS. 9*a*-9*e*, the loading valve 300 may include a chemical inlet 305, a pass-through conduit 310, a biasing mechanism 315, diaphragm 320, an injection nozzle 325, a sealing lip 330, a chemical priming cavity 335 configured as a loading chamber, and a buffer 340.

Figure 9B:
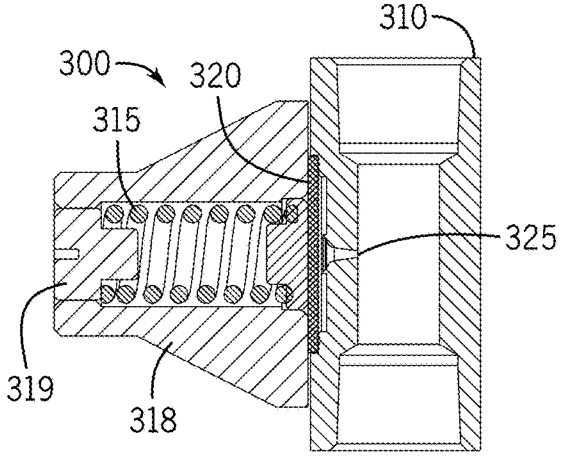
Figure 9C:
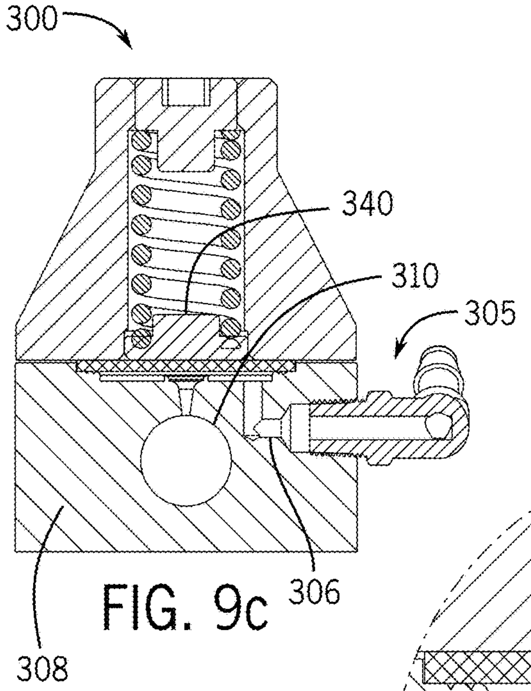
Figure 9D:
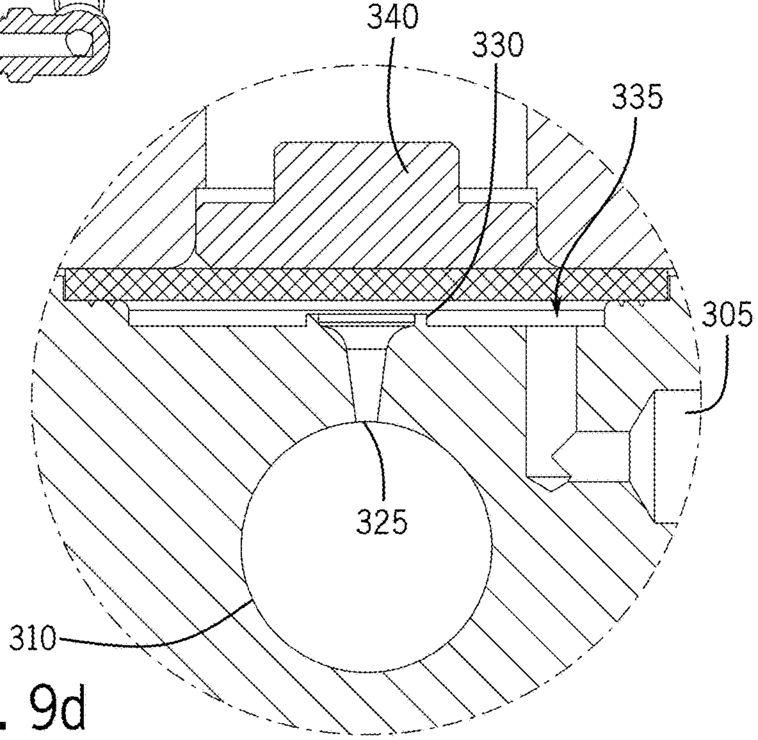
Figure 9E:
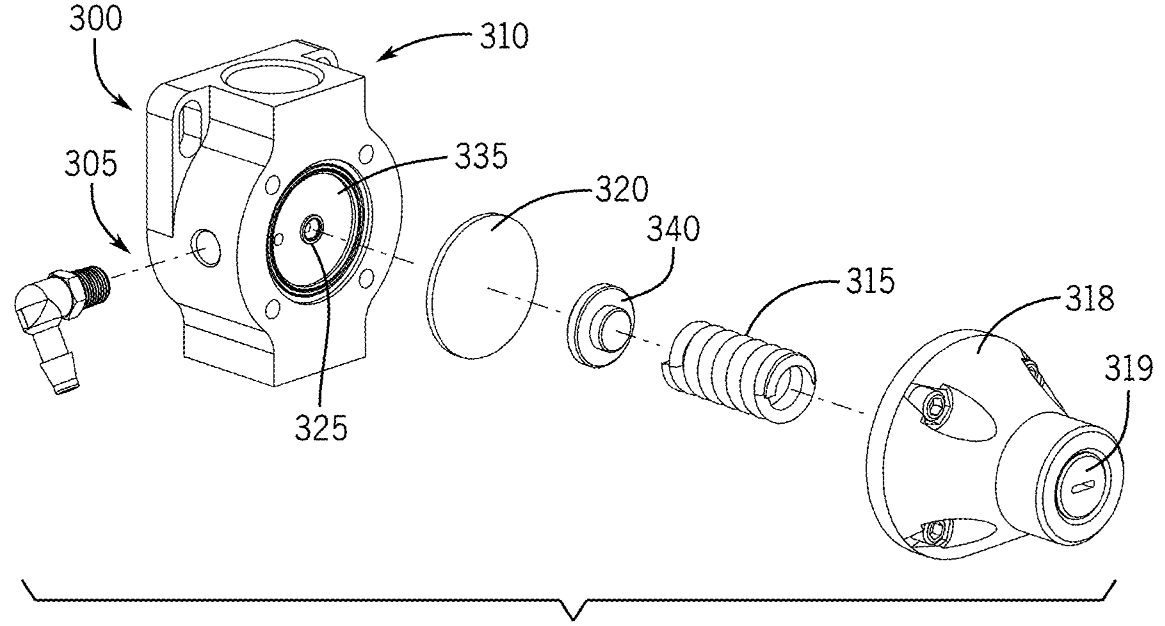

As shown in FIGS. 9*b* and 9*c*, the chemical inlet 305 may include a channel 306 defined in a main body 308 of the loading valve 300. An ingress of the chemical inlet 305 may include a coupler as disclosed herein for coupling to fluid conduits such as the outlet tube 146 or directly to the outlet 140 of the syringe pump 100. For instance, the coupler may include an L-shaped fitting as shown in FIGS. 9*a* and 9*c* having any suitable configuration. The chemical inlet 305 and the outlet 140 of the syringe pump 100 may be coupled in a fluid tight connection. An egress of the chemical inlet 305 may define an opening in the priming cavity 335 and may thus supply the chemical to the priming cavity 335. In some implementations, more than one chemical inlet 305 such as two, three, four or five chemical inlets 305 may be included in the loading valve 300 and be configured to receive chemicals from multiple syringe pumps 100.

The main body 308, in addition to including the chemical inlet 305, may additionally include and/or define the pass-through conduit 310, the injection nozzle 325, the sealing lip 330, and the chemical priming cavity 335.

The pass-through conduit 310 may be configured as a motive fluid pathway for receiving motive fluid, e.g., from a fluid source such as the fluid delivery manifold 200, and injected chemical therein, e.g., via the injection nozzle 325. The pass-through conduit 310 may join to fluid conduits such as tubes, and at an ingress, the pass-through conduit 310 may carry motive fluid, and at the egress, the pass-through may carry a mixed solution of the motive fluid and the injected chemical to one or more downstream components such as the vehicle wash applicators 620, 630.

The biasing mechanism 315 may be secured in a biasing mechanism housing 318, which may be joined to the main body 308. The biasing mechanism 315 may be configured as a coil spring which may be used in combination with an adjustable compression screw 319 which serves to adjust the amount of preload on the coil spring, thereby adjusting an opening pressure of the loading valve 300. In some implementations, the biasing mechanism 315 may be calibrated to a selected pressure value (e.g., 100 psi or a pressure greater than the pressure of the fluid within the pass-through conduit 310), and a calibrated biasing mechanism may be non-adjustable, e.g., without an adjustable compression screw. In yet other implementations, the biasing mechanism 315 may be pressurized air instead of a coil spring, and the pressurized air may would serve the same function of exerting a predefined level of constant force on the top of the diaphragm 320.

The diaphragm 320 may be configured as an elastomeric seal, e.g., a flexible disc or sheet, which may cooperate with the sealing lip 330 to seal and hold chemical within the chemical priming cavity 335 in a closed position, and may move to an open position upon the fluid pressure within the chemical priming cavity 335 reaching an opening pressure that overcomes the biasing pressure of the biasing mechanism 315.

The injection nozzle 325 may be configured to inject the pressurized chemical into the motive fluid upon the requisite fluid pressure being reached in the loading valve. The ingress of the injection nozzle 325 may be surrounded by the sealing lip 330 and accordingly may be configured to be sealed by the diaphragm 320 in the normal position of the loading valve 300. The injection nozzle 325 may be configured as a multi-orifice nozzle as an alternative to the single-orifice nozzle shown in FIGS. 9*a*-9*e*. Using a single-orifice nozzle may facilitate injection of high viscosity chemicals, e.g., through a larger single orifice, which may also have more resistance to clogging compared to smaller, multiple orifices, while using a multi-orifice nozzle at the injection point may result in an increased chemical injection velocity and may improve atomization of the chemical to better homogenize the mixture. The injection nozzle 325 may be a replaceable component, allowing for easy repair and selection of varying spray patterns. This may enable injection nozzles of various configurations, e.g., spray profiles and pressures, to be used based on desired spray characteristics.

The sealing lip 330 may be configured to be covered and sealed by the diaphragm 320 and may surround the ingress of the injection nozzle 325.

The chemical priming cavity 335 may be configured as a loading chamber and may receive pressurized chemical from the egress of the channel 306 of the chemical inlet 305. The priming cavity 335 may be covered by the diaphragm 320, and the configuration of the priming cavity 335 and its components such as the sealing lip 330 the injection nozzle 325, the diaphragm 320, and/or a ratio of areas on the diaphragm 320 which are separated by the sealing lip 330 (e.g., the area encompassed on the diaphragm by the priming cavity 335 and the area within the sealing lip 330) may be selected based on desired injection characteristics such as desired chemical volume of the priming cavity 335, desired dilution rates, desired chemical flow rates, and so on.

The buffer 340 may be located between the biasing mechanism 315 and the diaphragm 320 and may serve the purpose of more evenly distributing the force from the biasing mechanism 315 into the diaphragm 320.

The loading valve 300 may be configured to prohibit chemical received from the syringe pump 100 from exiting through the injection nozzle 325 until the chemical pressure has reached a predefined threshold; may be configured to function as a check valve for preventing fluid received from the motive fluid source, e.g., the fluid delivery manifold 200, from back-flowing into and through the chemical inlet 305; may serve as a mixing/injection site for introduction and mixing of the chemical with the stream of motive fluid; may prevent siphoning of the chemical into the motive fluid stream; may serve to trap pressure within the chemical conduit(s) coupling the loading valve 300 to the syringe pump 100, e.g., the chemical outlet tubes 144, 146; and/or may provide a sharp cut-off of chemical flow once the syringe pump 100 injection cycle ends and the chemical pressure begins to drop.

When the syringe pump 100 or fluid management system (e.g., systems 500, 501, 504) is idle or between operational cycles, the loading valve 300 may be in a normal/closed position due to the biasing mechanism 315 being in a relaxed, untensed state. In this normal/closed position, the biasing mechanism 315 may exert a biasing pressure as a downward force on the diaphragm 320, resulting in the diaphragm 320 flexing and being forced into the sealing lip 330. In this position of the diaphragm 320, the chemical priming cavity 335 is sealed from the injection nozzle 325 and flow of chemical through the nozzle 325 may thus be prohibited. Since the chemical priming cavity 335, chemical inlet 305, the chemical conduits (e.g., outlet tubes 144, 146) and the syringe pump 100 are all fluidly coupled, when the syringe pump 100 injection cycle begins the chemical contained within this fluid coupling begins to pressurize. As the fluid pressure builds within the chemical priming cavity 335, the pressure eventually reaches a point at which the force of the pressurized chemical exerted on the diaphragm 320 is great enough to overcome the biasing force of the biasing mechanism 315. As the pressure exceeds the force exerted by the biasing mechanism 315, the diaphragm 320 begins to separate from the sealing lip 330 and permits passage of pressurized chemical from the priming cavity 335 into the injection nozzle 325. Similarly, once the injection cycle ends, the fluid pressure within the chemical priming cavity 335 rapidly drops (e.g., to just below a cracking pressure of the diaphragm 320, such that the priming cavity 335 maintains some pressure to facilitate in the next dispensing stroke building pressure quickly), and the biasing mechanism 315 once again forces the diaphragm 320 into the closed position and stops the flow of chemical. In this state, the chemical outlet 140 of the syringe pump 100 may also be sealed, e.g., via a check valve 176, thereby maintaining the fluid tight connection with the loading valve 300 and causing the chemical therein to remain pressurized to facilitate passage of the pressurized chemical into the priming cavity 335 in a next dispensing.

The pressure at which the loading valve 300 opens may be controlled using one or more approaches such as by controlling the area under the diaphragm 320 within the chemical priming chamber 335 in which the chemical acts, as well as by controlling the force exerted by the biasing mechanism 315 as provided herein above. To facilitate chemical injection, the loading valve 300 may be configured such that the opening pressure of the pressurized chemical is greater than the pressure of the fluid within the pass-through conduit 310 in which the chemical will be injected via the injection nozzle 325.

The loading valve 300 may also function as a check valve. More particularly, the loading valve 300 may be configured such that the area on the diaphragm 320 acted upon by the pressure of the motive fluid within the pass-through conduit 310 is far lower than the area on the diaphragm 320 acted upon by the pressure of the chemical within the chemical priming cavity 335. Due to the large difference an area, this means that the pressure of the motive fluid (e.g., water) within the pass-through conduit 310 must be far greater than the pressure of the chemical within the chemical priming cavity 335 in order to overcome the biasing mechanism 315 and backflow through the loading valve 300. For example, if the area on the chemical region of the diaphragm 320 is 3 times greater than the area of the motive fluid region of the diaphragm 320 and the opening pressure in the chemical priming cavity 335 is designed to be 100 psi, then the pressure necessary for the motive fluid to backflow past the diaphragm 320 would be 300 psi, which is far greater than the fluid pressure will reach under normal operating conditions.

The design of the loading valve 300 also prevents siphoning of the chemical into the motive fluid stream. Siphoning can occur once the injection cycle has ended, but the momentum of the motive fluid stream causes flow to continue through the pass-through conduit 310 for a short period. This may cause a small vacuum (drop in pressure) to occur within the pass-through conduit 310. Without the loading valve 300 this could cause unwanted chemical to be drawn into the motive fluid stream, however with the loading valve 300 this vacuum will cause the diaphragm 320 to be pulled tightly against the sealing lip 330, immediately preventing more chemical flow from occurring.

Figure 9F:
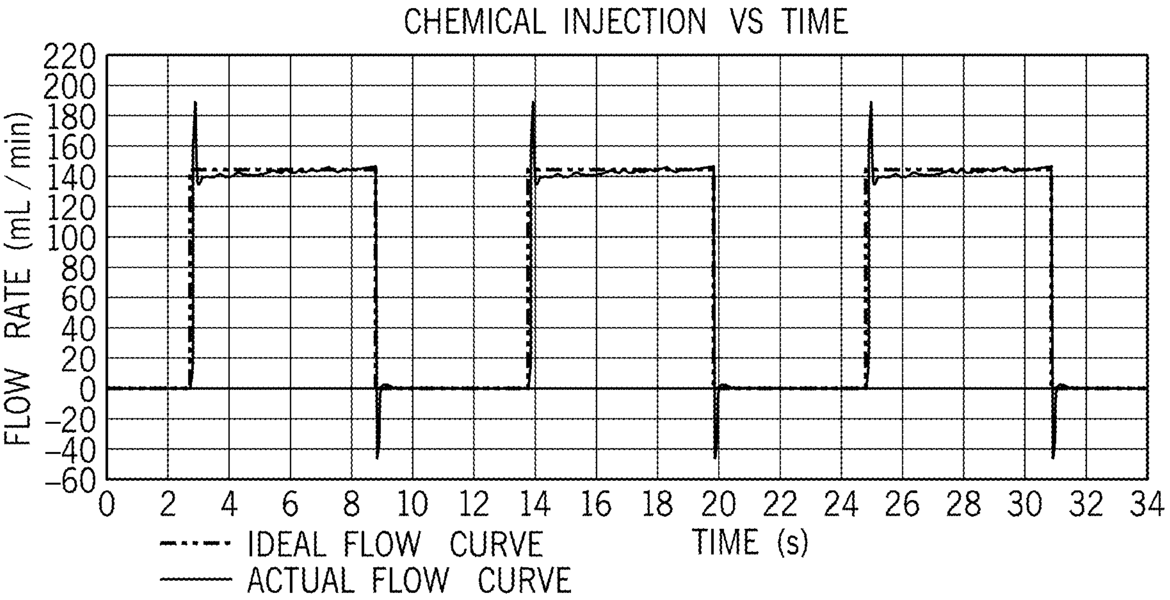

The configuration of the loading valve 300 may enable it to provide a sharp onset and shut-off of chemical flow into the pass-through conduit 310, where the loading valve 300 produces a curve for flow vs. time for both chemical and motive fluid very close to a square wave. In other words, when chemical dispensing starts, the chemical and optionally water flow should reach a target flow rate instantaneously, maintain the target flow rate throughout dispensing, and then instantaneously return to zero when dispensing ends. This ensures that the injected chemical or the mixed solution of injected chemical and fluid delivered to downstream components is mixed to a desired target dilution ratio. Practically speaking, a perfect square wave is not possible, however the loading valve 300 may dramatically improve the characteristic flow curve. An exemplary comparison between the ideal square wave flow curve and an actual flow curve that can be generated using the loading valve 300 of the present disclosure is illustrated in FIG. 9*f*. Since the loading valve 300 does not open until the set pressure has been reached, this ensures that at the moment the loading valve 300 opens, the flow rate will be at or near the target flow rate. If the loading valve 300 was not present, the injection flow rate would slowly ramp-up as the syringe pump 100 pressurized at the start of the dispensing cycle, leading to an uneven dilution. When the cycle ends, the chemical pressure drops and the loading valve 300 very quickly shuts to prohibit further flow, resulting in a sharp cut-off in flow rate. Similarly, without the loading valve 300, the pressure built-up within the chemical outlet tubes 144, 146 would slowly dissipate after injection has ended, resulting in unwanted chemical flow into the water stream. In addition, due to the fluid tight connection between the loading valve 300 and syringe pump 100 and since the loading valve 300 shuts-off once chemical pressure has dropped just below the opening threshold, the chemical within the chemical outlet tubes 144, 146 and loading valve 300 remains pressurized between cycles. This means that when the next dispensing cycle starts, only a small amount of pressure needs to be built up by the dispensing stroke in order to overcome the loading valve 300, also resulting in a rapid injection response upon the start of the dispensing cycle.

In FIGS. 9*a*-9*e*, the loading valve 300 is an independent vehicle wash component, however, the loading valve 300 may be integral to the body of the fluid delivery manifold 200 syringe pump 100 or other motive fluid delivery devices coupled to the fluid source 640, such that the loading valve 300 with its mixing site is contained within the same body as the body responsible for delivery motive fluid.

Referring to FIGS. 1*h* and 1*i*, the modified loading valve 300' may be configured the same as the loading valve 300 with the exception of having two inlets 305 configured to receive chemical, via fluid tight connections, from outlets 140 of separate syringe pumps 100 (FIG. 1*a*) or separate chemical chambers 110 of the same syringe pump 100' (FIG. 1*i*). The loading valve 300' may thus receive pressurized chemical from two sources and operate to mix the two chemicals in the chemical priming cavity and dispense the chemicals from the injection nozzle 325, e.g., upon reaching the predefined pressure threshold. In some cases, the chemicals may be received at the loading valve 300' simultaneously, such as when a common drive mechanism 150 operates or when two drive mechanisms 150 operate simultaneously to deliver the two chemicals to the loading valve 300', e.g., upon receiving a common control signal such as from the control system 400. In other cases, the chemicals may be received at the loading valve 300' based on independent operation of two drive mechanisms 150. In addition, the chemical may be received at different rates depending on the rate of dispensing from the respective chemical outlet 140, which may be controlled by the 170 adjustable valve or the control system 400 as provided herein.

When used in an assembly of a plurality of loading valves 300, syringe pumps 100 and a fluid delivery manifold 200, such as in the fluid management system 500, the number of loading valves 300 may correspond to the number of syringe pumps 100, or when multiple syringe pumps 100 or chemical chambers 110 dispense chemical to the modified loading valve 300', fewer loading valves may be provided than the number of syringe pumps. In some cases, the fluid delivery manifold 200 may have a corresponding number of fluid outlet ports 230 to the number of loading valves.

Methods of Delivering Chemicals from Syringe Pumps

Figure 10:
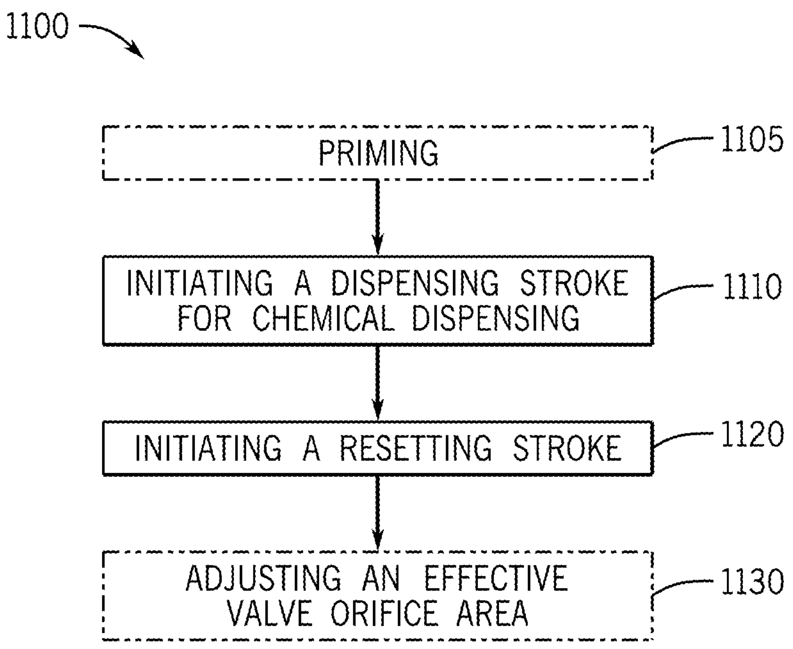
FIG. 10 illustrates a flowchart of a method of delivering chemical from a chemical delivery device according to various implementations of the present disclosure.

A method of delivering chemical from a chemical delivery device, e.g., a syringe pump 100 or syringe pump 100', is illustrated in the flowchart of FIG. 10. In FIG. 10, the method 1100 may involve initiating chemical dispensing such as by initiating a dispensing stroke from the chemical delivery device (step 1110). For instance, the chemical may be dispensed from chemical chamber 110 of the syringe pump 100 via operation of the drive mechanism 150 according to the various approaches of the present disclosure. In some cases, initiation of chemical dispensing corresponds to dispensing from two or more chemical chambers 110 such as when multiple positions 510 are simultaneously operated, or when a single drive mechanism 150 causes dispensing from two or more chemical chambers 110 of the chemical delivery device 100', and combinations thereof. In some cases, initiation of chemical dispensing corresponds to initiation of a dispensing operation of a fluid delivery manifold 200 in which an on cycle of the fluid delivery manifold 200 is also initiated according to the various approaches of the present disclosure. In some cases, initiation of chemical dispensing causes pressurized chemical to be dispensed from a dispensing nozzle of a loading valve 300 for mixing with motive fluid passing there through according to the various approaches of the present disclosure.

The method 1100 may further involve initiating a resetting stroke (step 1120). For instance, the drive mechanism 150 may retract or reset the piston 120 according to the various approaches of the present disclosure. In some cases, initiating the resetting stroke may cause multiple pistons to be retracted for instance when multiple positions 510 are simultaneously operated, when a single drive mechanism 150 retracts pistons within two or more chemical chambers 110 of the chemical delivery device 100', or combinations thereof. In some cases, initiating the resetting stroke may result in cessation of the on cycle of the fluid delivery manifold 200 according to the various approaches of the present disclosure. For example, delivery of the pressurized driving fluid to the fluid delivery manifold 200 may stop. In some cases, initiating the resetting stroke may result in cessation of the pressurized chemical being dispensed from the loading valve 300 according to the various approaches of the present disclosure. For instance, the chemical outlet 140 of the syringe pump 100 may be sealed to cease delivery of the pressurized chemical while maintaining a fluid tight connection with the loading valve 300 during resetting.

The method 1100 may optionally involve adjusting a flow of chemical from the syringe pump 100 (step 1130) according to the various approaches of the present disclosure. For instance, an effective valve orifice area of a port, such as the chemical outlet 140 or the chemical inlet 130, of the syringe pump or chemical delivery device may be adjusted to control the flow (e.g., rate and/or volume) of chemical entering and exiting the syringe pump 100 or chemical delivery device 100'. In addition or alternatively, the method 1100 may optionally involve priming the chemical chamber(s) 110 (step 1105) prior to initiating the dispensing stroke according to the various approaches of the present disclosure.

The steps of method 1100 may proceed simultaneously with the control system 400 causing adjustments and/or dispensing from the fluid delivery manifold 200 as well as other components of the fluid management and vehicle wash systems of the present disclosure. For instance, chemical and fluid may be dispensed simultaneously from multiple syringe pumps 100 and multiple fluid outlets of the fluid delivery manifold 200, and the flow of chemical from the syringe pumps 100 may dispense chemical at different rates based on flow adjustments (step 1130), while the motive fluid may optionally be dispensed at different rates from the fluid outlets, e.g., based on a position of the valve limiter 255 associated with each integrated valve 205, as described herein. Therefore, in some cases, both the duration of dispensing and rates of dispensing may be different across the syringe pumps 100 and integrated valves of the fluid delivery manifold 200.

The disclosed embodiments may be combined with: features of the fluid delivery management systems disclosed in U.S. Pat. No. 10,443,747 B2, and entitled "Manifold with Integrated Valve"; features of the sensing and control systems and methods of the disclosure of U.S. Publication No. US 2021/0349482 A1, entitled "Sensing and control of vehicle wash components and systems and methods thereof"; U.S. Patent Application Publication No. US20230139033A1, entitled "SYSTEMS AND METHODS FOR MONITORING AND CONTROLLING DILUTION RATES", U.S. Non-Provisional patent application Ser. No. 18/596,979, filed Mar. 6, 2024, and entitled "CHEMICAL DELIVERY SYSTEM WITH DILUTION CONTROL"; features of chemical delivery systems that include eductors, e.g., venturi valves, that rely on vacuum pressure for chemical dispensing are disclosed in U.S. Pat. No. 8,887,743 B2; and features of dilution devices are disclosed in US 2019/0022607 A1, the disclosures of all of which are incorporated herein by reference for any useful purpose.

Features from any of the disclosed embodiments may be used in combination with one another, without limitation. In addition, other features and advantages of the present disclosure will become apparent to those of ordinary skill in the art through consideration of the following detailed description and the accompanying drawings.

What is claimed is:

1. A chemical delivery device for use in a vehicle wash system, comprising:

a chemical chamber comprising a chemical inlet and a chemical outlet;

a piston arranged in the chemical chamber between the inlet and the outlet, the piston comprising a one-way valve and a circumferential seal; and a drive mechanism comprising a housing joined to the chemical chamber and configured for linearly driving the piston in an advancing direction and in an opposite, retracting direction, wherein the circumferential seal of the piston maintains a seal against the chemical chamber, and wherein the drive mechanism is fluidly isolated from the chemical chamber, wherein upon the drive mechanism driving the piston in the advancing direction, the one- way valve is in a closed state such that an amount of chemical on a first side of the piston is dispensed from the outlet and a corresponding amount of the chemical to the amount dispensed is drawn into the chemical chamber from a chemical supply at a second side of the piston, via the inlet, and wherein upon the drive mechanism retracting the piston in the retracting direction, the one-way valve is in an open state such that the corresponding amount of the chemical drawn in from the chemical supply is transmitted through the one-way valve from the second side to the first side of the piston for subsequent dispensing from the chemical chamber.

2. The chemical delivery device of claim 1, further comprising an adjustable valve coupled to the chemical outlet or the chemical inlet, the adjustable valve configured to adjust an effective valve orifice area of the chemical outlet or the inlet to simultaneously control the amount of the chemical dispensed from the outlet and the amount of the chemical drawn into the inlet upon the drive mechanism driving the piston in the advancing direction.

3. The chemical delivery device of claim 2, wherein the adjustable valve comprises a valve needle configured to extend into the valve orifice to adjust the effective valve orifice area and control a flow rate of the chemical.

4. The chemical delivery device of claim 3, wherein the valve needle comprises a parabolic tip and movement of the parabolic tip relative to the valve orifice causes a linear adjustment of the flow rate of the chemical.

5. The chemical delivery device of claim 3, wherein the adjustable valve further comprises a linear actuator for linearly displacing the valve needle.

6. The chemical delivery device of claim 5, wherein the linear actuator is a linear stepper motor or a proportional solenoid.

7. The chemical delivery device of claim 1, wherein the one-way valve is arranged on a piston head of the piston and comprises at least one through hole defined in the piston head and a seal for blocking passage of the chemical along the at least one through hole in one direction.

8. The chemical delivery device of claim 7, wherein a drive shaft of the drive mechanism is coupled to the piston head, and wherein the at least one through hole is arranged in an area of the piston head that couples to the drive shaft.

9. The chemical delivery device of claim 7, wherein a drive shaft of the drive mechanism extends between the chemical chamber and the drive mechanism, and one or more seals surrounds the drive shaft for fluidly isolating the drive mechanism from the chemical chamber.

10. The chemical delivery device of claim 7, wherein the circumferential seal surrounds the piston head.

11. The chemical delivery device of claim 1, further comprising a check valve arranged at each of the chemical outlet and the chemical inlet, wherein upon the drive mechanism driving the piston in the advancing direction, pressure opens the check valve arranged at the chemical outlet and vacuum opens the check valve arranged at the inlet, and wherein upon the drive mechanism retracting the piston in the retracting direction, the check valves are closed to thereby prevent backflow of chemical.

12. A chemical delivery device for use in a vehicle wash system, comprising:

a chemical chamber comprising a chemical inlet at one end and a chemical outlet at an opposite end, the inlet configured to receive a chemical from a chemical supply and the outlet configured for dispensing the chemical to a vehicle wash applicator;

a piston arranged in the chemical chamber between the chemical inlet and the chemical outlet such that the chemical outlet is on a first side of the piston and the chemical inlet is on an opposite second side of the piston, the piston comprising a one-way valve and a circumferential seal, the one-way valve configured to have an open state to permit passage of the chemical from the second side to the first side of the piston and to have a closed state to prevent the passage of the chemical from the first side to the second side thereof, the circumferential seal configured to seal against the chemical chamber; and a drive mechanism joined to the chemical chamber and configured for linearly driving the piston towards the outlet and in an opposite direction towards the inlet, wherein the circumferential seal of the piston maintains a seal against the chemical chamber, and wherein the drive mechanism is fluidly isolated from the chemical chamber, wherein upon the drive mechanism driving the piston towards the outlet in a dispensing stroke of a dispensing operation, the one-way valve is in the closed state such that an amount of the chemical on the first side of the piston is dispensed from the outlet and a corresponding amount of the chemical to the amount dispensed is drawn into the chemical chamber from the chemical supply at the second side of the piston, via the inlet, and wherein, after the dispensing stroke, upon the drive mechanism driving the piston towards the inlet in a resetting stroke of the dispensing operation, the one-way valve is in the open state such that the corresponding amount of the chemical drawn in from the chemical supply is transmitted through the one-way valve from the second side to the first side of the piston for dispensing from the chemical chamber in a subsequent dispensing operation.

13. A method of delivering a chemical from a chemical delivery device in a vehicle wash system, comprising:

initiating a dispensing stroke of a dispensing operation for dispensing the chemical from a chemical chamber, the chemical chamber comprising a chemical inlet at one end, a chemical outlet at an opposite end, and a piston arranged between the inlet and the outlet, the piston comprising a one-way valve and a circumferential seal, wherein during the dispensing stroke, a drive mechanism drives the piston towards the outlet to dispense an amount of the chemical from the outlet, and the one-way valve is in a closed state such that a corresponding amount of the chemical to the amount dispensed is drawn into the chemical chamber from a chemical supply via the inlet; and initiating a resetting stroke of the dispensing operation, wherein during the resetting stroke, the drive mechanism retracts the piston towards the inlet and the one-way valve of the piston is in an open state such that the corresponding amount of the chemical drawn in from the chemical supply is transmitted through the one-way valve for dispensing from the chemical chamber in a subsequent dispensing operation, wherein the circumferential seal maintains a seal between the piston and the chemical chamber, and wherein the drive mechanism is fluidly isolated from the chemical chamber.

14. The method of claim 13, wherein the chemical chamber remains filled during the dispensing operation.

15. The method of claim 13, wherein the chemical supply is at atmospheric pressure such that the chemical is drawn into the inlet by vacuum during the dispensing stroke.

16. The method of claim 13, further comprising adjusting an effective valve orifice area of the chemical outlet or the chemical inlet such that during the dispensing stroke, the amount of the chemical dispensed from the outlet and the amount of the chemical drawn into the inlet are simultaneously controlled.

17. The method of claim 16, wherein adjusting the effective valve orifice area comprise moving a valve needle linearly relative to the valve orifice to linearly adjust the effective valve orifice area and a flow rate of the chemical.

18. The method of claim 13, wherein during the resetting stroke, the chemical is transmitted through at least one through hole of the one-way valve, the at least one through hole defined in a piston head of the piston, and wherein during the dispensing stroke, the chemical is blocked from passage along the at least one through hole by a seal of the one-way valve covering the at least one through hole.

19. The method of claim 13, wherein prior to initiating the dispensing operation, further comprising a step of priming the chemical chamber, wherein the step of priming comprises causing the chemical to enter the chemical chamber via the one-way valve, venting air within the chemical chamber via the outlet, and moving the piston to a retracted position and an extended position within the chemical chamber.

20. At least one non-transitory, machine-readable medium including instructions that, when executed by processing circuitry, result in the processing circuitry:

in response to receipt of a control signal to initiate a dispensing operation, causing a drive mechanism to initiate a dispensing stroke of the dispensing operation for dispensing a chemical from a chemical chamber, the chemical chamber comprising a chemical inlet at one end, a chemical outlet at an opposite end, and a piston arranged between the inlet and the outlet, the piston comprising a one-way valve and a circumferential seal, wherein during the dispensing stroke, the drive mechanism drives the piston towards the outlet to dispense an amount of the chemical from the outlet, and the one-way valve is in a closed state such that a corresponding amount of the chemical to the amount dispensed is drawn into the chemical chamber from a chemical supply via the inlet; and causing a resetting stroke of the dispensing operation to be initiated, wherein during the resetting stroke, the drive mechanism retracts the piston towards the inlet and the one-way valve of the piston is in an open state such that the corresponding amount of the chemical drawn in from the chemical supply is transmitted through the one-way valve for dispensing from the chemical chamber in a subsequent dispensing operation, wherein the circumferential seal maintains a seal between the piston and the chemical chamber, and wherein the drive mechanism is fluidly isolated from the chemical chamber.

* * * * *